United States Patent
Sharpe et al.

(10) Patent No.: US 9,571,649 B2
(45) Date of Patent: Feb. 14, 2017

(54) METHOD FOR CONNECTING USERS WITH AGENTS BASED ON USER VALUES DYNAMICALLY DETERMINED ACCORDING TO A SET OF RULES OR ALGORITHMS

(71) Applicants: Bruce A. Sharpe, Aurora, CO (US); Anthony G. Shrader, Firestone, CO (US); William T. Cumberland, Denver, CO (US)

(72) Inventors: Bruce A. Sharpe, Aurora, CO (US); Anthony G. Shrader, Firestone, CO (US); William T. Cumberland, Denver, CO (US)

(73) Assignee: TELETECH HOLDINGS, INC., Englewood, CO (US)

( * ) Notice: Subject to any disclaimer, the term of this patent is extended or adjusted under 35 U.S.C. 154(b) by 0 days.

(21) Appl. No.: 14/925,695

(22) Filed: Oct. 28, 2015

(65) Prior Publication Data

US 2016/0119477 A1 Apr. 28, 2016

Related U.S. Application Data

(63) Continuation-in-part of application No. 14/686,514, filed on Apr. 14, 2015, now Pat. No. 9,357,073, which
(Continued)

(51) Int. Cl.
H04M 3/00 (2006.01)
H04M 5/00 (2006.01)
(Continued)

(52) U.S. Cl.
CPC ....... *H04M 3/5175* (2013.01); *G06Q 30/0257* (2013.01); *G06Q 30/0261* (2013.01);
(Continued)

(58) Field of Classification Search
CPC  H04M 3/5233; H04M 3/4878; H04M 3/5133; H04W 4/021
(Continued)

(56) References Cited

U.S. PATENT DOCUMENTS 6,614,783 B1 9/2003 Sonesh et al.
6,912,563 B1 6/2005 Parker et al.
(Continued)

FOREIGN PATENT DOCUMENTS

WO    WO 01/04722 A2    1/2001

*Primary Examiner* — Thjuan K Addy
(74) *Attorney, Agent, or Firm* — Blakely, Sokoloff, Taylor & Zafman LLP

(57) ABSTRACT

A request is received for connecting a user with an agent, the request identifying a user interaction with content. A second server is accessed to determine a first score of the user representing a benefit the user has generated for a client that provides the content. A third server is accessed to determine a second score of the user representing overall burden to provide services to the user by the client based on an interaction history of the user with the client. A user value is dynamically determined based on the first score and the second score using a user value determination algorithm that is specifically configured for the client. A list of agent candidates is identified from a pool of agents based on the user value and the collection of real-time data. A first communication session is established between the user and one of the agent candidates.

24 Claims, 49 Drawing Sheets

Related U.S. Application Data is a continuation of application No. 14/521,783, filed on Oct. 23, 2014, now Pat. No. 9,036,807.

(60) Provisional application No. 62/074,591, filed on Nov. 3, 2014.

(51) Int. Cl.

| | | |
|---|---|---|
| *H04M 1/64* | (2006.01) | |
| *H04M 11/00* | (2006.01) | |
| *H04M 3/51* | (2006.01) | |
| *H04M 3/523* | (2006.01) | |
| *G06Q 30/02* | (2012.01) | |
| *H04W 4/02* | (2009.01) | |
| *H04W 4/20* | (2009.01) | |
| *H04M 3/487* | (2006.01) | |
| *H04M 7/00* | (2006.01) | |

(52) U.S. Cl.
CPC ....... *H04M 3/5191* (2013.01); *H04M 3/5232* (2013.01); *H04M 3/5233* (2013.01); *H04W 4/021* (2013.01); *H04W 4/206* (2013.01); *H04M 3/4878* (2013.01); *H04M 3/5133* (2013.01); *H04M 7/003* (2013.01)

(58) Field of Classification Search
USPC ......................... 379/265.09, 265.11, 265.12, 265.13,379/265.01, 265.05, 88.12, 88.11, 88.13
See application file for complete search history.

(56) References Cited

U.S. PATENT DOCUMENTS

| | | | |
|---|---|---|---|
| 7,023,979 B1 * | 4/2006 | Wu | H04M 3/5233 |
| | | | 379/265.11 |
| 7,730,135 B2 | 6/2010 | Petrovykh | |
| 8,351,594 B2 | 1/2013 | Ristock | |
| 9,202,213 B2 * | 12/2015 | Gromoll | G06F 17/30864 |
| 2002/0077876 A1 | 6/2002 | O'Meara et al. | |
| 2006/0085417 A1 | 4/2006 | John et al. | |
| 2007/0116239 A1 | 5/2007 | Jacobi et al. | |
| 2008/0275785 A1 | 11/2008 | Altberg et al. | |
| 2009/0171749 A1 | 7/2009 | Laruelle et al. | |
| 2011/0264644 A1 | 10/2011 | Grant et al. | |
| 2013/0173687 A1 | 7/2013 | Tuchman et al. | |

* cited by examiner

Intent Determination Rules 407

| User Interaction Identifiers | Intent Identifiers |
|---|---|
| Damaged URL | Help |
| Assistance URL | Help |
| Support URL | Help |
| Broken URL | Help |
| Buy URL | Buy |
| Sopping Cart URL | Buy |
| Purchase URL | Buy |
| Sales URL | Buy |
| 921 ... | 922 ... |

FIG. 9B

| Revenue Score | assigned # |
|---|---|
| $0 | 0 |
| $1 to $50 | 1 |
| $51 to $500 | 2 |
| $501 to $1,200 | 3 |
| $1,200+ | 4 |

FIG. 11A

| Consumer | Influence | Revenue | Cost | Adoption | Loyalty | = Score |
|---|---|---|---|---|---|---|
| Yukon2005 | 2 | 3 | 2 | 3 | 4 | 2.15 |
| SuburbanCowgirl | 4 | 1 | 1 | 2 | 2 | 1.25 |
| Colorado Al | 0 | 1 | 1 | 1 | 1 | 0.5 |
| DesertDevil | 4 | 4 | 3 | 4 | 4 | 2.6 |
| Seattle Mama | 3 | 3 | 2 | 2 | 2 | 1.65 |
| High range | 4 | 4 | 0 | 4 | 4 | 3.2 |
| Low range | 0 | 0 | 4 | 0 | 0 | -0.8 |
| Weighting | wInfluence | wRevenue | wCost | wAdoption | wLoyalty | |
| 402 | 0.1 | 0.35 | -0.2 | 0.1 | 0.25 | |

FIG. 11B

Customized Interaction
Yukon2005

| Score | Customer Value Score |
|---|---|
| 2 | Influence = Average (28 Klout Score) |
| 3 | Revenue = Above Average Revenue ($723) |
| 2 | Cost = Average Cost to Support ($18) |
| 3 | Adoption = Early Adopter |
| 4 | Loyalty = Promoter |
| 2.15 | Customer Total Value Score |

Customer Service: Recent purchase of a new camp grill and has questions with pilot light.

Bio: Trusted member of REI since 1995. He and his wife love camping and adventure travel. Both have decent jobs, and not having any children, they spend their spare income on travel and adventure. His wife is adept at social media and often posts information about their travels (occasionally mentioning the gear or REI services). They are very loyal to REI and fall into the early adopter rating.

FIG. 11C

Customized Interactions
Colorado Al

| Score | Customer Value Score |
|---|---|
| 1 | Influence = Nominal Influence (1 Klout Score) |
| 1 | Revenue = Below Average Revenue ($13) |
| 1 | Cost = Below Average Cost to Support ($5) |
| 1 | Adoption = Late Majority |
| 1 | Loyalty = Detractor + |
| 0.5 | Customer Total Value Score |

Customer Service: Recent purchase a of new tent for the season, but unsure of tent setup.

Bio: Family man in his mid-fifties. Sole income earner, and occasional outdoorsman (fishing, camping, and hiking). Wife occasionally goes on camping and hiking trips. Does not buy newest and most expensive gear, focuses on value. Tends to buy infrequently and only buys new gear when the older equipment no longer works. While a member of REI, Colorado Al will bargain shop to find the best deal and that often leads him to other stores. Colorado Al is not very tech savvy and often relies on price for his purchase decision.

FIG. 11D

| User Profile Information 1200 | |
|---|---|
| General Profile Info | Contact info, such as user ID, name, username, email, phone, address, alias, etc. |
| Intent | Buy, Help |
| User Value | 82 |
| Geographic Location | Location |
| User Type | Platinum, gold, silver, bronze, etc. |
| Preferred comm. channels | Voice, chat, email, social, KB |
| Demographics | Ethnicity, gender, age, marital status, income level, economic status, education level, employment, etc. |
| Psychographic Factors | Interests, activities, attitudes/personality, associations, behaviors, etc. |
| Relationship to Organization | New user, member since, outcomes of prior interactions, user value, intent, |
| ... | ... |

| Agent/Expert Profile Information 1250 | |
|---|---|
| General Profile Info | Contact info, such as agent ID, name, username, email, phone, address, etc. |
| Expertise | Buy, Help |
| Agent Type/Skill Level | Premium sales, sales, premium service, service, general queue |
| Value Range | 75-100 |
| Geographic Location | Location |
| State/Status | Available, unavailable, |
| Preferred comm. channels | Voice, chat, email, social, KB |
| Demographics | Ethnicity, gender, age, marital status, income level, economic status, education level, employment, etc. |
| Psychographic Factors | Interests, activities, attitudes/personality, associations, behaviors, etc. |
| ... | ... |

1251 — General Profile Info
1252 — Expertise
1253 — Agent Type/Skill Level
1254 — Value Range
1255A — Geographic Location
1255B — State/Status
1256 — Preferred comm. channels
1257 — Demographics
1258 — Psychographic Factors

FIG. 12B

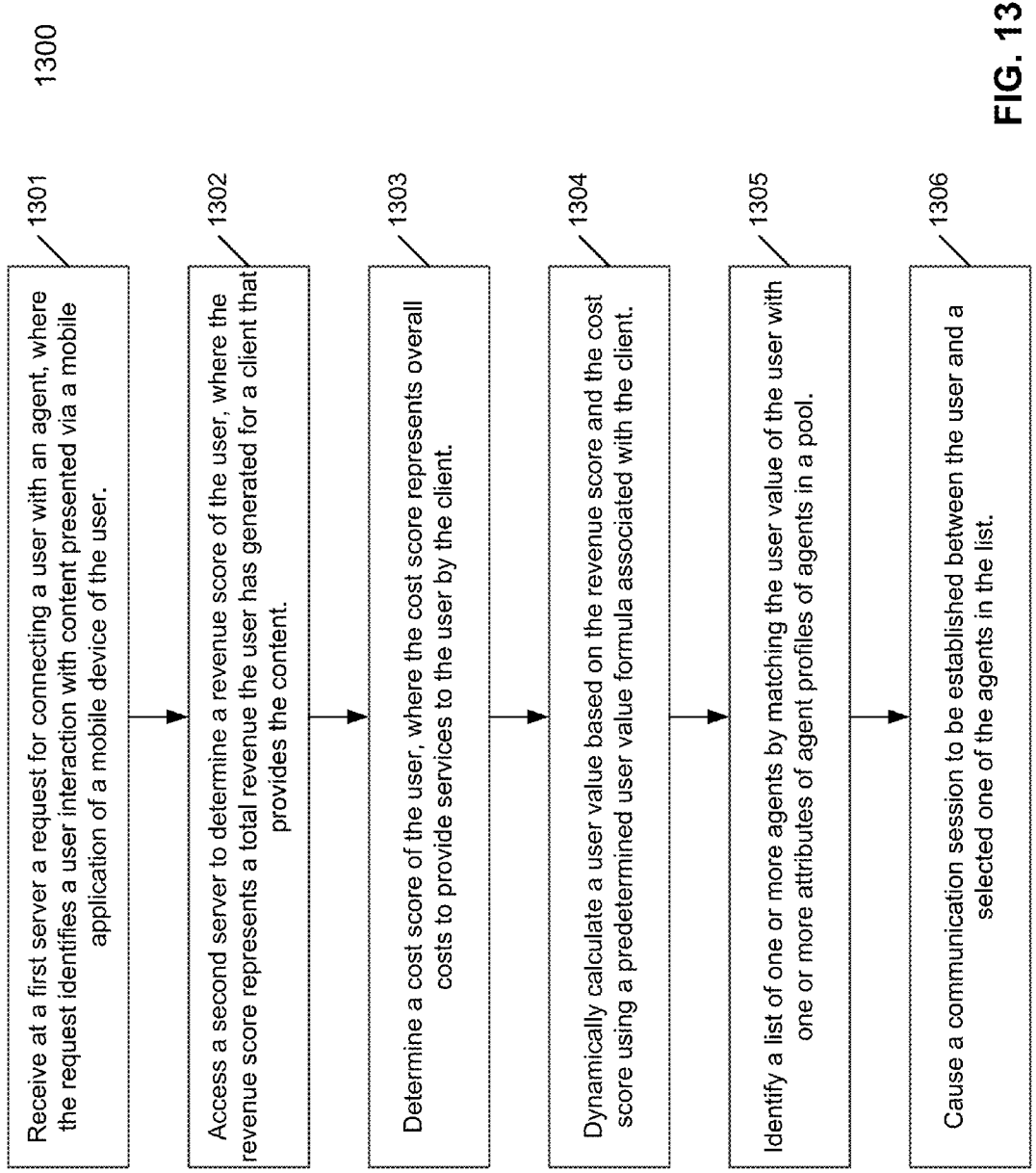

| Field | Example | Notes |
|---|---|---|
| InteractionID | 123456789-10-08-2014-14:58 | unique identifier for a record |
| ExpertID | 123456789@agent | unique identifier for the last Expert, this should include |
| BusinessEntityID | citi_ag | the business name |
| ChannelDetailID | 12345678900000 | the unique id from the channel platform for the interaction of the last connected channel device |
| CustomerID | abcdefg23456789 | unique customer id, null if not located or created |
| CustomerValue | 1.5 | personalization value - will be recorded with the interaction since customer value can change |
| Disposition | "sale" | Interaction disposition - this is independent from channel mgmt disposition codes. |
| EndTime | 10-08-2014-15:05 | end time of the interaction |
| ExpertiseUsed | "sales" | Skill -- since these attributes can be changed on an expert, tracking to interaction will be required |
| ExpertValueRange | "1.5-4.0" | Personalization - since these attributes can be changed on an expert, tracking to interaction will be required |
| OrganizationEntityID | citi_ag_Northeast | a subset of the business name |
| StartTime | 10-08-2014-14:58 | start time of the interaction |
| ... | ... | ... |

FIG. 15

Agent Classification Rules
1605

Advanced Routing UI

Customer Type 1801
- Platinum
- Gold
- Silver
- Bronze
- Everyone Else

Select Skill 1802
- Premium Sales
- Sales
- Premium Service
- Service
- General Queue Select Default Skill: *Default Skill*

SAVE

FIG. 18

| Interactive Event ID | Survey ID | Target |
|---|---|---|
| Beginning event | Survey A | User |
| ... | ... | ... |
| Ending event | Survey N | User, Agent |
| ... | ... | ... |

FIG. 31A

| Target | Survey ID | Survey Counts | Status | Last Survey Date |
|---|---|---|---|---|
| ... | ... | 2 | Outstanding | ... |
| ... | ... | ... | ... | ... |
| 3101 | 3102 | 3103 | Feedback received 3104 | 3105 |
| ... | ... | 3 | ... | ... |

Campaign Configuration

Name: [Enter Name] — 3451

Set Start Date
3452

September 14

Set End Date
3453

September 14

☑ NO END DATE

Select Questions And Sequence Questions:

3454

Move Up ◀
Move Down ▶

Q1 – Email
Q3 – Phone
Q2 – Interests
Q10 – Expert Results

Save

FIG. 34B

Survey Results Reports
Campaign: First 90 Days

From: September 4, 2014
To: September 5, 2014

| Day | Question | Total Presented | Total Completed | Total Dismissed | % Completed | % Dismissed |
|---|---|---|---|---|---|---|
| 9/4/2014 | Q1-Email | 1000 | 900 | 100 | 90% | 10% |
| 9/4/2014 | Q2- Interests | 250 | 150 | 100 | 60% | 40% |
| 9/4/2014 | Q3 -Phone | 0 | 0 | 0 | 0% | 0% |
| 9/5/2014 | Q1-Email | 2000 | 1950 | 50 | 98% | 2% |
| 9/5/2014 | Q2- Interests | 500 | 400 | 100 | 80% | 20% |
| 9/5/2014 | Q3-Phone | 125 | 0 | 125 | 0% | 100% |
| SUMMARY | | 3875 | 3400 | 475 | 88% | 12% |

| Message ID | Destination/ Device ID | Message Content | State | Sent Timestamp | Agent ID | User ID/ Profile (optional) | Received Timestamp (optional) |
|---|---|---|---|---|---|---|---|
| Message 1 | User Device 1 | Thank you | Response received | 2014-01-09 23:53:00 | 23654 | | |
| Message 2 | User Device 2 | Thank you | Sent | 2014-10-12 12:53:00 | 24321 | | |
| Message 3 | User Device 3 | Thank you | Pending | 2014-11-12 03:23:00 | 14565 | | |
| Message 4 | User Device 4 | Thank you | Pending | 2014-12-22 02:13:00 | 56943 | | |
| ⋮ 3901 | ⋮ 3902 | ⋮ 3903 | ⋮ 3904 | ⋮ 3905 | ⋮ 3906 | ⋮ 3907 | ⋮ 3908 |

METHOD FOR CONNECTING USERS WITH AGENTS BASED ON USER VALUES DYNAMICALLY DETERMINED ACCORDING TO A SET OF RULES OR ALGORITHMS

RELATED APPLICATIONS

This application claims the benefit of U.S. Provisional Patent Application No. 62/074,591, filed Nov. 3, 2014. This application is also a continuation-in-part (CIP) of U.S. patent application Ser. No. 14/686,514, filed Apr. 14, 2015, which is a continuation of U.S. patent application Ser. No. 14/521,783, filed Oct. 23, 2014, now U.S. Pat. No. 9,036,807. The disclosure of the above applications is incorporated by reference herein in its entirety.

FIELD OF THE INVENTION

Embodiments of the present invention relate generally to connecting users over a network. More particularly, embodiments of the invention relate to connecting a user with an agent based on user interaction with content and dynamic user information obtained in response to the user interaction.

BACKGROUND

Prior to the advent and prolific use of distributed network environments such as the Internet, customer service sessions typically occurred over a teleconference between a customer service agent or service specialist and a customer. These teleconferences, which incidentally are still very popular today, are initiated by a customer placing a phone call to a customer service agent. The customer service agent's phone receives the call through a public-switched telephone network (PSTN). Many support centers handle a large volume of inquiries, usually by phone, for sales, information, customer support and other services. Typical support centers provide the ability to route multiple incoming, customer-initiated calls to agents which provide sales, information, or support on behalf of an entity interested in establishing or maintaining a relationship with the customer.

Modern support center systems selectively route incoming calls based on a number of factors such as the number called or dialed, the originating number, the queued sequence of the caller, the geographic location of the caller, accumulated caller history, and other relevant criteria. Once the system has evaluated the inbound caller's information, if any, the system searches for an available agent to service the call. Availability of agents may be dependent on any number of factors such as a skill area, level of that skill and/or a schedule of the agent. The number of agents within the contact center and available to the system may often be limited by the physical space available for the agents to operate. Contact centers have to deal with a limited number of agents to handle a large number of incoming customer calls. Typically, when an end user initiates a contact with the support center, the end user has to know or maintain the detailed information regarding how to reach people and/or obtain services from the support center.

Most conventional systems connect a user with an agent based on solely the static user information of the user with static agent information of the agent, such as subject matter to skill set matching. The selection of an agent does not take into the personality of the user and/or agent. Most of the time such static information is not up-to-date. Such matching often leads to unsatisfactory user experience.

BRIEF DESCRIPTION OF THE DRAWINGS

Embodiments of the invention are illustrated by way of example and not limitation in the figures of the accompanying drawings in which like references indicate similar elements.

FIG. 9B shows a data structure of an intent mapping table according to one embodiment of the invention.

FIGS. 11A and 11B are diagrams illustrating examples of user value determination rules according to some embodiments of the invention.

FIGS. 11C and 11D are examples of user profiles according to some embodiments of the invention.

FIG. 12A shows an example of user profile information according to one embodiment of the invention.

FIG. 12B shows an example of user profile information according to one embodiment of the invention.

FIG. 13 is a flow diagram illustrating a process for matching a user with an agent based on a user value according to one embodiment of the invention.

FIG. 15 shows an example of interaction context according to one embodiment of the invention.

FIG. 18 shows an example of a graphical user interface (GUI) to configure a set of rules according to one embodiment of the invention.

FIG. 31A shows an example of an event to survey mapping table according to one embodiment of the invention.

FIG. 31B shows an example of survey statistics data structure according to one embodiment of the invention.

FIGS. 34A and 34B are screenshots illustrating certain graphical user interfaces for configuring surveys according to some embodiments of the invention.

FIG. 35 shows an example of a survey report according one embodiment of the invention.

FIG. 39 is a block diagram illustrating an example of a message store according to one embodiment of the invention.

DETAILED DESCRIPTION

Figure 1A:
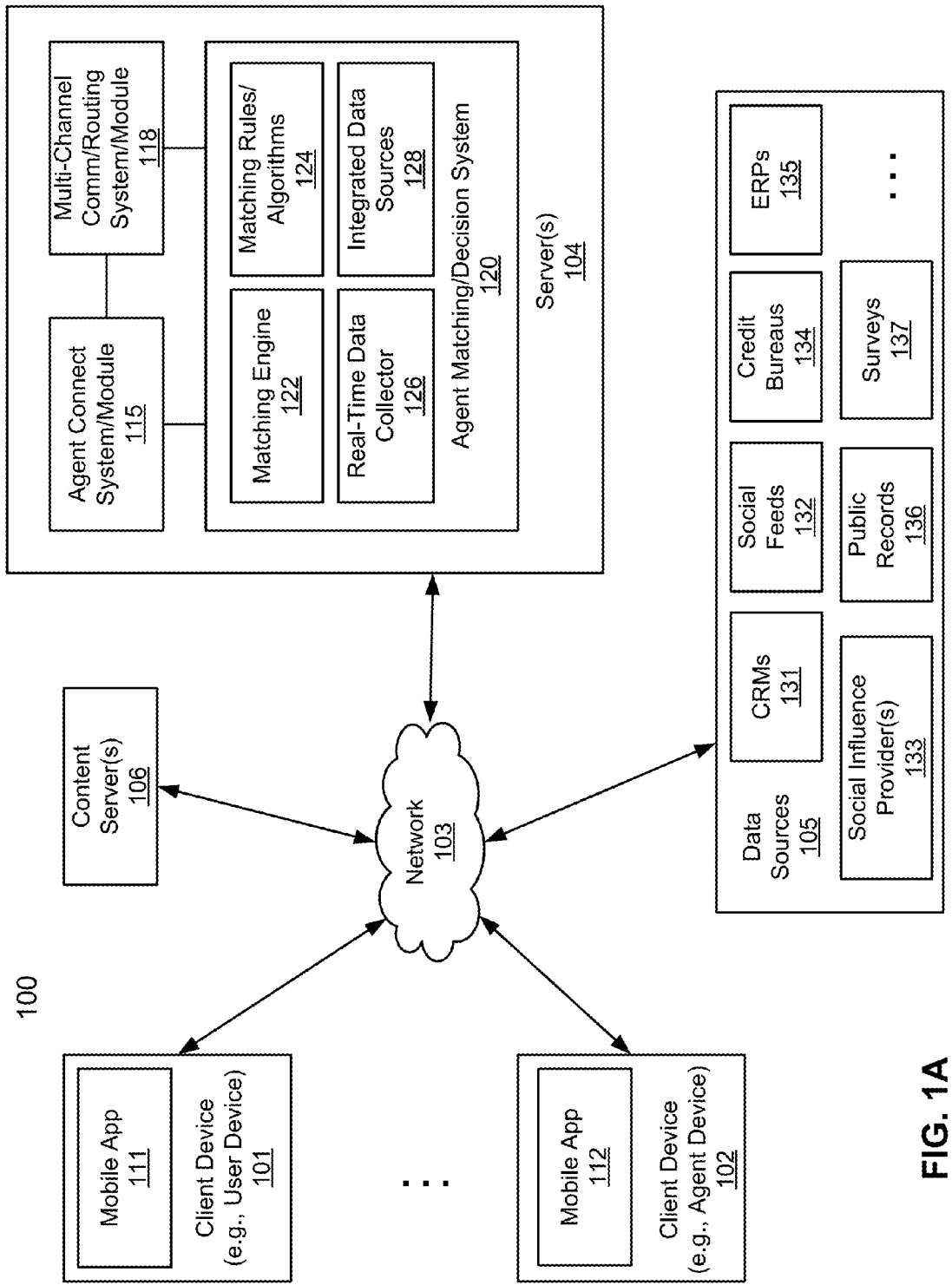
FIGS. 1A and 1B are block diagrams illustrating an agent matching system for matching a user with an agent according to certain embodiments of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a personalization system (also referred to as an agent matching system, a personalized agent matching system, an agent and non-agent matching system, a matching/decision system) is provided to allow enterprise entities or organizations to segment their users into value sectors. These segments will allow the entities to define different servicing outcomes based on the user segmentation. These capabilities allow entities to focus on their high-value users in order to provide "concierge" type services. Additionally, personalized matching also allows the self-services or existing channels to be optimized based on the value segmentation instead of legacy skill-based routing between users and agents. One of the purposes of personalized matching is to provide a user a customized or personalized outcome, which over time will become more refined and accurate. The system can and will manipulate the course of a user journey in real-time based on all available data at the time the user journey is in progress. The manipulation or changes performed can be stated (for example) as a change in context as the user progresses in their journey.

This refinement capability is maintained by maintaining user information and interaction information, and performing analytical tasks on the data to create actionable data to be used in the current and future interactions. The personalization system may operate as a separate system or server that provide multi-tenant services to a variety of enterprise or corporate clients by matching a user of a client with an agent (e.g., a support agent) in a personalized manner and according to a set of matching rules and/or algorithms that are specifically created for the respective client. Such rules and/or algorithms may be customized for specific needs of specific circumstances of a specific client or operating model. The personalized matching between a user and an agent may be performed as a service to a variety of agent connected systems, such as, for example, support centers or contact centers. Note that throughout this application, an agent matching system is utilized as an example of a user matching system that matches a user with another user based on a variety of factors or parameters (e.g., personality). The system can be applied to a variety of scenarios or circumstances. The system can also be called upon to match, e.g. a customer/user to a self-service channel, a customer/user to a live channel, or the system can just be used to make decisions for other needs to effect a journey or follow up action on behalf of a user.

In one aspect of the invention, user interactions of a user with respect to content collected from a user device of the user (e.g., via a mobile application running within a mobile device of the user) presented to the system and are monitored. In response to an interactive event, an algorithm for agent or channel matching is identified, where the agent or channel matching algorithm is specifically created for a client that provides the content and/or the mobile application. This content is provided to the system based on special coded instrumentation provided to the client to include within the mobile, web or IVR application. This instrumentation is the mechanism utilized to keep the system informed of user activity on the device to determine via the algorithm, context such that the system can change the users journey. A user profile associated with the user is retrieved from a user database, from custom private and public data sources or alternatively, the user profile is dynamically created and enhanced if the user is a new user. The user profile typically contains certain static user information concerning the user, such as, for example, user contact information (e.g., name, address, email address, gender). In addition, a real-time data collector dynamically collects real-time or dynamic user information from one or more external data sources.

A matching engine is configured to match the user with an agent from a pool of agents based on the user interaction, the static user information, the real-time user information, and/or agent profiles of the agents, according to a set of agent matching rules and/or algorithms (rules/algorithms). A list of one or more agents is identified based on the matching and transmitted from the server to the user device of the user to allow the user to select one of the agents in the list. Alternatively, an agent with the best match may be identified and utilized. In response, a communication session is established between the user device of the user and an agent device of a selected or best matched agent. Thus, in addition to the static user information, the dynamic user information collected at the point in time may also be used to match the user with agents. The identified agents are identified in a personalized manner with respect to the user, i.e., the personality of the agents may be closer to the personality of the user, in addition to skill matching based on a product or service of a product or service provider (herein after product/service provider) as a client in question.

According to another aspect of the invention, the matching between a user and agents may be performed based on a user value that is dynamically determined at the point in time of the user interaction. The user value represents a relationship between the user and the client that provides the content and/or mobile application. The user value may be determined based on certain scores or values that represent different relationship factors that collectively reflect how valuable the user is with respect to the client in a quantifiable manner. In one embodiment, in response to a request for connecting a user to an agent received at a first server (e.g., an agent matching server), a second server (e.g., external data provider or data source) is accessed to determine or compute a revenue score and a cost score of the user. The revenue score represents overall revenue the user has generated for a client that provides the content and/or a mobile application of a mobile device associated with the user. The cost score represents the overall cost to provide services to the user by the client. The user value may be determined further based on other dynamically computed scores, such as, for example, a loyalty score, an adoption score, and an influence score, etc. These scores are dynamically determined at the point in time in response to the request. Some scores can be determined using internal and external data sources even before the user utilizes their device for any actions. These scores can be utilized during the live dynamic computation.

In one embodiment, a user value is dynamically determined for user based on the revenue score and the cost score using a predetermined user value determination algorithm. The user value determination algorithm is specifically configured for the client and stored in a client database associated with the client. A list of agent candidates is then identified based on the user value. In one embodiment, the user value is used to match an agent value or a range of values or a value range as an agent attribute specified in each of the agent profiles associated with the agents. In one embodiment, an agent is selected whose agent value or value range is within a predetermined proximity of the user value, or vice versa. A communication session is then established between a user device of the user and an agent device of an agent selected from the list.

According to another aspect of the invention, in response to a request received or initiated from a user device (e.g., via a mobile application running within a mobile device) of a user to contact an agent, a list of agents that are available to communicate with the user is identified by matching a user profile of the user and agent profiles of the agents. The request may be received directly from the user device. Alternatively, the request may be received from a Web site when the user device accesses the Web site. A support journey workflow is dynamically generated based on the identified agents using a predetermined journey workflow template. The journey workflow includes multiple journey workflow stages, each being associated with one of the identified agents. The journey workflow template has been specifically configured for a client that provides products or services to the user. A first communication session is established between the user device of the user and a first agent device of a first agent associated with a first journey workflow stage of the journey workflow. At the conclusion of the first communication session, it is determined whether a first criteria (e.g., specific request from the user or agent, poor survey result, failure of technical conditions, etc.) specified in the first journey workflow stage has been met (e.g., the user is unsatisfied, requested by the first agent). In response to determining that the first criteria has been met, a second communication session is established between the user device of the user and a second agent device of a second agent specified in a second journey workflow stage of the journey workflow. The journey workflow stages of the journey workflow may be processed until the user has been satisfied by the services provided by the agent or agents.

According to another aspect of the invention, an interactive event driven survey system is utilized to survey or collect user satisfaction or feedback data concerning the support services provided by the agent or agents. In one embodiment, a server representing a survey system receives an interactive event during a communication session between a user and an agent discussing content presented to the user by a client (e.g., enterprise or corporate client). In response to the interactive event, a survey is identified based on the interactive event. The server may maintain many surveys that have been configured to be associated with a variety of different interactive events. Each survey is represented by a survey workflow having a series of survey workflow stages. Each survey workflow stage is associated with a specific survey question or questions and a set of one or more survey rules/algorithms that governs how the corresponding question(s) should be presented to the user, as well as the content to be collected via the survey. A survey can be utilized to collect information necessary for making decisions and matching from or can be utilized to collect increments of data, gaps in the user profile/other that are critical to know when interacting with the user. In one embodiment, for each of the questions in the survey workflow stages, a corresponding set of survey rules/algorithms is examined to determine whether and how the question should be sent to the user. Based on the survey rules/algorithms, the question is transmitted to the user device and a user response is received in return. Subsequently, a user profile and/or an agent profile may be updated based on the survey responses. A survey workflow and the corresponding survey rules/algorithms may be configured by an administrator of the corresponding client via a configuration interface and stored in a client database or survey database associated with the client.

According to another aspect of the invention, a message such as a summery or survey sent to a user device at the conclusion of a communication session includes a link (a button or control). The link can be activated by the user to possibly reach the same agent of the concluded session. If the user activates the link within a predetermined period of time after the session ended, such an activation may extend the previously concluded session by allowing the user to reconnect with the same agent based on the activation of the link. The reconnection between the user and the same agent treats the extension of the prior concluded session. If the user activates the link after the predetermined period of time, the user may be connected to any agent, which is considered as a new session. In one embodiment, a link embedded within the summary message encodes therein information identifying the user, the agent, and certain metadata about the previously concluded session.

When such a link is activated, such information is obtained from the link and the same agent is identified. If the activation of the link was activated within the predetermined period of time from the time the message was sent, the same agent is connected with the user. In such a scenario, the current session is considered as an extension of a prior session. For example, the information captured and recorded during the prior session may be retrieved and utilized for the current session for the purpose of capturing interactions between the user and the agent. The system running a custom algorithm can also be configured to, if the same agent is busy or unavailable at the time of request and within the allowed duration, display a list of agents with similar traits and skills of the same agent. Otherwise, any available agents can be assigned to the user, which may be the same or different agent, and the current session will be considered as a new session instead of an extension of a prior session.

According to a further aspect of the invention, an interaction context object (also simply referred to as an interaction, interaction context, or interaction session) is created when a user interacts with content associated with a client, which may be monitored by an interaction monitoring module hosted by a server. The interaction context object is utilized as a container, a carrier, or a support session vehicle to contain, carry, or store any information associated with a current instance of interaction session during the life span or life cycle of the interaction session or browsing session (also referred to as a journey or user journey). The user interactions, such as browsing history of the current interaction session, may be captured and recorded in the interaction context object. The interaction context object is passed amongst the components that process or respond to user interactions or requests. Those components may also record activities and data they produce or collect during the interaction session in the interaction context object. When making a decision, such as a matching decision between a user and an agent, all of the information contained in the interaction context object may be considered as decision making factors or parameters. Once the current interaction ends, the information stored in the interaction context object may be stored as part of user interaction history. The information stored in the interaction context object may also be analyzed and the associated parties, such as user profile and agent profile(s), the associated client(s), may be updated accordingly.

According to one embodiment, a signal is received by an interaction monitor or monitoring logic, where the signal represents a user interaction with content provided by a content server, for example, via a mobile application of a mobile device of a user. In response to the signal, the interaction monitor determines whether there is an existing interaction context object that has been previously created for the current instance of interaction session. If so, the interaction monitor captures the updated interaction information (e.g., content type, universal resource locator or URL of the content, click event, etc.) from the signal and updates the interaction context object. If there is no interaction context object for the current interaction session, a new interaction context object is created for the current interaction session. When subsequently a request to connect the user with an agent is received, the interaction context object is passed to a next processing logic of a next processing stage, such as, for example, an agent matching engine, to perform whatever operations that are required. Any data or information involved during the operations may also be captured and stored in the interaction context object. Any decision made during each processing stage may be made based on the totality of the information contained in the interaction context object (e.g., user profile, agent profiles, real-time user data, applicable rules/algorithms, client information, survey, etc.). Note that throughout this application, the terms of "rule," "algorithm," or "formula" are interchangeable terms. Under some circumstances, a rule is utilized for making a decision, while an algorithm or formula may be used in other situations. In some scenarios, a combination of a rule and an algorithm or formula may be utilized.

FIG. 1A is a block diagram illustrating an agent matching system for matching a user with an agent according to one embodiment of the invention. An agent matching system is also referred to as a personalization system that provides agent matching services in a personalized manner in addition to skill matching. Referring to FIG. 1A, system 100 includes, but is not limited to, one or more client devices 101-102 communicatively coupled to one or more servers 104 and content servers 106 over network 103. Sever 104 may represent a cluster of servers, which may collectively represent a support center. The support center provides support services to users of client devices 101-102 on behalf of a variety of clients, such as enterprise or corporate clients that provide products and/or services to the users. Content/data servers 106 may include web servers, application servers, content servers or other servers providing remote services (e.g. Web search, cloud storages, gaming, social networking etc.) for users of client devices 101-102. Network 103 may be any type of networks such as a local area network (LAN), a wide area network (WAN) such as the Internet/intranet, cellular networks, secured/open networks, wired/wireless networks or a combination thereof.

Client devices 101-102 may be any type of data processing devices such as a server, a personal computer (e.g., desktops, laptops, and tablets), a "thin" client, a personal digital assistant (PDA), a Web enabled appliance, a gaming device, a media player, or a mobile device (e.g., Smartphone), etc. For the purpose of illustration, throughout this application, a mobile device is utilized as an example of client devices 101-102. Each of client devices 101-102 may include one or more mobile applications (e.g., mobile applications 111-112) associated with one or more clients of server 104. Client device 101 may be referred to as a user device associated with a user or a customer of one or more clients. Client device 102 may be referred to as an agent device of an agent (also referred to as an expert) associated with an agent associated with one or more clients.

In one embodiment, server 104 includes, but is not limited to, agent connect system 115, multi-channel communication and routing system 118, and agent matching system 120. Routing system 118 may be located external to and communicatively coupled to server 104 via an application programming interface (APIs), where routing system 118 may be operated by a separate entity or organization (e.g., a third-part communication and routing system). In one embodiment, agent connect system 115 provides services to users to connect the users with agents by matching the users with agents using personalized information associated with the users and/or agents provided by agent matching system 120. Agent matching system 120 is also referred to as a matching/decision system, which performs complex decisions as described throughout this application, in addition to performing matching. In one embodiment, server 104 may represent a support center that provides support services to users or customers on behalf of a variety of clients (e.g., enterprise clients, corporate clients) that provide the products and services to the users. A client may be a product manufacturer, a retailer, a distributer, and/or a service provider.

For example, a client may maintain content distributed via content server 106 that allows mobile application 111 of user device 101 to access. In one embodiment, user interaction with the content provided at content server 106 and presented by mobile application 111 may be captured by an interaction monitor of agent connect system 115 and/or agent matching system 120 (not shown). In one embodiment, an interaction context object is created for each instance of interaction session. The interaction context object (or simply referred to as an interaction or interaction context) may be identified based on a user identifier (ID), which may be determined based on a device ID of device 101 and an application ID of mobile application 111. Alternatively, a user ID may be generated based on a combination one or more of a username, a password, a device ID, and an application ID. The interaction context object stores any user interactions captured including, but are limited to, user actions (e.g., clicking particular button such as "help" or "sales" button), browsing history of the current browsing session, URL or URI (universal resource indicator) string of the content, and/or a specific response from the user (e.g., response to question or survey), etc. The interaction context object may be used as a container or placeholder or vehicle for carrying information for tracking purposes of that particular instance of the interaction session.

When a user requests to connect an agent, the request and associated collected data is received by agent connect system 115. The request may be received directly from mobile application 111 of mobile device 101 or alternatively, from content server 106 that provides the content. For example, after the user browses the content presented by content server 106, the user may click on a "contact customer representative" or "help" button, such as a one-touch button from mobile application 111 or a button presented as part of a Web page presented by content server 106. In response to the request to connect, according to one embodiment, agent connect system 115 sends a request for matching to agent matching system 120 for a list of one or more agents that match the personality of the user. The request for matching may be transmitted from agent connect system 115 to agent matching system 120 via a set of APIs, referred to as agent matching service APIs. The request may include a user ID and a content ID identifying the content the user currently interacting with (e.g., URL of the content). In one embodiment, agent connect system 115 may pass the corresponding interaction context object or a pointer of the interaction context object to agent matching system 120.

In response to the request for matching, in one embodiment, matching engine 122 accesses integrated data sources 128 to obtain static user information, dynamic user information (also referred to as real-time user information), agent profiles of a pool of agents, as well as other related information such as user history with agents. Static user information refers to user information that unlikely change over a period of time, such as, for example, user contact information (e.g., name, address, email address, phone numbers), user demographic information (e.g., gender, marital status, ethnicity, education, etc.), user psychographic information (e.g., interests, associations). The static user information may be maintained as part of a user profile stored in a user database or user account. Dynamic user information refers to user information that often changes over a period of time, such as, for example, user income level, current location, revenue generated for a client, loyalty to the client, social influence of the user, etc. The static user information may be stored in a user database or user account associated with the user of user device 101, which may be maintained in a persistent storage device associated with agent matching system 120 or server 104.

In one embodiment, the dynamic user information may be collected in real-time by real-time data collector 126. Real-time data collector 126 (also referred to as a dynamic data collector) communicates with a variety of external data sources 105 via a set of respective APIs over a network. Real-time data collector 126 may distribute the data collection to a variety of distributed data collection nodes over a network. External data sources 105 may be maintained by the corresponding client that provides the content at content server 106 or provides mobile application 111 of user device 101. Alternatively, external data sources 105 may be maintained by one or more third parties. External data sources 105 include, but are not limited to, customer relationship management (CRM) systems 131 social feeds or social networking sites 132, social influence providers 133 (e.g., Klout™), credit bureaus 134, enterprise resource planning (ERP) systems 135, public records 136, and survey systems 137.

Based on the static user information, dynamic user information, and the user interactions at the point in time, matching engine 122 evaluates via an algorithm these user information with agent information obtained from agent profiles of the agents in the pool to derive a list of one or more agents or agent candidates. By using the dynamic user information obtained at the point in time, agents with better matched personality can be identified. In one embodiment, the interaction context object may be used to store the static and dynamic user information. The interaction context object may be passed from agent connect system 115. Matching engine 122 performs the matching based on the user information stored in the interaction context object using a set of agent matching rules and/or algorithms 124 that is specifically associated with the client. Note that agent matching system 120 may provide personalization or matching services to a variety of clients as a multi-tenant system. Each of the clients may have a different agent matching rules/algorithms describing how their customers are matched with their associated agents. The agent matching rules/algorithms of a client may be configured by an administrator of the client via a configuration interface (e.g., graphical user interface or GUI or API maintained by agent matching 120 or server 104). The agent matching rules/algorithms of a client may be stored in a client database or client account associated with the respective client.

Once the list of one or more agent candidates has been identified by matching engine 122, the list of agent candidates is then transmitted to agent connect system 115. Agent connect system 115 may forward the list of agent candidates to user device 101 to be presented to the user via mobile application 111. Alternatively, agent matching system 120 may directly send the list of agent candidates to user device 101 for user selection. In response to a user selection of one of the agent candidates, agent connect system 115 communicates with routing system 118 to invoke routing system 118 to connect user device 101 with an agent device of the selected agent, in this example, agent device 102. A communication session is established between the user and the selected agent using a communication channel that the user and the selected agent both agree upon. Alternatively, agent connect system 115 may select the agent without presenting the list to user and requests routing system 118 to connect the user with the selected agent.

In one embodiment, agent connect system 115, routing system 118, or agent matching system 120 may further transmit at least a portion or all of the interaction context object to agent device 102, such that the agent has all the necessary information during the communication session. The interactions between the user and the agent during the communication session may also be recorded and stored in the interaction context object, which may also be stored as part of interaction history. The information contained in the interaction context object may also be analyzed and used to update the user profile and the agent profile, as well as other data such as a client database associated with the client. A report of the analysis and/or the actual information of the interaction context object may also be transmitted to a client backend system, such as the CRM and/or ERP systems associated with the client. Such information may be used to further refine the agent matching rules/algorithms for future agent matching.

According to one embodiment, real-time data collector 126 communicates with a variety of external data sources 105 to determine certain dynamic user data that can be used to determine a type of the user, an intent of the user, and a user value representing a relationship of the user with respect to the client. In one embodiment, real-time data collector 126 communicates with one or more backend systems of the client, such as CRM system 131 and/or ERP system 135, as well as other systems (e.g., survey system 137), via a set of preconfigured APIs to determine or calculate a revenue score and a cost score of the user. A revenue score (e.g., a first score) represents overall revenue the user has generated for the client. A cost score (e.g., a second score) represents the overall cost for the client to provide services to the user in the past. A user value is then dynamically determined based on at least the revenue score and the cost score, according to a predetermined user value determination algorithm. A list of agent candidates may be identified based on the user value and the user intent. The user intent may be determined based on the user interactions or browsing history with the content during the current browsing or user session at the point in time.

In one embodiment, the user value may also be determined further based on a loyalty score (e.g., a third score), an adoption score (e.g., a fourth score), and an influence score (e.g., a fifth score). An influence score (also referred to as a social influence score) represents social influence of a user. Social influence occurs when one's emotions, opinions, or behaviors are affected by others. Social influence takes many forms and can be seen in conformity, socialization, peer pressure, obedience, leadership, persuasion, and sales and marketing. An influence score may be obtained by communicating with one or more social feeds or social aggregators such as Klout™. A social influence provider uses social media analytics to rank its users, referred to as an influence score which is a numerical value within a predetermined range (e.g., 1 to 100). In determining the influence score, it measures the size of a user's social media network and correlates the content created to measure how other users interact with that content. For a social influence calculator may use a variety of social media data, such as Bing™ Facebook™, Foursquare™, Google+™, Instagram™, LinkedIn™, Twitter™, YouTube™, and Wikipedia™ data, to create social user profiles. The user social profiles are assigned a unique social influence score, with higher scores corresponding to a higher ranking of the breadth and strength of one's online social influence.

In one embodiment, a social influence level of the user is received from the social feeds or social aggregators. The social influence level is converted into an influence score using an influence level conversion algorithm. An influence score represents the overall influence of the user in a social environment or in a specific network domain. A loyalty score may be obtained from CRM system 131 associated with the client and/or survey data associated with the user, where the loyalty score presents how loyal the user is with respect to the client. An adoption score rates user adoption level of new products and/or services provided by the client, which may be derived from CRM 131 of the client.

In one embodiment, the user value determination algorithm is a weighted formula in which each of the scores is associated with a specific weight factor or coefficient. A weight factor or coefficient represents how important the corresponding score is to be considered when calculating the user value. The weight factors or weight coefficients may be configured by an administrator of the client via a configuration interface. Such user value determination algorithm or formula may be stored in a client database associated with the client. In one embodiment, a user value is used to match the user with agents based on agent values of the agents specified as an agent attribute or agent property in the agent profiles. An administrator of the client may specify that certain types of agents (e.g., certain types of personality) can provide services to a user with a certain range of user values.

According to another embodiment, once a list of agents has been determined by matching engine 122 based on matching rules/algorithms 124 associated with the client, a personalized workflow (also referred to support workflow or personalized journey workflow) is dynamically generated, where the personalized workflow represents a flow process that is specifically configured to provide support services to the user. A workflow may be generated based on a workflow template or workflow rule associated with the client, which may be configured by an administrator of the client. In a multi-tenant environment, different workflow templates may be configured for different clients. Different workflow templates may also be configured for different products or services or different campaigns of the same product or service of the same client. For example, a workflow template may be identified based on a combination of one or more of a user device ID, a mobile application ID, and content (e.g., URL/URI of the content) being browsed at the point in time.

In one embodiment, a support workflow includes multiple workflow stages. Each workflow stage is associated with one of the identified agents that provides support services to the user during the corresponding workflow stage. Each workflow stage is also associated with a condition or criteria, which when satisfied, would escalate or advance the workflow process from one workflow stage to another workflow stage. The workflow process starts with identifying a first agent in a first workflow stage of the workflow and establishing a communication session between a user device of the user and a first agent device of the first agent. During the first communication session, if a first criteria specified in the first workflow stage is met, the workflow process then advances to a second workflow stage as the next workflow stage. The workflow process may inform the user that a second agent will be in touch with the user. A second communication session is then established between the user device of the user and a second agent device of a second agent associated with the second workflow stage. The criteria of a workflow stage may be 1) requested by user; 2) requested by the agent; or 3) dissatisfaction of the user obtained through a survey, or other collected data during or at the conclusion of the first communication session. The condition(s) and/or criteria may be configured by an administrator of the client. The rationale behind this configuration is that if one agent cannot solve a user's problem, another agent may be brought in to help until the user is satisfied.

According to one embodiment, an interactive event driven survey system is utilized to survey or collect user satisfaction or feedback data concerning the support session provided by the agent or agents. In one embodiment, a server representing a survey system receives an interactive event at the beginning, during, or at the conclusion of a communication session between a user and an agent discussing content presented to the user by a client (e.g., enterprise or corporate client). In response to the interactive event, a survey is identified based on the interactive event, where a survey system of server 104 (not shown) may maintains many surveys that have been configured to be associated with a variety of different interactive events.

In one embodiment, each survey is represented by a survey workflow having s series of survey workflow stages. Each survey workflow stage is associated with a specific survey question and a set of one or more rules/algorithms that specifies the manner the corresponding question should be presented to the user. In one embodiment, for each of the questions in the survey workflow stages, the corresponding set of survey rules/algorithms is examined to determine whether and how the question should be sent to the user. Based on the survey rules/algorithms, the question is transmitted to the user device and a user response is received in return. Subsequently, a user profile and/or an agent profile may be updated based on the survey responses. A survey workflow and the corresponding survey rules/algorithms may be configured by an administrator of the corresponding client via a configuration interface and stored in a client database associated with the client.

As described above, an interaction context object is created when a user initially interacts with content associated with a client or when the user requests to connect with an agent. The user interactions may be monitored by an interaction monitoring module hosted by a server. The interaction context object is utilized as a container, a carrier, or a support session vehicle to contain, carry, or store any information associated with a current instance of interaction session during the life cycle of the interaction session. The user interactions, such as browsing history of the current interaction session, may be captured and recorded in the interaction context object. The interaction context object or a pointer of the interaction context object is passed amongst the components that process or respond to user interactions or requests. Those components may also record the activities and data they produce or collect in the interaction context object. When a decision, such as a matching decision between a user and an agent, all of the information contained in the interaction context object may be considered as decision making factors or parameters. Once the current interaction ends, the information stored in the interaction context object may be stored as part of user interaction history. The information stored in the interaction context object may also be analyzed and the associated parties, such as user profile and agent profile(s), the associated client(s), may be updated accordingly.

Referring back to FIG. 1A, in this embodiment, agent connect system 115 and agent matching system 120 are integrated within and hosted by server 104. According to another embodiment, agent matching system 120 may be operated by a separate entity or organization. Agent matching system 120 may provide personalization services (e.g., agent matching services) to different agent connect systems, which may be operated or owned by different entities or organizations, via a set of APIs in a client-server configuration, as shown in FIG. 1B according to one embodiment.

Figure 1B:
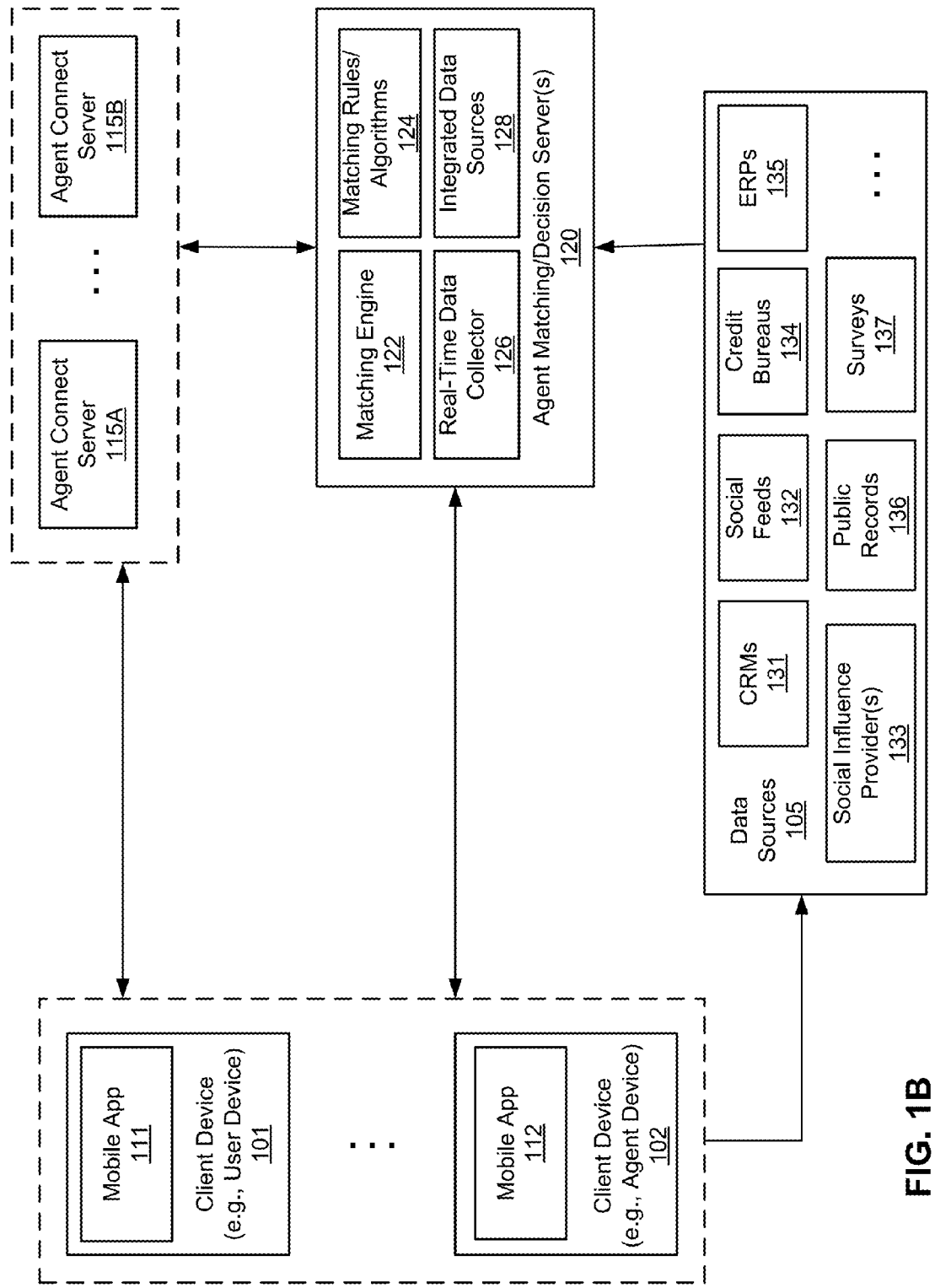

Referring to FIG. 1B, in one embodiment, an agent matching system operates in or is hosted by an agent matching server or a cluster of servers 120, which provides agent matching services to a variety of agent connect servers 115A-115B in a client-server manner. Agent connect servers 115A-115B may be associated with different support centers or contact centers that provide support services to customers of their respective clients, such as, for example, product or service providers, retailers, or distributers, etc. Agent connect servers 115A-115B are configured to connect users or customers with their respective agents, based on the personalization matching information of agent matching server 120. Alternatively, agent connect servers 115A-115B may represent application servers or backend servers that operate behind a frontend server such as Web or content servers of a variety of enterprise clients, such as, BestBuy® or Recreational Equipment Inc.® or REI. For example, when a user browses the content presented by a Web server or content server of REI using an REI mobile application, the user interaction may be captured and recorded, for example, in a corresponding interaction context object. When the user click on a button requesting to connect with an agent, the corresponding agent connect system receives such a request. The agent connect system in turn sends a request to agent matching server 120 for matching agents. The request may include a user ID that identifies the user and a content ID identifying the content of the interaction session. In response, agent matching server 120 performs the matching using the techniques described throughout this application and returns a list of one or more agents to the agent connect system. The agent connect system then connects the user with one of the agents in the list by establishing a communication session between a user device and an agent device of the selected agent.

Figure 2:
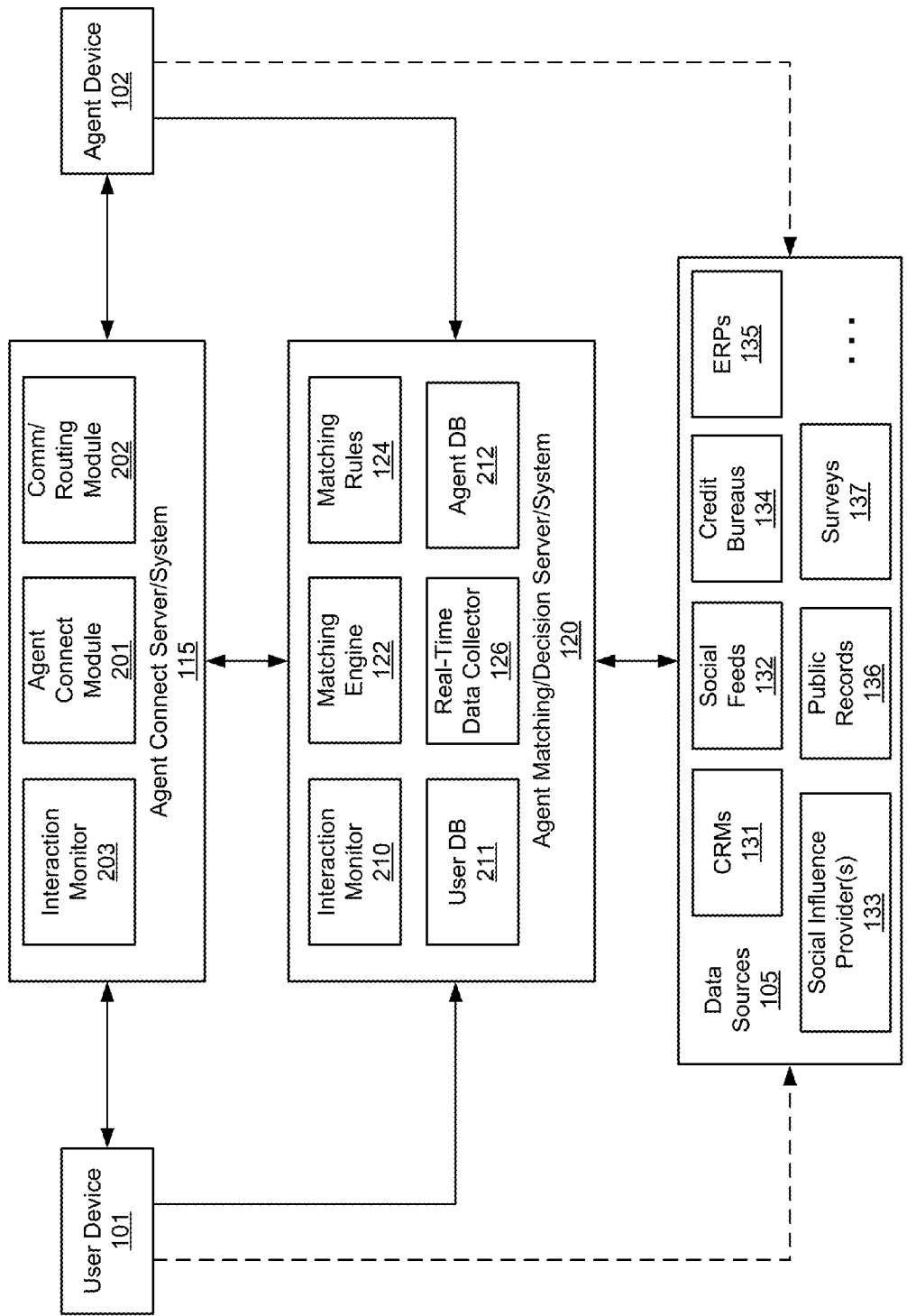
FIG. 2 is a block diagram illustrating a network configuration of an agent matching system according to one embodiment of the invention.

FIG. 2 is a block diagram illustrating a network configuration of an agent matching system according to one embodiment of the invention. The system as shown in FIG. 2 may be implemented as part of the systems shown in FIGS. 1A and 1B. Referring to FIG. 2, in this embodiment, agent connect system 115 is communicatively coupled to agent matching system 120, either through integration or over a network. Although there is one agent connect system shown, it will be appreciated that multiple agent connect systems can be communicatively coupled to agent matching system 120 similar to the configuration as shown in FIG. 1B. Similarly, multiple agent matching systems may be deployed and hosted in multiple servers in a distributed manner that collectively provide agent matching services to a variety of agent connect systems.

In one embodiment, agent connect system 115 includes, but is not limited to, interaction monitor 203, agent connect module 201, and communication and routing module 202. Interaction monitor 203 is responsible for monitoring and receiving user interaction and interaction data from a mobile application running within user device 101 and/or a content server that the mobile application accesses. The user interaction may include the user actions such as clicking events of certain buttons or accessing of links presented by the mobile application. Alternatively, the user interaction may include a URL/URI string associated with the content being accessed. Interaction monitor 203 may capture the user interaction and store in a data structure (e.g., interaction context object) and pass the user interaction information to agent matching system 120.

Alternatively, agent matching system 120 may also maintain interaction monitor 210 to monitor and capture the user interaction from user device 101. The mobile application of user device 101 and/or the content server may be configured to capture and send user interaction to agent matching system/server 120 and/or agent connect system/server 115. Similarly, an agent application running within agent device 102 may also be configured to send agent interaction information to agent connect system 115 and/or agent matching system 120. The actions performed by user device 101 and agent device 102 on other data such as Web sites may be captured by other external data collectors, which may be stored in any one of the external data sources 105. Note that as described above, the mobile application (also referred to as a user application) running within user device may be associated with or provided by a client (e.g., a product/service provider, retailer, distributer) associated with agent connect system 115. Similarly, the agent application running within agent device 102 may be associated with a client corresponding to agent connect system 115 or alternatively, the agent application may be associated with an entity or organization that operates agent matching system 120.

In one embodiment, interaction monitor 203 and/or interaction monitor 210 monitors and captures the user interaction of a user operating user device 101 while the user is browsing or accessing the content. As described above, an interaction context object may be created to record and store the browsing history of the user during the current browsing session including the click events and the URIs or URIs of the content accessed. When a user requests to connect with an agent, the request is received by agent connect module 201 of agent connect system 115. For example, the user may click a "help" or "sales" button (also referred to as a live connect button or one-touch button) presented as part of the content. In response to the click event, a signal or request is transmitted from the user device or from the content presentation server to agent connect system 115. In response to the request, agent connect module 201 sends a request to agent matching system 120, which may be received by matching engine 122.

In response, matching engine 122 matches the user with agents based on user interaction, static user information retrieved from user database 211, dynamic or real-time user information obtained by real-time user collector 126 from external data sources 105, and agent profiles of agents retrieved from agent database 212. The matching is performed based on a set of agent matching rules/algorithms 124 that are specifically configured for the client that provides the content and/or the user application. A list of one or more agents is determined based on the matching and the list of agents is returned to agent connect system 115. The list of agents may be transmitted to user device 101 for user selection or alternatively, an agent is selected from the list by agent connect module 201. Agent connect module 201 then invokes routing module 202 to establish a communication session between user device 101 and agent device 102 of a selected agent. Routing module 202 may incorporate some or all of the functionality of multi-channel communication and routing system 118 of FIG. 1A. Alternatively, routing module 202 communicates with an external communication and routing system via a set of APIs to perform the actual routing.

Figure 3:
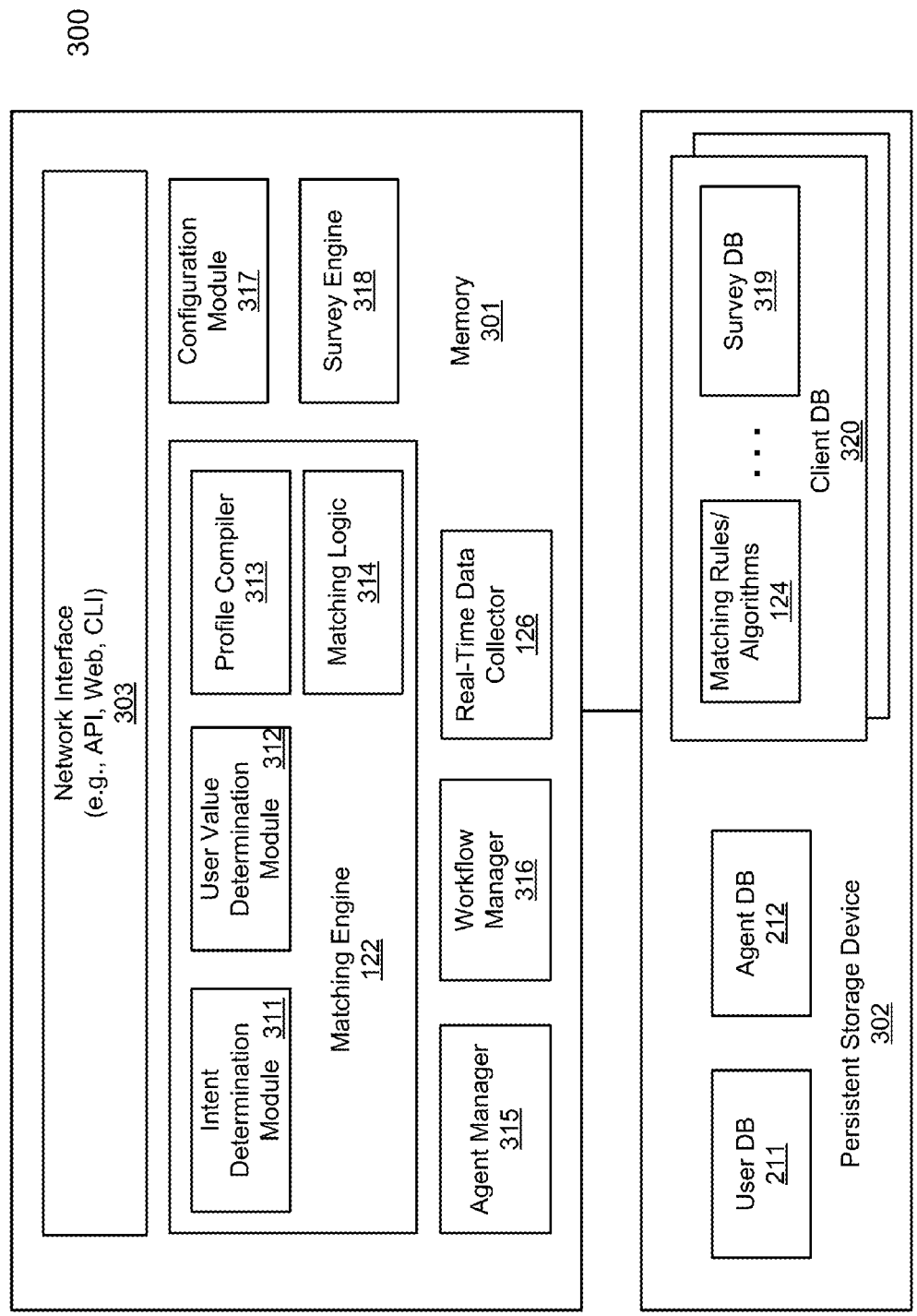
FIG. 3 is a block diagram illustrating an example of an agent matching system according to one embodiment.

FIG. 3 is a block diagram illustrating an example of an agent matching system according to one embodiment. System 300 as shown in FIG. 3 may be implemented as part of agent matching system 120 described above. Referring to FIG. 3, system 300 includes, but is not limited to, memory 301 and persistent storage device 302 coupled to one or more processors (not shown), as well as other components such as a network interface device. In one embodiment, system 300 includes matching engine 122, agent manager 315, workflow manager 316, real-time data collector 126, configuration module 317, and survey engine 318, which may be loaded into memory 301 from persistent storage device 302 and executed by one or more processors (e.g., microprocessors, central processing units or CPUs). Persistent storage device 302 can be a variety of non-volatile storage devices (e.g., hard disks, flash memory devices) that can store a variety of data such as user database 211, agent database 212, and client databases 320 for a variety of clients. Each of client databases is associated with a specific client to store per-client based data such as agent matching rules/algorithms 124, survey database 319, and other data, which may also be loaded in memory 301 and accessed by the above components or modules.

In one embodiment, matching engine 122 includes, amongst others, intent determination module 311, user value determination module or user value calculator 312, profile compiler or generator 313, and matching logic 314. Intent determination module 311 is to determine a user intent based on the user interactions with the content at the point in time. As described above, when a user interacts with the content, the user actions and/or the browsing history may be recorded by an interaction monitor and stored in an interaction context object. When subsequently the user initiates a request to connect with an agent, for example, to further discuss the content the user is accessing, a request is received by matching engine 122 via network interface 303.

Network interface 303 may represent any of the communication interfaces, such as APIs, Web interfaces, a command line interface (CLI), or a combination thereof. One can access, with proper authentication and authorization, the resources or services provided by agent matching system 300 via network interface 303 using a variety of communication or network protocols (e.g., transport control protocol/Internet protocol or TCP/IP, hypertext transport protocol or HTTP, representational state transfer or REST protocol, etc.). Network interface 303 may include a set of APIs for different types of communications amongst different parties. One of the APIs may be used to communicate with an agent connect system such as agent connect system 115.

In response to the request for connecting an agent, in one embodiment, user data of the user is collected, including the static user data retrieved from user database 211 associated with the user and dynamic user data obtained from external data sources 105 by real-time data collector 126. The collected user data may be stored in an interaction context object of the current browsing session or user session. In addition, intent determination module 311 determines a user intent based on the user interaction of the current browsing session or current user session, as well as other user data such as user interaction history. Intent determination module 311 may determine the user intent using a set of intent determination rules/algorithms that have been specifically configured for the corresponding client. The intent determination rules/algorithms may further be associated with a specific product, service, and/or content associated with the current browsing session, as the client may provide multiple products, services, and/or content. The intent determination rules/algorithms may be stored in client database 320 associated with the client, for example, as part of matching rules/algorithms 124. Alternatively, the intent determination rules/algorithms may be stored in a rule database and indexed based on client IDs of the clients and/or content IDs of content.

In one embodiment, user value determination module 312 calculates a user value based on dynamic user data collected by real-time data collector 126 from external data sources 105. The user value represents a relationship of the user with respect to a client at the point in time, such as how valuable the user is with respect to the client. The user value may be determined based on a variety of static and/or dynamic user data, such as, for example, a revenue score, a cost score, a loyalty score, an adoption score, and an influence score, which will be described in details further below. User profile information and/or an agent profile may be compiled by profile compiler 313, where the information of the user profile may also be stored in the interaction context object. Based on all of the user data and agent data, as well as the history data, matching logic 314 matches the user with a pool of agents maintained in agent database 212 based on the user profile and corresponding agent profiles to derive a list of one or more agents or agent candidates. The list of the agents is then returned to a requester, such as an agent connect system or server.

In one embodiment, the matching process may be performed by matching logic 314 based on a set of agent marching rules/algorithms 124. As described above, agent matching rules/algorithms 124 may be specifically configured by an administrator of the corresponding client by configuration module 317 and stored in the corresponding one of client databases 320. For example, an administrator of the client may log in and configure the rules/algorithms via configuration interface, which may be part of network interface 303. In response to the user commands for configuration, configuration module 317 configures the rules/algorithms and stores the rules/algorithms in client database 302.

Agent database 212 stores all the information related to the agents, which may be managed by agent manager 315. Agent database 212 stores the agent profiles of the agent. Agent database 212 may further store the state or status of each agent, such as whether an agent is available at the point in time. An agent can log in and set its status from its agent application via a configuration interface as part of network interface 303. In response to the agent update, agent manager 315 updates the corresponding agent profile of the agent in agent database 212.

Once the list of agents have been determined based on the matching, according to one embodiment, a workflow (also referred to as a support workflow) is generated by workflow manager 316 based on a workflow template (also referred to as a support workflow template) associated with the client. The workflow template may be previously configured by an administrator of the client for a particular product or service provided by the client. The workflow represents a support processing flow that has been personalized for the user based on the matched agents. The workflow includes a series of one or more workflow stages. Each workflow stage corresponds to one of the agents in the list and each workflow stage includes a condition or criteria, which when satisfied, the current workflow stage is advanced to a next workflow stage. For example, the support processing flow starts with a first workflow stage and a first communication session is established between a user device and a first agent device. During the first communication session, if a first criteria corresponding to the first workflow stage is satisfied, for example, a failure signal received from either the user device or the agent device, or a response from the user via a survey, the process advances to a second workflow stage. A second communication session is established between the user device and a second agent device of a second agent corresponding to the second workflow stage, and so on, until the user is satisfied.

According to one embodiment, survey engine 318 is responsible for identifying a survey from survey database 319 in response to an interactive event. Survey database may include a variety of surveys associated with a particular client, which may be configured by an administrator via a configuration interface. A survey may be associated with a particular interactive event of a particular product, service, or content of a particular client. A survey may be configured as a survey workflow having a series of survey workflow stages. Each survey workflow stage is associated with a survey rule that governs how and when the corresponding survey should be sent to a user device and/or an agent device. Note that survey engine 318 and survey database 319 may be implemented as a separate survey system that is communicatively coupled to agent matching system 300 via a set of API or over a network. In such a scenario, the survey system provides surveys as a survey service in a client-server manner.

Figure 4:
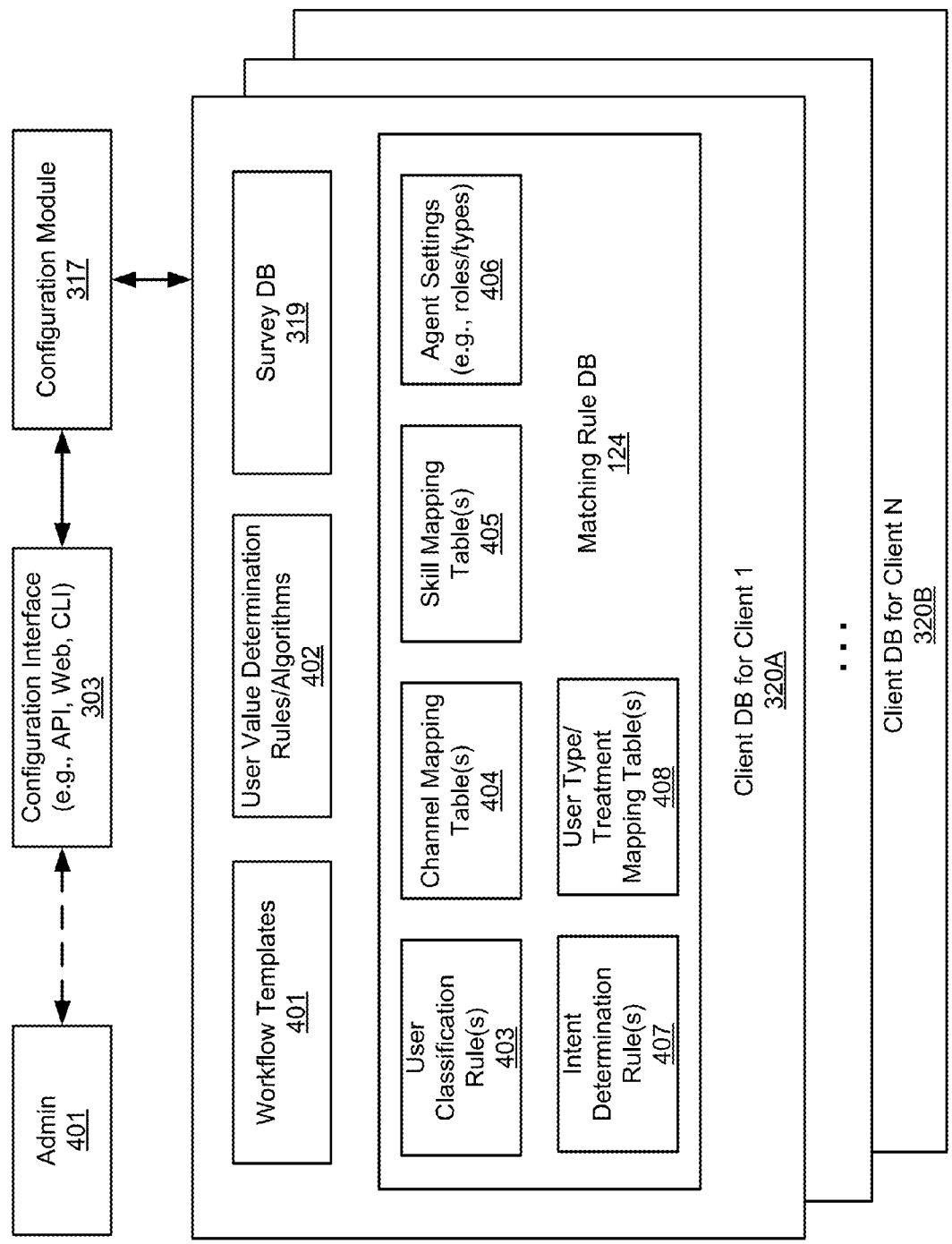
FIG. 4 is a block diagram illustrating an example of a client database according to one embodiment of the invention.

FIG. 4 is a block diagram illustrating an example of a client database according to one embodiment of the invention. Referring to FIG. 4, client databases 320A-320B may represent different client databases of different clients, which may be implemented as part of client databases 320 of FIG. 3. Each of the client databases 320A-320B includes matching rule database 124, workflow templates or rules/algorithms 401, user value determination rules/algorithms 402, and survey database 319. These databases or data structures may be configured by corresponding administrator 401 of the clients via configuration interface 303 and configuration module 317.

In one embodiment, matching rules/algorithms 124 include user classification rule(s) 403, channel mapping table(s) 404, skill mapping table(s) 405, agent settings 406, intent determination rule(s) 407, and user type/treatment mapping table(s) 408. These rules/algorithms or tables 401-408 are per-client based rules/algorithms. That is, each client may have a different set of rules/algorithms or tables 401-408, which may be configured by an administrator associated with the corresponding client.

As described above, user value determination rule or algorithm 402 is used to calculate or determine a user value representing a relationship between the user and the client. In one embodiment, the user value is calculated or determined based on at least some of a revenue score, a cost score, an influence score, a loyalty score, and an adoption score, using user value determination rule 402. The formula 402 to calculate a user value may be a weighted formula based on different scores. A weight factor or coefficient associated with each of the score may be the same or different for the same client or different clients. Accordingly, user values of a user for different clients may be different, which represent different levels of relationship between the user and different clients.

Intent determination rule 407 may be used to determine a user intent at the point in time in response to the specific user interactions captured during the same prosing session. User classification rule 403 is used to classify a user based on the user information, user intent, and interaction to derive a type of user. A client may have a predetermined number of different user types. In one embodiment, based on the user type, a treatment or treatments may be determined based on user type/treatment mapping table or rule 408. A treatment specifies how a user with certain level or user type will be treated, such as, for example, certain types of agents equipped with certain skill levels and available communication channels (e.g., in-person appointment, voice, video, chat, email, etc.

The agents may be identified based on the skill set requirements for different types of users based on skill mapping table 405, and/or treatment requirements of different treatments. Channel mapping table 404 maps a type of agent to one or more communication channels that are available to the agent. Once the agents have been determined with proper available communication channels, a personalized support workflow is generated based on a workflow template selected from workflow templates 401 corresponding to the user interaction in question. As described above, a client may maintain multiple workflow templates, one for each of the products or services the client provides.

Agent settings store 406 is used to store specific settings or configurations of agents that are associated with a particular client. The agent settings stored in agent settings store 406 may be different from the agent settings in agent database 212 of FIG. 3. Agent database 212 may store common information about the agents, such as static agent profiles. Agent settings 406 of agents may be related to customized agent settings for a specific client. The information of agent settings 406 may supersede the same or similar information stored in agent database 212. Note that an agent may represent multiple different clients for providing support services to customers of the clients. An expertise of an agent from one client to another may be different. A user value range of an agent may also be different from one client to another client for the purpose of matching a user with the agents. Similarly, the communication channels available to an agent may be different from one client to another client, because it incurs different cost structures for providing support services. When matching a user with agents, the above described client-based settings or configurations may be utilized and tailored to the specific client's needs. How these specific client-based information, rules/algorithms, and tables are utilized will be described in details further below.

Note that the database configuration as shown in FIG. 4 is illustrated for the purpose of illustration only. The rules/algorithms may be maintained by a specific database that store all of the corresponding types of rules/algorithms of all clients. In such a configuration, the rules/algorithms may be indexed by a client ID and/or content ID. For example, survey database 319 may store all of the surveys for all of the clients and each of surveys stored therein may be indexed and identified by a client ID and an interactive ID. Other configurations may also be applied.

Figure 5:
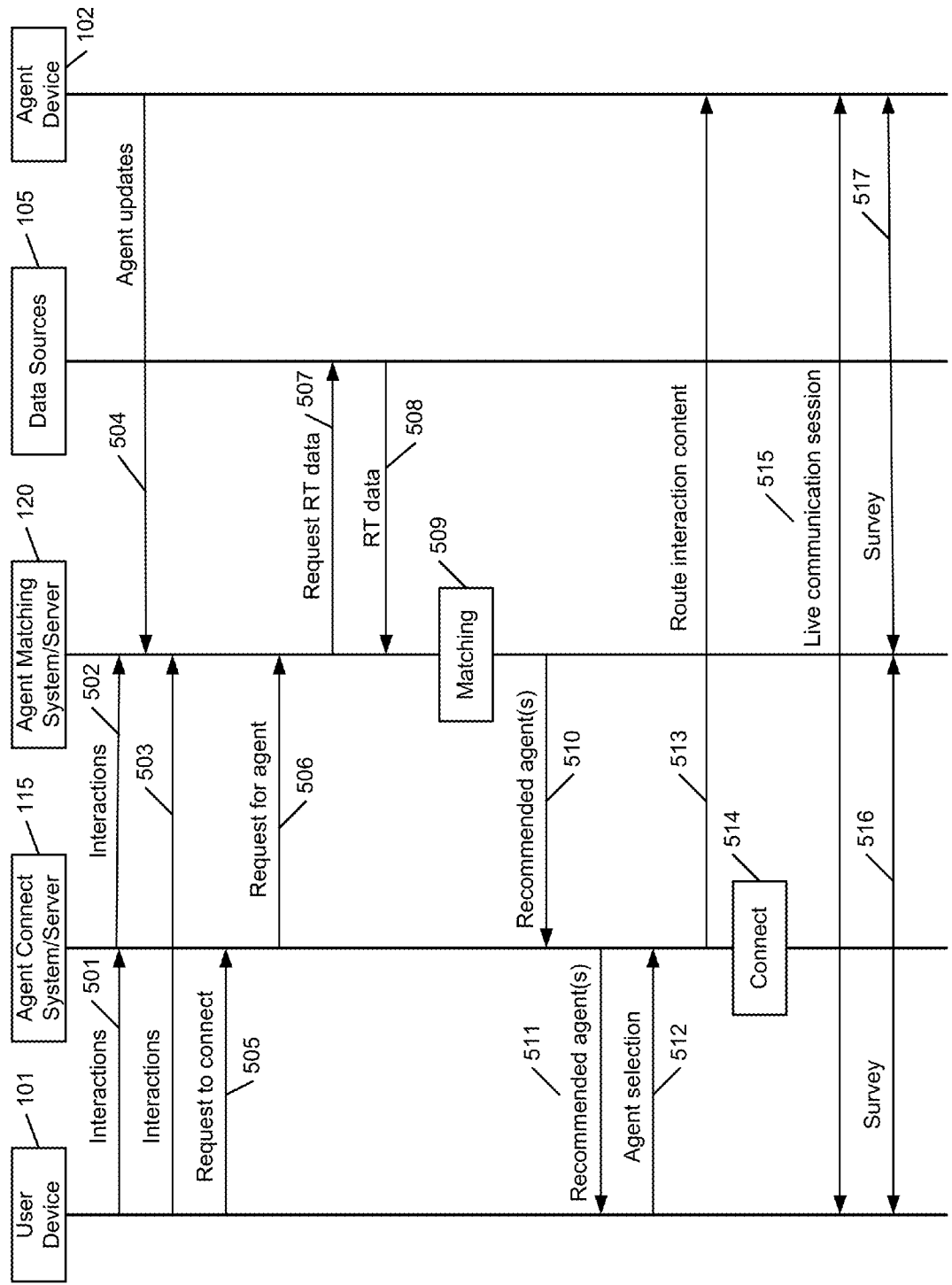
FIG. 5 is a flow diagram illustrating a processing flow amongst multiple parties for matching users with agents according to one embodiment of the invention.

FIG. 5 is a flow diagram illustrating a processing flow amongst multiple parties for matching users with agents according to one embodiment of the invention. Referring to FIG. 5, when a user of user device 101 interacts with content provided by an enterprise client, user device 101 sends information of the user interactions to agent connect system 115 via path 501, which in turn forwards the interaction to agent matching system 120 via path 502. Alternatively, user device sends the interaction directly to agent matching system via path 503. Meanwhile independently, agent device 102 sends the associated agent's status (e.g., availability) to agent matching system 120 via path 504. In response to the interaction, agent matching system 120 may create an interaction context object to record the user interactions.

Subsequently, when a user requests to connect with an agent, the request is received by agent connect system 115 via path 505. In response to the request to connect, agent connect system 115 sends a request for matching agent to agent matching system 120 via path 506. In response to the request for agent, agent matching system 120 compile all of the necessary user data, including sending a request for dynamic or real-time user data to external data sources 105 via path 507 and receives such user data via path 508 from external data sources 105. At block 509, agent matching system 120 performs the matching to derive a list of one or more agents. Agent matching system 120 sends the list of agents to agent connect system 115 via path 510. Agent connect system 115 in turn sends the list of agents to user device 101 via path 511 for user selection.

In response to a user selection of an agent received from user device 101 via path 512, agent connect system optionally routes interaction context to agent device 102 of the selected agent via path 513. Agent connect system 115 then establishes a communication session or causes a communication session to be established between user device 101 and agent device 102 at block 514. Thereafter, user device 101 and agent device 102 communicate with each other during the communication session 515. After the communication is concluded, a survey is sent to user device 101 via path 516 and/or agent device 102 via path 517.

Figure 6:
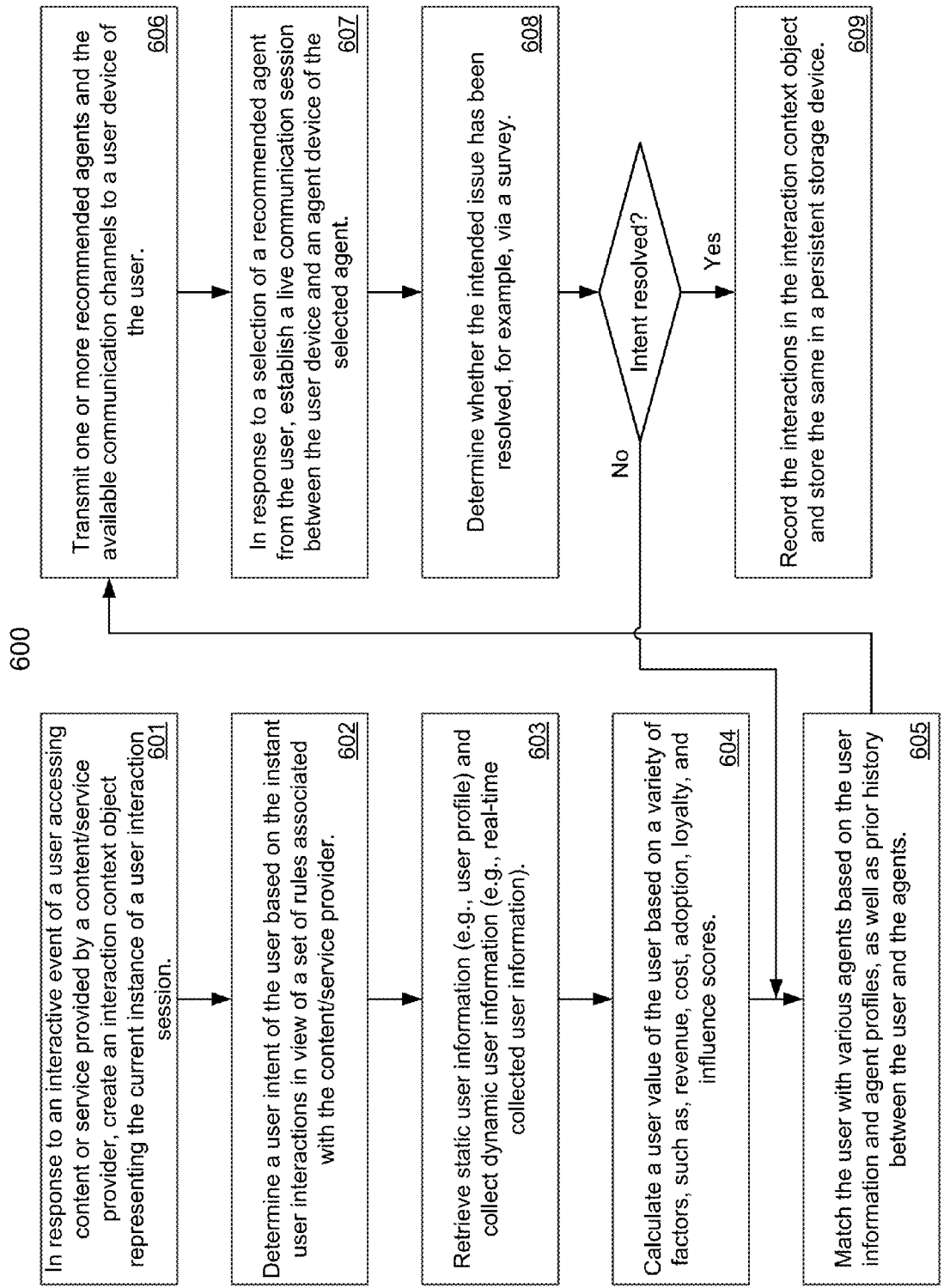
FIG. 6 is a flow diagram illustrating a process for matching a user with agents according to one embodiment of the invention.

FIG. 6 is a flow diagram illustrating a process for matching a user with agents according to one embodiment of the invention. Process 600 may be performed by processing logic which may include software, hardware, or a combination thereof. For example, process 600 may be performed by agent connect system 115 and/or agent matching system 120. Referring to FIG. 6, at block 601, in response to an interactive event of a user accessing content or service provided by a content or service provider as a client, processing logic creates an interaction context object representing the current instance of a user interaction session. At block 602, processing logic determines a user intent of the user based on the instant user interactions in view of a set of intent determination rules/algorithms associated with the client.

At block 603, processing logic retrieves static user information (e.g., user profile information) and collects dynamic user information (e.g., real-time user data) from one or more external data sources. In one embodiment, a real-time data collector communicates with an appropriate external data sources to collect the dynamic user information. For example, the data collector may send a user ID of the user to a CRM system and/or ERP system of the client to obtain the total revenue of the user, a cost incurred for providing services to the user, adoption information of the user, and loyalty information of the user. The data collector may send the user ID to one or more external social aggregator to obtain social influence information of the user. A user ID may be represented by a combination of one or more user attributes of the static user information, such as, name, address, phone number, age, gender, etc. that allow the data source to uniquely identify the user.

At block 604, a user value is determined based on a variety of factors, such as revenue, cost, adoption, loyalty, and influence scores. At block 605, processing logic matches the user with agents based on the user information (including user value) and agent profiles, as well as prior history between the user and the agents, to derive a list of recommended agents. At block 606, the list of recommended agents and their respective available communication channels are transmitted to a user device of the user. In response to a user selection of one of the recommended agents, at block 607, a communication session is established between the user device of the user and an agent device of the selected agent. At block 608, it is determined whether the user intent has been resolved and if so, at block 609, the recorded user interactions are stored in a persistent storage device. However, if the user intent has not been satisfied, the above operations may be iteratively performed to find another agent (e.g., a next workflow stage) to solve the issues, until the user is satisfied.

As described above, all interactions must begin with an interactive event. An interaction context object, also simply referred to as an interaction context or interaction, operates as a tracking mechanism, created when an interactive event occurs. The interaction context is the vehicle to traverse the customer experience journey defined and controlled by the agent matching system. The interaction context will contain all of the attributes (user and agent), user intent, user value along with other relevant agent and contact information. All interactions may be initiated by an event, which is essentially a "trigger" for the interaction. The source of that event will be from: 1) customer initiated, e.g., clicking or specifically requesting to interact with the business; 2) proximity initiated, e.g., initiated on behalf of the user, by the user's proximity to the client (e.g., via iBeacon and Geofence); and 3) life cycle initiated, e.g., through automated analysis of the user interaction history, profile or other relevant customer data, the client may initiate an interaction to or with a user.

User intent may be determined for or by a user. It is a textual depiction of what the user wants to accomplish during that interaction, i.e. sales, service, and/or support. The actual intent definitions will vary and may be quite granular dependent upon a specific client. An intent may an explicit intent specifically stated by the user application, e.g., clicking the "Get Help", "Shop" or "Buy" button. A user intent may also be an implicit intent that is implied by the user's history on the site or application. The intent category may be defined by the specific clients.

A user profile contains key identification information for an individual user. Typically a unique identification field provided by the client or determined by the agent matching system (i.e. phone number, email address, or device ID). A user value is a numeric value provided either by the client or determined by the agent matching system, representing the "worth" of the customer to the client. User attributes include demographic data and social data using data elements like age, gender, interests, activities. Geolocation of the user would also be an attribute.

There are two types of agents: self-service agents and human agents. A self-service agent targets are typically knowledge bases (KB), virtual assistants, and social forums. Self-service targets could service lower value customers or may be the first avenue for servicing high value customers, again depending on the business' servicing strategy. Human agents, as implied, are direct representatives of the clients and may be located in a central location (i.e. call center, headquarter) or in the field (i.e. store clerk, plumber, @Home, etc.)

Agents have specific properties, icons and avatars associated with them. These properties may be specifically assigned by an administrator, collected through an agent survey or analytically determined by the agent matching system. Expertise is a property or attribute directly associated with the user intent. It implies that this person has the skill to service the user's intent. A value range is a numeric range of user values which the agent is capability to support. Agent attributes may be textual data and real-time elements associated with the agent. Agent attributes are similar to user attributes of which agent attributes would be matched. These attributes would also include real time variables like presence, estimated wait time, state, expertise used, interaction type, location, etc., and survey results.

Agents do not have to be available to be presented for selection by the customer; this is also definable by the client. The actual status of the agent would be presented to the customer, and if possible a calculation of wait time in the event that they are unavailable. A channel is the designated communication's channel for an Interaction which the customer and agent will use to communicate. In some cases the channel is proprietary to an agent or designated by the client. Typical channels include chat, voice, short messaging services (SMS), email, video, face-to-face (appointment), answer engine, knowledgebase, and social forums.

In addition to connecting a user and an agent via the selected channel, these two sources will decide if an interaction has met the criteria for completion. A failure condition would escalate to the next agent or treatment type in the process. Success would allow the interaction to conclude. The criteria can be derived from users through a survey. Agents can determine that they cannot provide service set the criterion to "fail" allowing the interaction to move to a special treatment type. When the interaction concludes, then the associated agent, user, and interaction data will be recorded as a part of interaction history.

Figure 7:
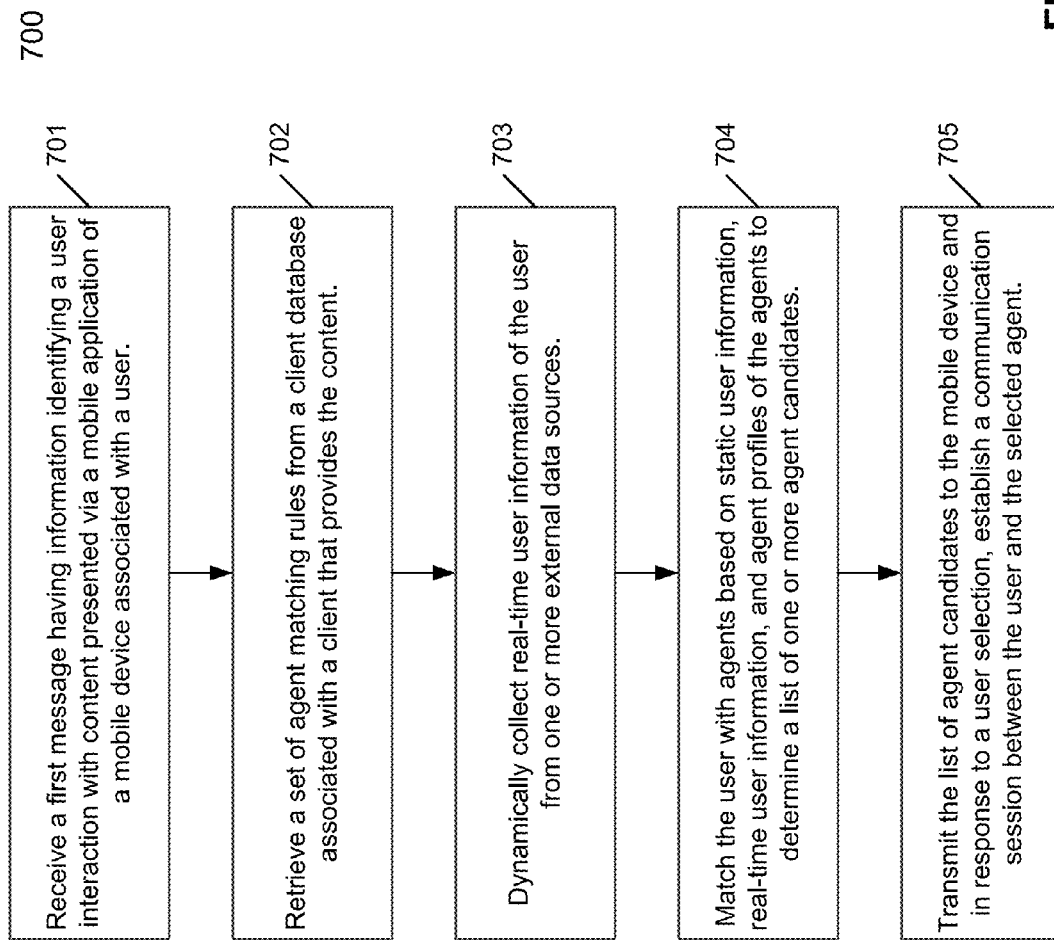
FIG. 7 is a flow diagram illustrating a process for matching a user with agents according to one embodiment of the invention.

FIG. 7 is a flow diagram illustrating a process for matching a user with agents according to one embodiment of the invention. Process 700 may be performed by processing logic which may include software, hardware, or a combination thereof. For example, process 700 may be performed by agent matching system 120. Referring to FIG. 7, at block 701, processing logic receives a first message having information identifying a user interaction with content presented via a mobile application of a mobile device of a user. In response to the first message, at block 702, processing logic retrieves a set of agent matching rules/algorithms from a client database associated with a client that provides the content and/or the mobile application. At block 703, processing logic dynamically collects real-time user information of the user from one or more external data sources. At block 704, processing logic matches the user with agents based on static user information, real-time user information, and agent profiles of the agents to determine a list of one or more agent candidates. At block 705, the list of agent candidates is transmitted to the mobile device of the user for user selection. In response to a user selection of one of the recommended agents, a communication session is established between the mobile device and an agent device of the selected agent.

Figure 8:
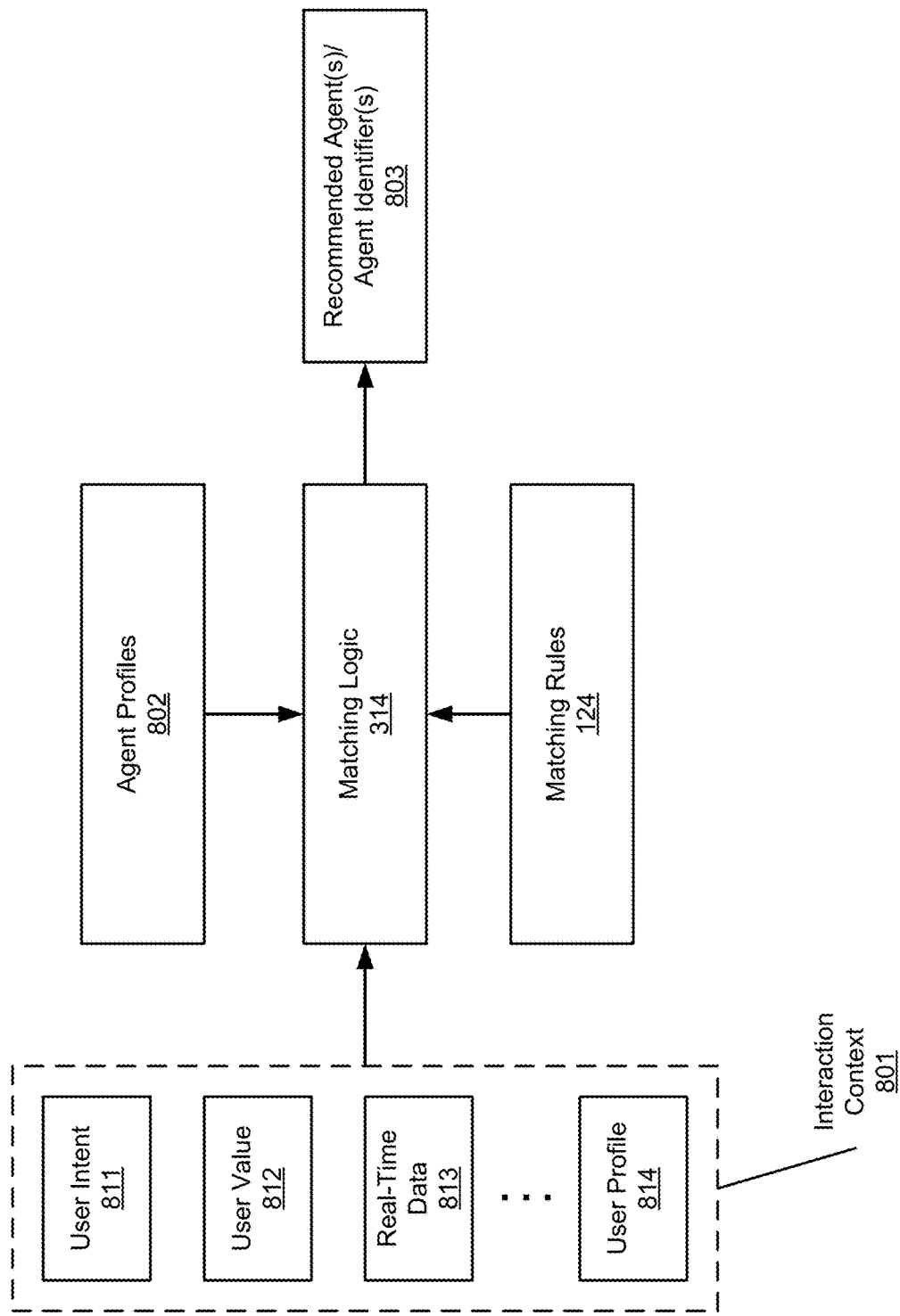
FIG. 8 is a block diagram illustrating a mechanism for matching a user with agents according to one embodiment of the invention.

FIG. 8 is a block diagram illustrating a mechanism for matching a user with agents according to one embodiment of the invention. Referring to FIG. 8, as described above, matching a user with agents is performed based on a totality of information maintained in an interaction context object, where the interaction context object operates as a container or vehicle carrying the information that has been "picked up" along the process. In this example, in addition to the user interactions such as user actions with the content and URL(s) of the content, interaction context 801 further includes user intent 811 that has been determined at run time based on the user interaction, user value 812 that is dynamically determined, real-time data obtained from external data sources, and user profile 814. In one embodiment, the entire interaction context object 801 is fed into matching logic 314 of matching engine 122 or some other rule engines. Based on the data contained in interaction context object 801, matching logic 314 matches at least some of the data in interaction context object 801 with at least some of the data contained in agent profiles 802 of agents using a set of matching rules/algorithms 124 associated with a client that provides the content or a mobile application of a user device of the user. If certain data or attributes match between the user information contained in interaction context 801 and agent profiles 802, the corresponding agents are identified as recommended agents 803. Note that matching rules/algorithms 124 are specifically configured for the client.

Matching rules/algorithms 124 may identify and specify the conditions that certain attributes of an agent profile and user data contained in interaction context object mush match in order for the corresponding agent to be selected as a recommended agent. In one embodiment, an agent's expertise specified in its agent profile must match user intent 811 in order for the corresponding agent to be selected. In addition to matching the user intent with the expertise of agents, user value 812 must be a range of values specified in an agent profile in order for the corresponding agent to be selected. Some other demographic or psychographic attributes may also be selectively matched to identify an agent candidate, dependent upon the configurations of matching rules/algorithms 124 of the client. Matching rules/algorithms 124 may be configured by an administrator of the client.

Figure 9A:
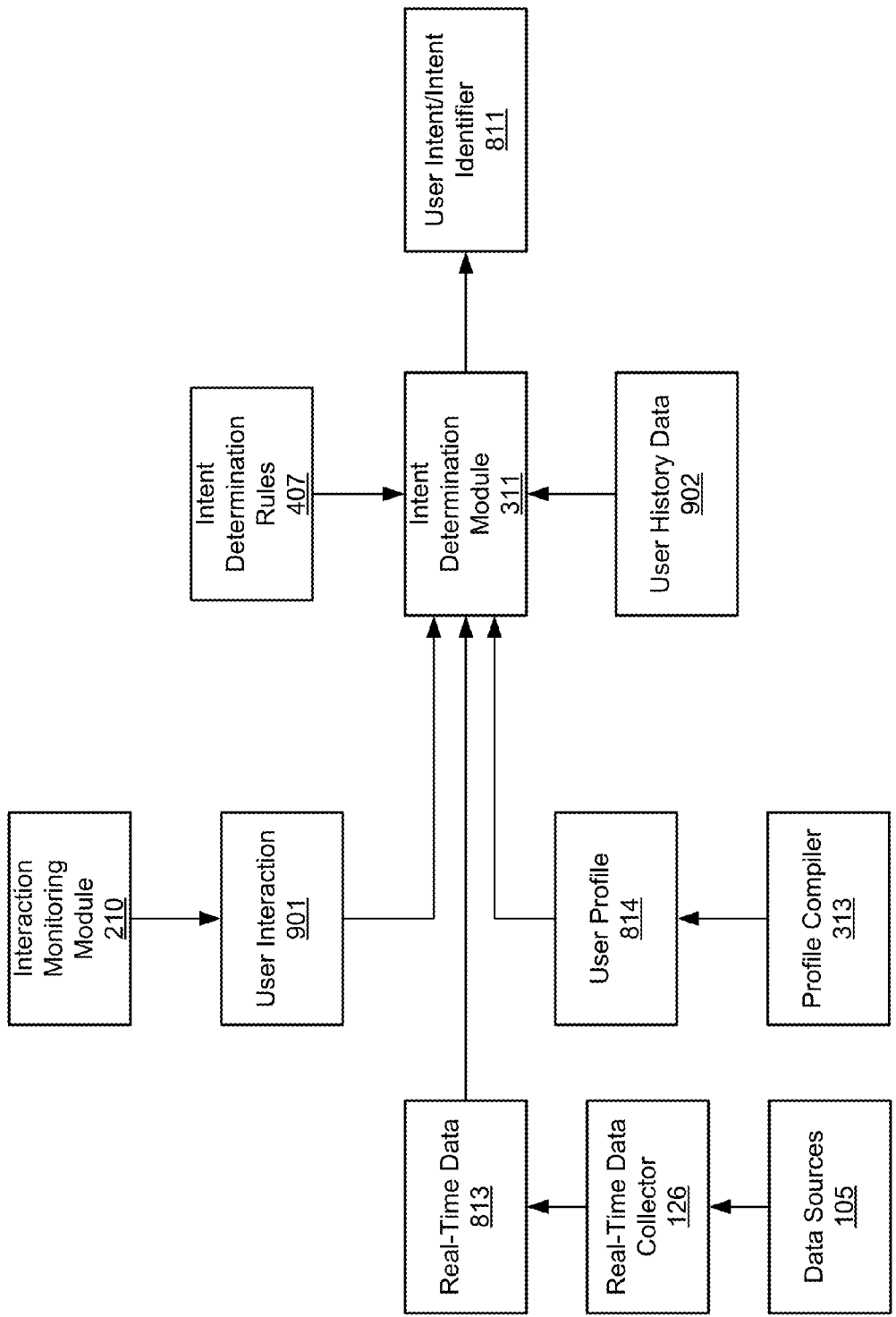
FIG. 9A is a block diagram illustrating a mechanism to determine a user intent according to one embodiment of the invention.

FIG. 9A is a block diagram illustrating a mechanism to determine a user intent according to one embodiment of the invention. Referring to FIG. 9A, intent determination module 311 determines user intent 811 (also referred to as a subject matter) based on user interaction 901, real-time user data 813, user profile 814, and/or user history data 902, using a set of intent determination rules/algorithms 407.

User interaction 901 may be provided by interaction monitoring module 210 that is configured to monitor and receive user interaction information from a mobile device of the user or from the content server with which the user interacts. User interaction 901 may include a click event of user actions or a URL/URI string associated with the content being accessed. User history data 901 may include any user interaction with agents in the past. Intent determination rules/algorithms 407 may be specifically configured for the client or for the specific content of the client being accessed. Note that a client may provide multiple products, services, or content. Each of the different products, services, or content may be associated with a different set of intent determination rules/algorithms.

In one embodiment, an intent determination rule may be an intent mapping table that maps a specific interactive event or a URL of a specific Web page being access to an intent identifier representing a particular user intent as shown in FIG. 9B. Referring to FIG. 9B, in this example, different URLs of different pages 921 are mapped to some of the predetermined intents or intent IDs 922. For example, when a user browses a "buy" page, a signal is received by interaction monitor 210 including at least a portion of a URL of the "buy" page. Alternatively, when a user clicks a "buy" button, a signal is received by interaction monitor 210 including a click event of the "buy" button. Such action or URL is fed into intent determination rules/algorithms 407. As a result, the user intent of "buy" is determined or derived.

Note that when a user browses a web page and interacts with it, the user interactions are periodically sent from the mobile device of the user or the content Web server to the corresponding agent connect system and/or agent matching system. Such interactions are recorded in an interaction context object. In response to the user interaction, a user intent may be determined. That is, the user intent may be determined prior to the user requesting to connect with an agent. When the user interacts with different portions or pages, or performs different click actions, user intents may be determined based on the different interactive events. Alternatively, the user intent may be determined in response to a request to connect with an agent. That is, in response to the request to connect, the latest user interaction or the entire browsing history of the current user session or browsing session is utilized to determine the user intent. The mechanism as shown in FIGS. 9A and 9B may be implemented as part of a guided support identification system described in a co-pending U.S. patent application Ser. No. 13/213,002, filed Aug. 18, 2011, which is incorporated by reference in its entirety.

Figure 10A:
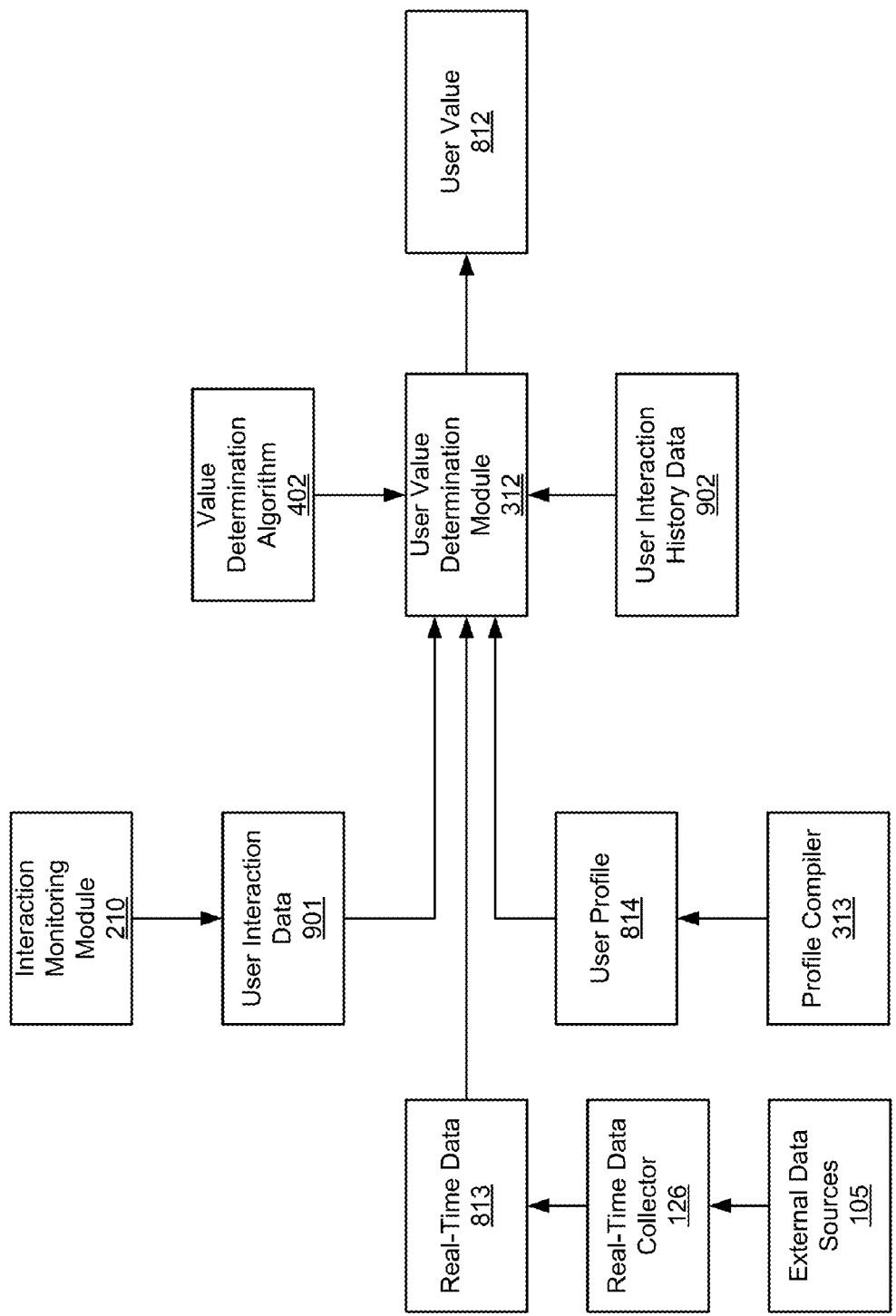
FIGS. 10A and 10B are block diagrams illustrating a mechanism to determine a user value according to certain embodiments of the invention.

FIG. 10A is a block diagram illustrating a mechanism to determine a user value according to one embodiment of the invention. Referring to FIG. 10A, user value determination module 312 determines user value 812 based on user interaction 901, real-time user data 813, user profile 814, and/or user history data 902, using a set of user determination rules/algorithms 402. User value 812 represents how valuable a particular user with respect to a client in a quantifiable manner. In one embodiment, user value 812 is a numeric value representing a level of relationship between the user and the client. A client may provide better services or resources (e.g., a more experience agent, a better communication channel, more promotions or discounts offered, etc.) to a user with a higher user value, i.e., a more valuable user to the client.

User interaction 901 may be provided by interaction monitoring module 210 that is configured to monitor and receive user interaction information from a mobile device of the user or from the content server with which the user interacts. User interaction 901 may include a click event of user actions or a URL/URI string associated with the content being accessed. User history data 901 may include any user interaction with agents in the past. Intent determination rules/algorithms 407 may be specifically configured for the client or for the specific content of the client being accessed. Note that a client may provide multiple products, services, or content. Each of the different products, services, or content may be associated with a different set of user value determination rules/algorithms.

Figure 10B:
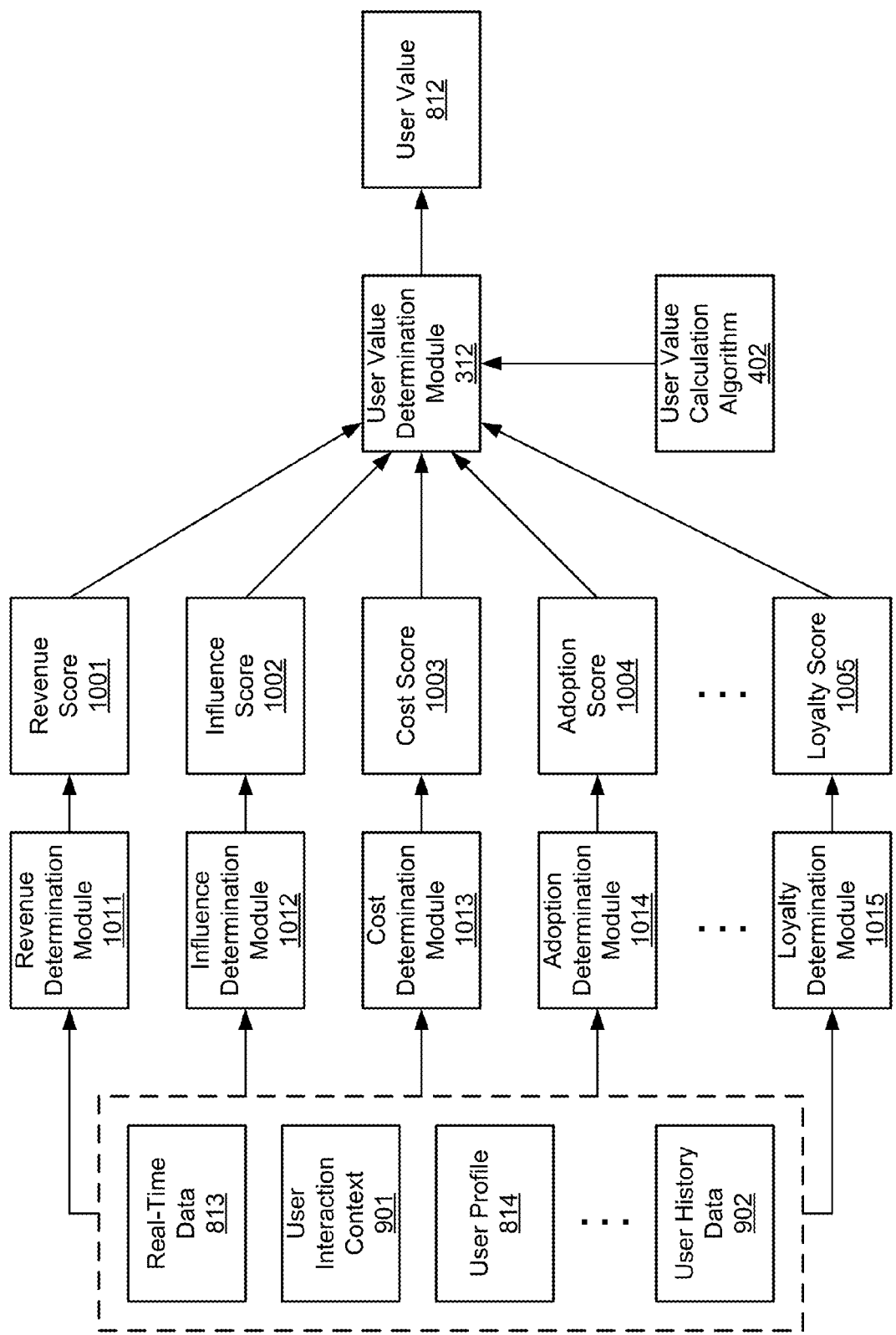

FIG. 10B is a block diagram illustrating a mechanism to determine a user value according to another embodiment of the invention. Referring to FIG. 10B, in this embodiment, user value 812 is determined based on a variety of scores representing different user dynamic attributes including, amongst others, revenue score 1001, influence score 1002, cost score 1003, adoption score 1004, and loyalty score 1005. These scores 1001-1005 are dynamically determined by revenue determination module 1011 (e.g., a first score determination module), influence determination module 1012 (e.g., a fifth score determination module), cost determination module 1013 (e.g., a second score determination module), adoption determination module 1014 (e.g., a fourth score determination module), and loyalty determination module 1015 (e.g., a third score determination module), respectively. Score 1001-1005 may also be determined based on a respective set of rules/algorithms specifically configured for the corresponding client. Determination modules 1011-1015 may be integrated with user value determination module 312.

A revenue score represents the total revenue the user has generated for the client. The total revenue of a user can be obtained from a CRM system or an ERP system associated with the client. A revenue score can be determined based on a rule or mapping table, such as a revenue mapping table as shown in FIG. 11A. The revenue mapping table as shown in FIG. 11A maps a range of revenues to a numeric number as part of a revenue score. A cost score represents the overall costs for the client to provide services to the user in the past. The overall cost may also be derived from a CRM system or based on user interactive history. A cost score may also be determined based on a rule or a cost mapping table that maps a range of costs to a numeric number as part of a cost score. A loyalty score represents a level of satisfaction of the user, which may be derived from a CRM system and/or survey data. An adoption score represents a user adoption level of new products and/or services provided by the client or other clients, which may be derived from a CRM system. An influence score represents the overall social influence of a user, which may be derived from one or more social sites, social aggregators such as Klout.

Each of the above scores is factored in user value calculation algorithm or formula 402 when calculating user value 812. In one embodiment, user value calculation algorithm 402 is a weighted formula in which each of the scores is associated with a specific weight factor. FIG. 11B shows an example of user value determination algorithm according to one embodiment of the invention. Referring to FIG. 11B, in this example, the weight factor or coefficient for a influence score is 0.1; weight factor for a revenue score is 0.35; a weight factor for a cost score is −0.2; a weight factor for an adoption score is 0.1; and a weight factor for a loyalty score is 0.25. Again, the formula 402 is specifically configured for a particular client. Each client's formula may have different weight factors for different scores. FIG. 11C shows an example of user profile information of a higher value user and FIG. 11D shows an example of user profile information of a lower value user.

FIG. 12A is a block diagram illustrating an example of user profile information according to one embodiment of the invention. Referring to FIG. 12A, user profile information 1200 may be compiled from static user information, dynamic user information, and user history data for the current interaction session. User profile information 1200 may be compiled and stored in an interaction context object that is created for the current interaction session. Some or all of the user profile information 1200 may be used to match some or all of the attributes of agent profiles of a pool of agents to derive a list of one or more matched agent candidates. An example of an agent profile is shown in FIG. 12B.

In one embodiment, user profile information 1200 includes profile information 1201, intent 1202, user type 1203, user value 1204, present geographic location of the user 1205, preferred communication channels 1206, demographic information 1207, psychographic factors 1208, and relationship to organization 1209. Profile information 1201 typically includes contact information of the user, such as name, address, user ID, username, email, phone, address, alias, etc., which may be part of static user information that less likely changes over a short period of time. User intent 1202 is dynamically determined based on the user interactions of the current browsing session based on a set of intent determination rules/algorithms. User value 1204 is also dynamically determined based on a variety of data such as a revenue score, a cost score, a loyalty score, an adoption score, and an influence score. User type 1203 represents a type or level of user privileges with respect to a corresponding client. User type 1203 may be determined based on some other information contained in user profile information 1200, such as, for example user intent 1202 and user value 1204, using a set of user type matching rules/algorithms associated with the client.

Present location 1205 may be determined via a location service, for example, based on GPS information obtained from a user device of the user at the point in time. Preferred communication channels 1206 can be obtained from a user database or user account that has been configured by the user previously, for example, during a user registration. A user can specify in its user profile that he or she prefer to have a specific channel to have a communication session with an agent. Demographics 1207 include ethnicity, gender, age, marital status, income level, economic status, education level, employment, etc. Psychographic information 1208 includes interests, activities, attitudes or personality, associations, behaviors, etc. Demographic information 1207 and Psychographic information 1208 may be obtained from external data sources or surveys.

FIG. 12B is a block diagram illustrating an example of an agent profile of an agent according to one embodiment of the invention. Similar to user profile information 1200, agent profile information 1250 includes profile information 1251, which typically includes agent contact information. Expertise 1252 represents agent's ability to directly service a user's intent. Thus, during the matching, user intent 1202 is used to match expertise 1252 of the agents, based on a set of intent-to-expertise matching rules/algorithms (not shown), to derive a list of agents that have the required expertise to service the user. The intent/expertise matching rules/algorithms may be per-client based rules/algorithms configured by an administrator of a client. Value range 1254 represents the range of user values that will be supported by an associated agent. During the user and agent matching, if user value 1204 of a user falls within value range 1254 of an agent, the agent will be considered as an agent candidate, subject to other attributes or parameters matching. Value range 1254 may be configured by an administrator of the corresponding client.

User type 1203 may be determined based on some or all of the information contained in user profile information 1200, based on a set of user type determination rules/algorithms associated with the client. An administrator can specify as part of the rules/algorithms that when certain attributes or properties of user profile information 1200 satisfy certain conditions, the corresponding user is designated as a particular type of users. Agent type or skill level 1254 may be used to match user type 1203 during the matching. An administrator of a client may specify certain types of agents that are qualified to provide services to certain types of users.

Referring to FIGS. 12A-12B, preferred communication channels 1256 list one or more communication channels preferred by the corresponding agent and/or client, which may be configured by an administrator and stored in an agent database. In one embodiment, the agent matching system further maintains a channel mapping table or rule that maps a particular agent type to a set of one or more communication channels, which are available for an agent with a particular type to communicate with a user. In addition to matching user intent 1202 with expertise 1252, user type 1203 with agent type 1253, and/or user value 1204 with value range 1254, at least some of attributes 1205-1209 (collectively representing the personality of a user) may also be used to match at least some of attributes 1255-1258 (collectively representing the personality of an agent) during the agent matching, dependent upon the specific agent matching rules/algorithms of the client. Any one or more of the attributes or properties as shown in FIGS. 12A-12B may be selected to be used to match a user with an agent, which may be configured into a set of matching rules/algorithms.

FIG. 13 is a flow diagram illustrating a process for matching a user with an agent based on a user value according to one embodiment of the invention. Process 1300 may be performed by processing logic which may include software, hardware, or a combination thereof. For example, process 1300 may be performed by matching engine 122. Referring to FIG. 13, at block 1301, a first server (e.g., agent matching server) receives a request for connecting a user with an agent. The request identifies a user interaction with content presented via a mobile application of a mobile device associated with a user. At block 1302, processing logic accesses a second server to determine a revenue score of the user. Processing logic may transmit certain user information (e.g., name, address, phone, email, etc.) to the second server to allow the second server to uniquely identify the user and retrieve the proper user information, in this example, a total revenue the user generates for the client. The second server may represent a CRM system and/or ERP backend system of a client that provides the content and/or the mobile application running within the mobile device of the user. The revenue score represents a total revenue that user has generated for the client. In one embodiment, processing logic receives the total revenue number of the user from the second server. The processing logic then converts the total revenue to a numeric value as a part of revenue score representing a level or range of revenue numbers, using a revenue mapping table or rule, such as one as shown in FIG. 11A.

At block 1303, processing logic determines a cost score of the user with respect to the client. The cost score represents overall costs to provide services to the user by the client. Similarly, such a cost score may be determined based on the overall costs obtained from a client's backend system via an API, such as the CRM and/or ERP systems of the client, for example, using a cost mapping table that maps a range of costs to a numeric value as a cost representation. At block 1304, processing logic dynamically calculates a user value based on at least the revenue score and the cost score using a predetermined user value formula or algorithm associated with the client. In one embodiment, the user value may also be determined based on other data, such as, for example, an influence score, an adoption score, and a loyalty score, as well as other user data (e.g., user profile information as shown in FIG. 12A).

At block 1305, processing logic identifies a list of one or more agents by matching the user value of the user with agent profiles of agents in a pool. In one embodiment, a range of values specified as an attribute or property in the agent profiles are examined to determine whether the user value falls within the range of values. The agents whose agent profiles having the range of values covering the user value are then identified as agent candidates from the pool. At block 1306, processing logic causes a communication session to be established between the mobile device of the user and an agent device of a selected one of the agents in the list.

Figure 14:
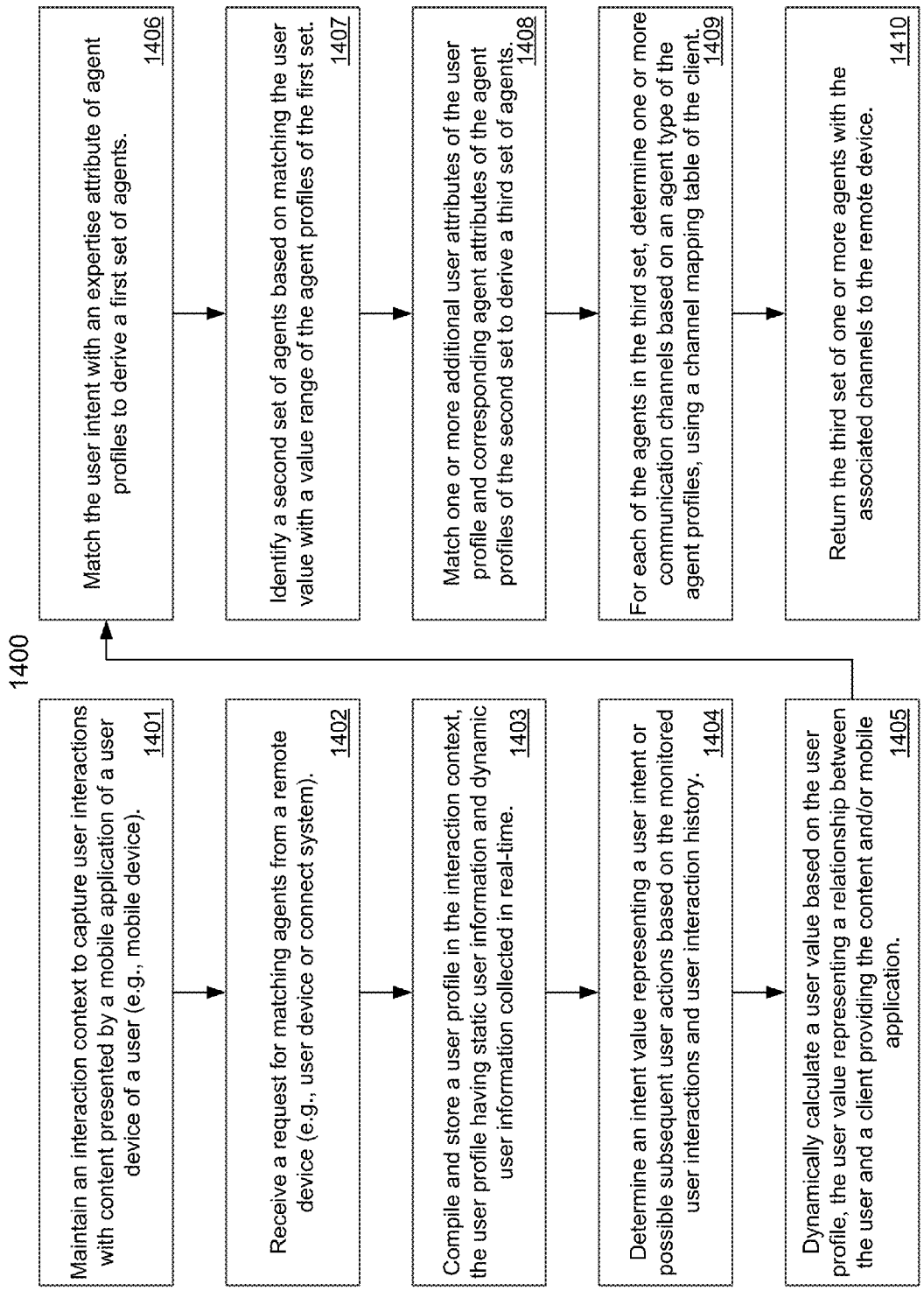
FIG. 14 is a flow diagram illustrating a process for matching a user with an agent based on a user value according to another embodiment of the invention.

FIG. 14 is a flow diagram illustrating a process for matching a user with an agent based on a set of matching rules/algorithms according to another embodiment of the invention. Process 1400 may be performed by processing logic which may include software, hardware, or a combination thereof. For example, process 1400 may be performed by matching engine 122. Referring to FIG. 14, at block 1401, processing logic maintains an interaction context to capture and store user interactions with content presented by a mobile application of a user device. As described above, the interaction context serves a container or vehicle through the corresponding interaction session or browsing session. The interaction context may be created in response to an initial user interaction with the content during a particular browsing session or user session. The interaction context will be passed to different components during the process and updated by the components during the process. The interaction context may be implemented in a variety of data structures or objects. Each interaction context corresponds to a particular interaction session (e.g., same browsing session or user session). Once the corresponding interaction session ends, its context will be concluded or sealed, which may be stored as part of interaction history of the user and subsequently analyzed. An interaction context may be identified by a unique interaction context ID, which may be created dynamically based on a user ID, a mobile application ID, a mobile device ID, and/or a URL/URI string of the content being interacted.

At block 1402, processing logic receives a request for matching agents from a remote device. This could be the situation in which after browsing the content, the user decided to request contacting an agent. The user may click a "help" button or a live connect button to initiate the request. The request may be received from the user device or from a connect system over an API. At block 1403, processing logic compiles a user profile based on static user information and dynamic user information collected in real-time. The information of the user profile may be compiled by a profile compiler and stored in the interaction context or alternatively, a reference or pointer to the user profile may be stored in the interaction context. In such an example, a pointer of the interaction context is passed to the profile compiler. As a result, the profile compiler can identify the user from the information stored in the interaction context and store the compiled user profile therein. In addition, a reference or pointer to a user interaction history may also be stored in the interaction context, such that the user interaction history can readily accessible from the interaction context.

At block 1404, the interaction context or the pointer of the interaction context is passed to an intent determination module. The intent determination module determines a user intent based on the user interaction and the interaction history obtained from the interaction context, using an intent determination rule associated with the client. The intent determination rule may also be retrieved, for example, from a client database or rule database and stored in the interaction context. Alternatively, a pointer or reference to the rule may be stored in the interaction context, such that the rule can be readily accessible from the interaction context during the intent determination.

At block 1405, the interaction context or the pointer of the interaction context is passed to a user value determination module. The user value determination module calculates a user value based on the static and dynamic user information obtained from the interaction context, using a user value determination rule associated with the client. For example, the user value may be determined based on a variety of dynamically determined scores, such as a revenue score, a cost score, an influence score, a loyalty score, and an adoption score. The user value determination rule may also be retrieved from a client database and stored in the interaction context. Alternatively, a pointer or reference to the rule may be stored in the interaction context, such that the rule can be readily accessible from the interaction context during the user value calculation.

At block 1406, the interaction context is passed to matching logic, where the marching logic matches the user intent with the expertise of each of the agents in the pool to derive a first set of agents. In one embodiment, the matching is performed based on an intent-expertise mapping rule or mapping table associated with the client. The intent-expertise mapping rules/algorithms maps a specific intent to a particular type of expertise specified as a predetermined agent attribute of an agent profile. As a result, the first set of agents is identified whose agent profiles have the expertise attribute (e.g., expertise attribute 1252 of FIG. 12B) matched with the user intent (e.g., user intent attribute 1202 of FIG. 12A) based on the intent-expertise matching rule.

At block 1407, the matching logic identifies a second set of agents from the first set of agents by matching the user value of the user (e.g., user attribute 1204 of FIG. 12A) with a value range of the agent profiles associated with the first set of agents (e.g., agent attribute 1254 of FIG. 12B). At block 1408, the matching logic matches one or more predetermined user attributes with corresponding ones of agent attributes of agent profiles of the second set of agents to derive a third set of agents. An administrator of the client may select the specific attributes for matching, which may also be stored as an attribute matching rule.

At block 1409, for each of the agents in the third list, a set of one or more communication channels is determined based on the corresponding agent profiles of the third set of agents. The channels, also referred to as client preferred channels, may be determined based on a client preferred channel rule configured by an administrator of the client. For example, an administrator can specify that an agent with a certain type, a certain expertise/skill level, and/or a certain range of values is associated with a predetermined set of communication channels. Note that there may be user preferred channels specified in a user profile, agent preferred channels specified in an agent profile, and client preferred channels specified in a client preferred channel rule. A channel that is available for establishing a communication session between a user and an agent may be determined based on a combination of one or more of user preferred channels, agent preferred channels, and client preferred channels. For example, an available channel may be selected from the commonly existing channel(s) in the user preferred channels, agent preferred channels, and client preferred channels.

At block 1410, the third set of agents together with the client preferred channels are returned to the remote device to allow a communication session to be established between the user and a selected agent. Certain detailed interactive data during the communication session may also be captured and recorded in the interaction context, for example, as shown in FIG. 15 according to one embodiment of the invention. The interaction context as shown in FIG. 15 may further store at least some of user profile information as shown in FIG. 12A and agent profile information of a selected agent as shown in FIG. 12B, as well as other information such as notes or a transcript of conversation during the communication session.

According to some embodiments, instead of or in addition to matching the specific user attributes such as user intent and user value, the totality of user profile information, for example, as shown in FIG. 12A, may be considered to determine a type or class of a user. The user type or user class is then used to match an agent type or agent class of agents to derive a set of recommended agents.

Figure 16:
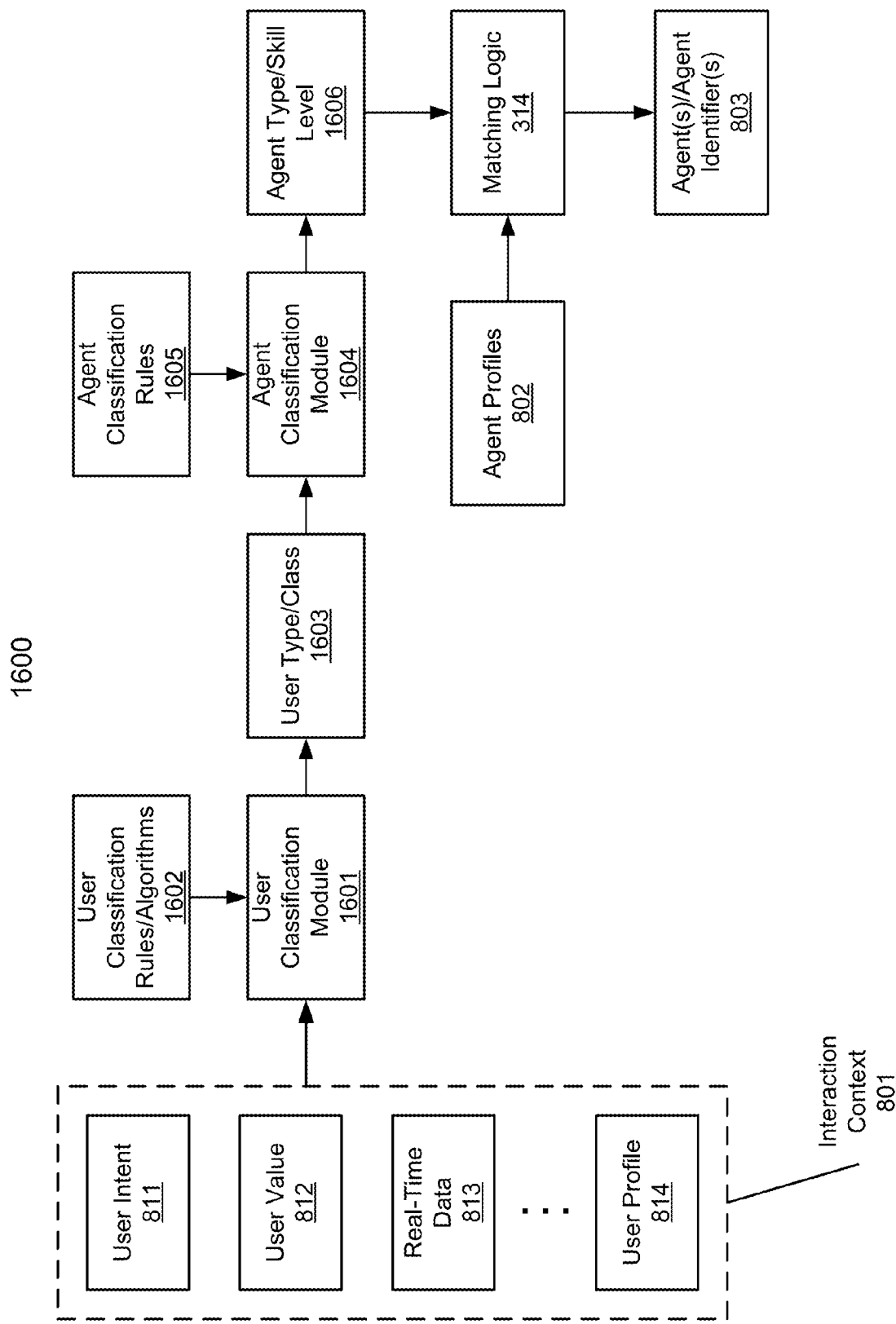
FIG. 16 is a block diagram illustrating an agent matching system according to another embodiment of the invention.

FIG. 16 is a block diagram illustrating an agent matching system according to another embodiment of the invention. System 1600 may be implemented as part of agent matching system 120 described above. Referring to FIG. 16, as described above, matching a user with agents is performed based on a totality of information maintained in an interaction context object, where the interaction context object operates as a container, carrier, or vehicle carrying the information that has been "picked up" along the process. In this example, in addition to the user interactions such as user actions with the content and URL(s) of the content, interaction context 801 further includes user intent 811 that has been determined at run time based on the user interaction, user value 812 that is dynamically determined, real-time data obtained from external data sources, and user profile 814.

In one embodiment, the entire interaction context object 801 or a pointer thereof (e.g., a memory address) is fed into user classification module 1601 to classify the user based on all the information contained in interaction context 801 in view of user classification rules/algorithms 1602. User classification module 1601 may be implemented as part of matching engine 122. Based on the data contained in interaction context object 801, user classification module 1601 determines user type or user class 1603 by comparing at least some of the user attributes of interaction context 801 with the corresponding ones specified in user classification rule 1602. User classification rule 1602 may specify the conditions that certain attributes of user data contained in interaction context object must match or satisfy in order for the corresponding user to be classified as a certain user type or user class. User classification rule 1602 may be configured by an administrator via a configuration interface and stored in a client database associated with the client.

Figure 17:
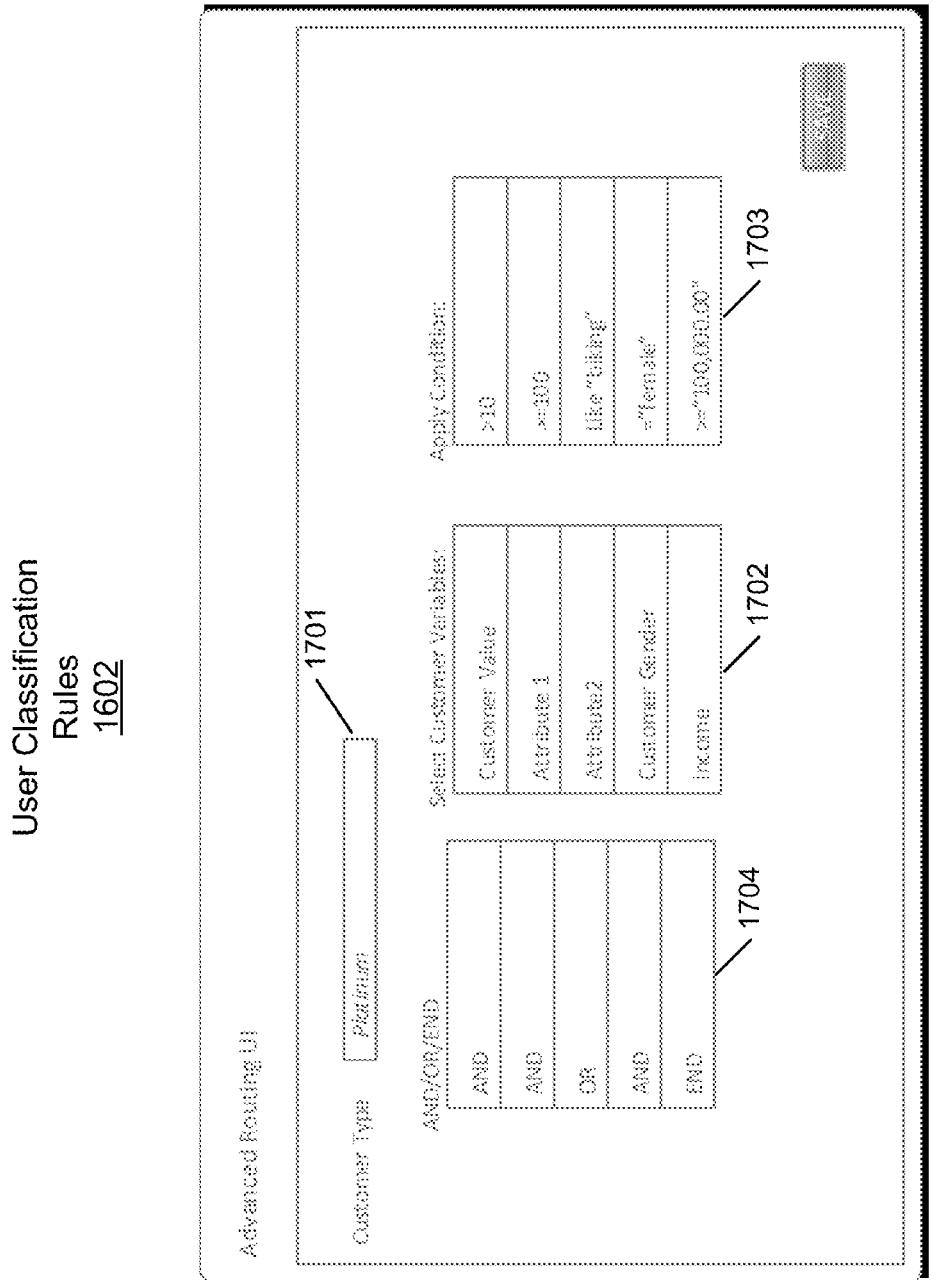
FIG. 17 shows an example of a graphical user interface (GUI) to configure a set of user classification rules according to one embodiment of the invention.

FIG. 17 shows an example of a graphical user interface (GUI) to configure a set of user classification rules/algorithms according to one embodiment of the invention. Referring to FIG. 17, the GUI may be implemented as part of network interface 303 and rules/algorithms 1700 may be implemented as part of matching rules/algorithms 124 of FIG. 3. In this example, an administrator of a client can specify certain attributes 1702 of user profile information and conditions 1703, as well as their relationships 1704. When all of the specified attributes satisfy conditions 1703 and their relationships, the corresponding user can be designated as a particular user type 1701. In this example, in order to be a "platinum" user, the user value has to be greater than 10, and attribute 1 has to be at least 100 or attribute 2 has to be like biking, and the user has to be a female, and its income has to be at least $100K. There may be multiple user types or user classes, such as, for example, "platinum," "gold," "silver," "bronze," etc., which may require different user attributes to be at certain conditions.

FIG. 18 shows an example of a graphical user interface (GUI) to configure a set of rules/algorithms, in this example, agent classification rules/algorithms or table 1605, according to one embodiment of the invention. Referring to FIG. 18, the GUI may be implemented as part of network interface 303 and rules/algorithms 1605 may be implemented as part of matching rules/algorithms 124 of FIG. 3. In this embodiment, an administrator can map certain user types 1801 to skill levels or agent types or agent classes 1802. When a user requests for connecting with an agent, a user type is determined based on a variety of user information and rules/algorithms as described above, based on the determined user type, an agent type is identified based on the mapping table 1605. Based on the identified agent type, the agent profiles are searched to identify a list of agent candidates that are associated with the agent type.

In this example, a "premium sales" agent will be selected for a "platinum" user. A "sales" agent will be selected for a "gold" user. A "premium service" agent will be selected for a "silver" user. A "service" agent will be selected for a "bronze" user. For other types of users, their requests to connect will be put in a general queue. Note that these "premium sales," "sales," "premium service," and "service" agents are referred to as priority agents. Each of the priority agents may be associated with a specific priority queue. Once a priority agent has serviced certain numbers of users in its corresponding priority queue, the agent may service a user pending in the general queue. An agent may be selected further based on whether the agent has a prior relationship with a particular user. An agent interacted with the same user in the past is referred to as a known agent, while the unknown agents that match the personality of the user are referred to as recommended agents. When a list of agents is transmitted to a user device to be presented to a user, an indicator indicating whether a particular agent has a prior relationship with the user is also presented. Further detailed information concerning matching the known and recommended agents and their priority queues can be found in a co-pending U.S. patent application Ser. No. 14/493,204, filed Sep. 22, 2014, which is incorporated by reference in its entirety.

In one embodiment, user classification rules/algorithms 1602 and agent classification rules/algorithms 1605 may be per-client based rules/algorithms, especially in a multi-tenant configuration. Each client may have different rules/algorithms to map a user to different types or classes of users, dependent upon the specific user attributes at the point in time. Alternatively, each product or service provided by the same client may have a different set of user classification rules/algorithms. A user may be a customer of multiple clients, where a user device may have multiple mobile applications of different clients running therein, where the clients are supported by the agent matching system. For example, a user with a first user type of a first client may be considered as a second user type with respect to a second client. Note that some of the user attributes (e.g., user intent, user value including the various scores) may be dynamically determined, which may affect its user types from time to time. Similarly, the user classification rules/algorithms may be updated by an administrator from time to time. The dynamic changes of these factors may affect an outcome of the user classification.

Figure 19:
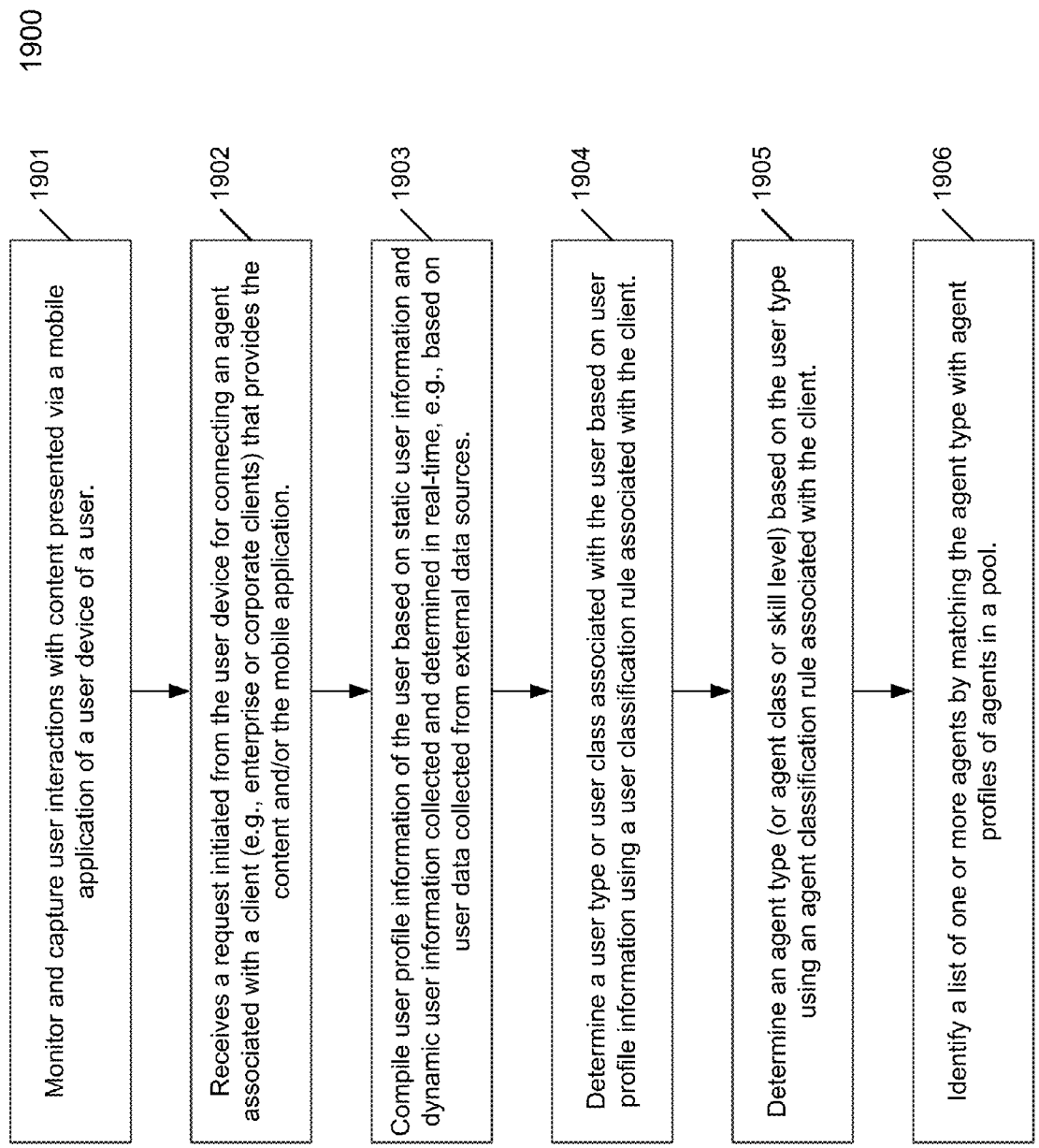
FIG. 19 is a flow diagram illustrating a process for classifying a user according to one embodiment of the invention.

FIG. 19 is a flow diagram illustrating a process for classifying a user according to one embodiment of the invention. Process 1900 may be performed by processing logic which may include software, hardware, or a combination thereof. For example, process 1900 may be performed by system 1600 of FIG. 16. Referring to FIG. 19, at block 1901, processing logic (e.g., interaction monitor) monitors and captures user interactions of a user with content presented via a mobile application of a user device of the user. For example, when a user browses content of a Web page using a mobile application, the mobile application and/or a Web server providing the content may periodically transmit the user actions (e.g., click events, URLs/URIs of the content), optionally through an agent connect system, to an agent matching system and received by the interaction monitor. The user interactions may be stored in an interaction context object that is created for that particular user browsing session.

At block 1902, processing logic receives a request initiated from the user device for connecting an agent associated with a client that provides the content and/or the mobile application of the user device. At block 1903, processing logic compiles user profile information based on static user information and dynamic user information collected and determined in real time. At block 1904, processing logic determines a user type or user class associated with the user based on user profile information, using a user classification rule associated with the client. At block 1905, processing logic determines an agent type, also referred to as agent class or agent skill level, based on the user type using an agent classification rule associated with the client. At block 1906, processing logic identifies a list of one or more agents by matching the agent type with agent profiles of a pool of agents. These user and agent classification rules/algorithms may be configured by an administrator of the client and stored in a client database of the client.

According to some embodiments, instead of or in addition to matching certain specific user attributes such as user intent and user value, the totality of user profile information, for example, as shown in FIG. 12A, may be considered to determine a type or class of a user. The user type or user class is then used to match a treatment type or treatment ID corresponding to a treatment profile. A treatment profile includes information specifying how a user or customer of a client should be treated or serviced, including types of agents, available communication channels, etc. that have been predetermined and configured specifically for the corresponding client.

Figure 20:
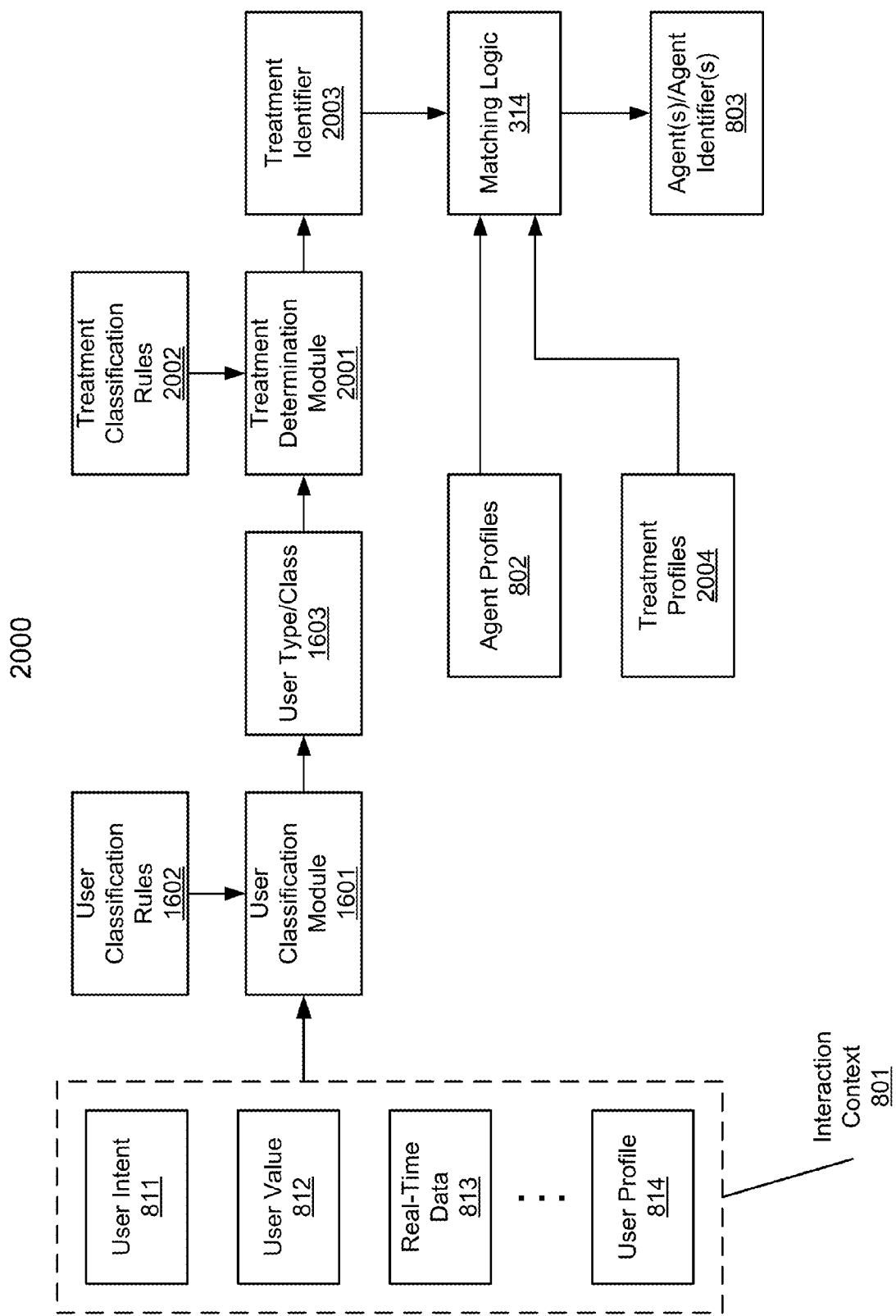
FIG. 20 is a block diagram illustrating an agent matching system according to another embodiment of the invention.

FIG. 20 is a block diagram illustrating an agent matching system according to another embodiment of the invention. System 2000 may be implemented as part of agent matching system 120 described above. Referring to FIG. 20, the entire interaction context object 801 or a pointer thereof (e.g., a memory address) is fed into user classification module 1601 to classify the user based on all the information contained in interaction context 801 in view of user classification rules/ algorithms 1602. User classification module 1601 may be implemented as part of matching engine 122. Based on the data contained in interaction context object 801, user classification module 1601 determines user type or user class 1603 by comparing at least some of the user attributes of interaction context 801 with the corresponding ones specified in user classification rule 1602. User classification rule 1602 may specify the conditions that certain attributes of user data contained in interaction context object must match or satisfy in order for the corresponding user to be classified as a certain user type or user class. User classification rule 1602 may be configured by an administrator via a configuration interface and stored in a client database associated with the client.

Once user type 1603 of the user has been determined, treatment determination module 2001 determines treatment 2003 based on user type 1603 in view of treatment classification rules/algorithms 2002. Treatment determination module 2001 may be implemented as part of matching engine 122 and treatment classification rules/algorithms 2002 may be implemented as part of matching rules/algorithms 124 of FIG. 3. Treatment 2003 represents or identifies one of treatment profiles 2004. A treatment profile includes one or treatment attributes defining certain conditions of agent attributes in agent profiles 802 that have to be met in order to select a particular agent that is qualified for the treatment. In one embodiment, based on a treatment profile identified by treatment 2003, matching logic 314 searches and examines agent profiles to identify a list of agents 803 whose agent profiles satisfy the treatment profile.

Figure 21:
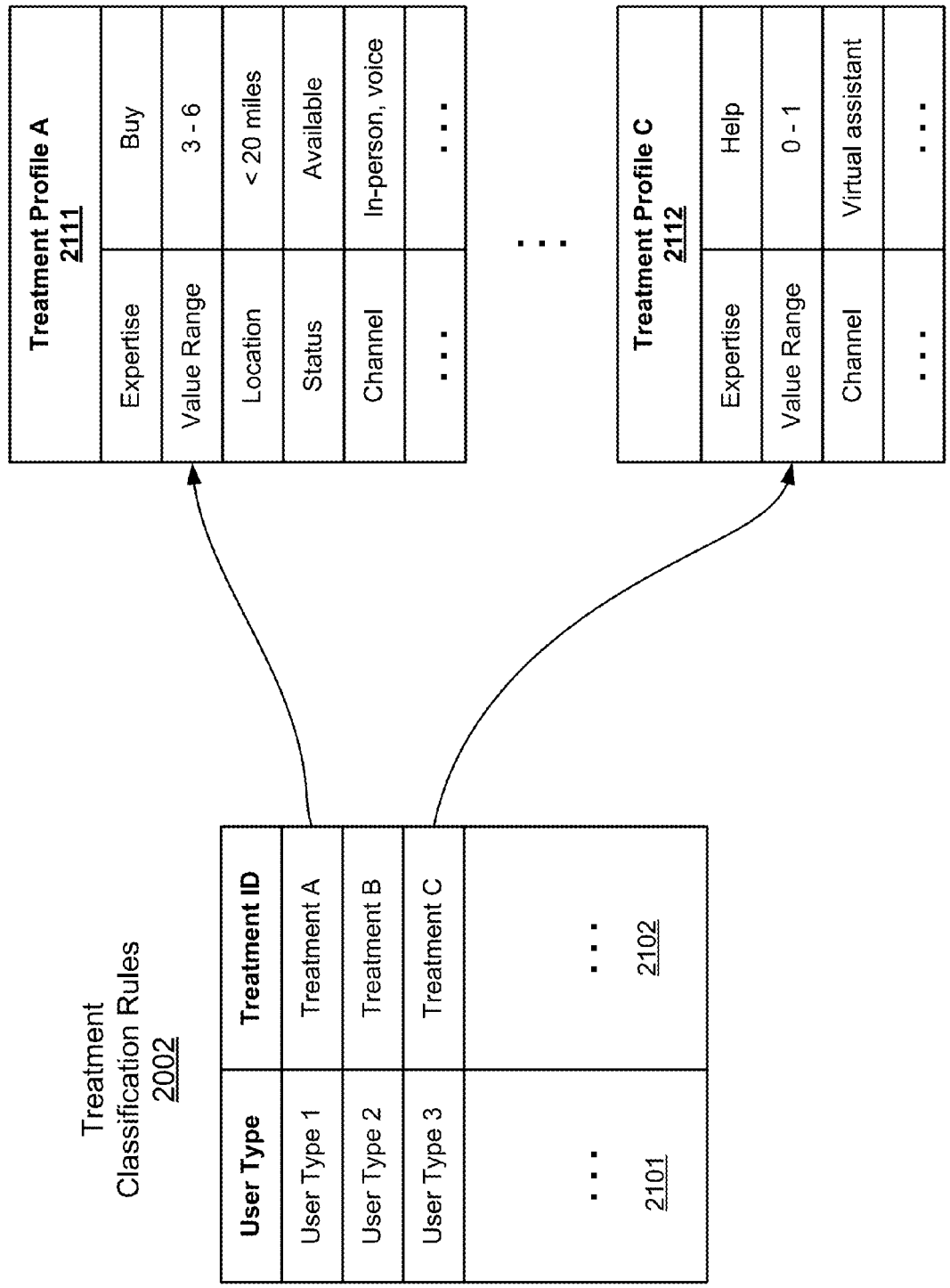
FIG. 21 is a block diagram illustrating an example of a treatment classification rule according to one embodiment of the invention.

FIG. 21 is a block diagram illustrating an example of a treatment classification rule according to one embodiment of the invention. Referring to FIG. 21, treatment classification rules/algorithms 2002 (also referred to as a treatment mapping table) includes multiple entries, each maps one of user types 2101 to one of the predetermined treatment IDs 2102 that identifies one of the treatment profiles 2111-2112. In a form of rules, each entry may be representing a conditional statement. When a user type matches one of the user types 2101, the corresponding one of treatment IDs 2102 is utilized to identify a respective one of treatment profiles 2111-2112. Each of treatment profiles 2111-2112 includes one or more agent attributes defined in an agent profile and their conditions to be satisfied in order for an agent to be selected. Again, treatment classification rules/algorithms 2002 and treatment profiles 2111-2112 are per-client based rules/algorithms or tables, which may be configured by an administrator of the client and stored in a client database associated with the client in a persistent storage device.

In this example, if a user type of a user has been determined to be user type 1 based on a user classification rule, treatment A will be utilized to service the user based on treatment classification rules/algorithms 2002. Based on a treatment ID of treatment A, treatment profile 2111 is identified. Treatment profile 2111 includes several agent attributes that have been defined in an agent profile associated with the client including, in this example, expertise, value range, location, status, channel, and possible other agent attributes. For each of the listed agent attributes in treatment profile 2111, a condition to be satisfied is also defined. In order to qualify to be an agent to service a user with treatment A in this example, the corresponding agent profile must have the agent attributes specified in treatment profile 2111 satisfying their corresponding condition.

In this example, in order for an agent to be selected based on its agent profile to provide services to a user with treatment A, the agent's expertise must be related to "buy." Its value range must cover at least 3-6. Its present location must be within 20 miles from the user's current location (which may be obtained via presence services) and the agent must be available at the point in time. The agent must also be enabled or equipped with necessary capability to conduct a communication session either in person or over a voice call. The information listed in treatment profile 2111 is then utilized to match the corresponding agent attributes of agent profiles of agents in a pool to identify a list of agent candidates. That is, in this embodiment, instead of matching individual attributes such as an expertise and a value range, a treatment defines a set of predetermined agent attributes with certain conditions to be matched for agent selection.

Figure 22:
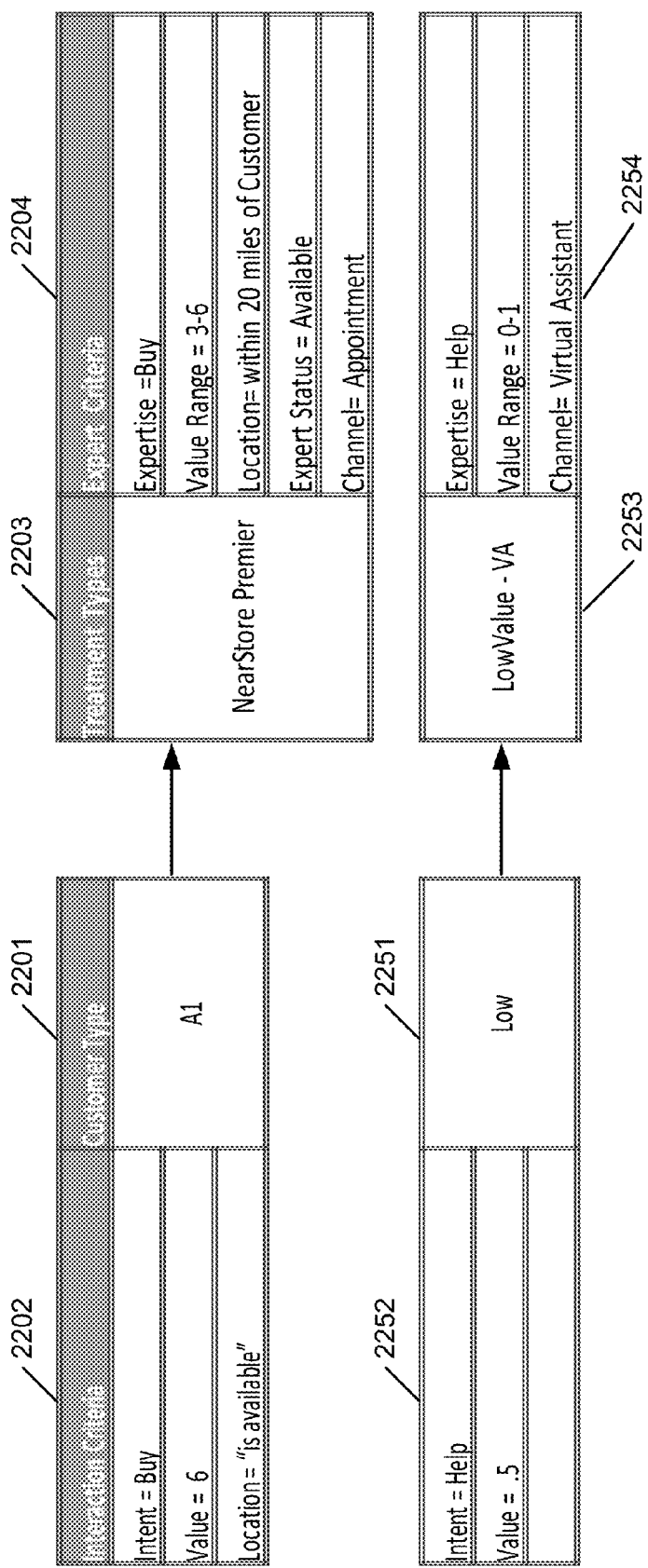
FIG. 22 shows examples of agent matching based on treatments according to certain embodiments of the invention.

FIG. 22 shows examples of agent matching based on treatments according to certain embodiments of the invention. Referring to FIG. 22, in this example, user type 2201 has been determined based on a user classification rule represented by user attributes with certain conditions 2202. Based on a treatment classification rule, a treatment type or treatment identifier 2203 is determined. Treatment type 2203 identifies a treatment profile represented by agent attributes with certain conditions 2204. In this example, user type 2201 is determined if a user intent is "buy," a user value is 6, and an agent location requires to be "available." The user classification rule can further specify more or fewer user attributes when classifying users, which may be configured by an administrator of an associated client.

In this example, in order for an agent to be selected based on its agent profile to provide services to a user with treatment profile 2204, the agent's expertise must be related to "buy." Its value range must cover at least 3-6. Its present location must be within 20 miles from the user's current location (which may be obtained via presence services) and the agent must be available at the point in time. The agent must also be enabled or equipped with necessary capability to conduct a communication session either in person or over a voice call. Thereafter, a list of agents may be identified based on their respective agent profiles that have the corresponding agent attributes satisfying the conditions specified in treatment profile 2204.

Similarly, user type 2251 has been determined based on a user classification rule represented by user attributes with certain conditions 2252. Based on a treatment classification rule, a treatment type or treatment identifier 2253 is determined. Treatment type 2253 identifies a treatment profile represented by agent attributes with certain conditions 2254. Thereafter, a list of agents may be identified based on their respective agent profiles that have the corresponding agent attributes satisfying the conditions specified in treatment profile 2254.

Figure 23:
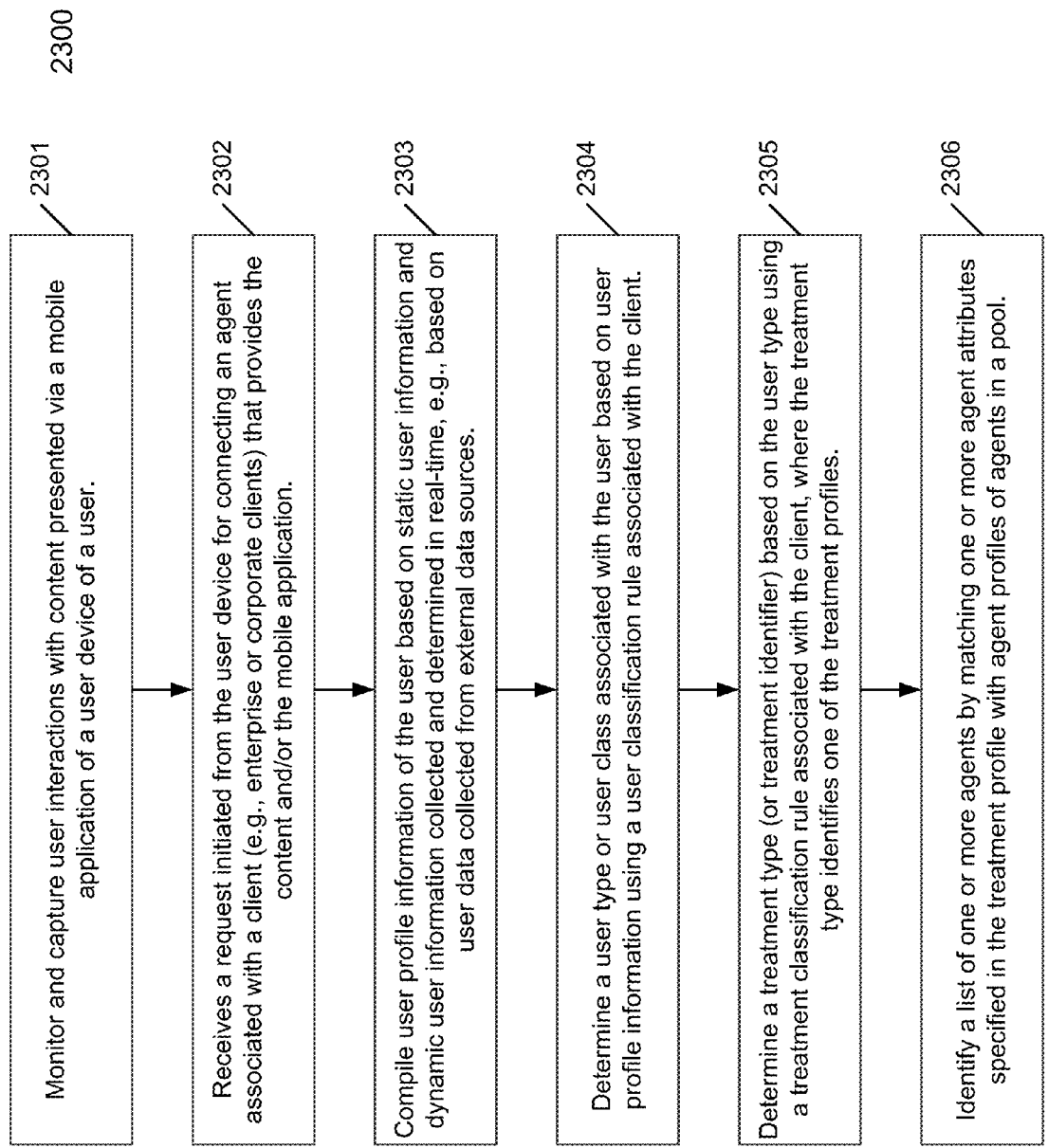
FIG. 23 is a flow diagram illustrating a process for agent matching based on treatment profiles according to one embodiment of the invention.

FIG. 23 is a flow diagram illustrating a process for agent matching based on treatment profiles according to one embodiment of the invention. Process 2300 may be performed by processing logic which may include software, hardware, or a combination thereof. For example, process 2300 may be performed by system 2000 of FIG. 20. Referring to FIG. 23, at block 2301, processing logic (e.g., interaction monitor) monitors and captures user interactions of a user with content presented via a mobile application of a user device of the user. For example, when a user browses content of a Web page using a mobile application, the mobile application and/or a Web server providing the content may periodically transmit the user actions (e.g., click events, URLs/URIs of the content), optionally through an agent connect system, to an agent matching system and received by the interaction monitor. The user interactions may be stored in an interaction context object that is created for that particular user browsing session.

At block 2302, processing logic receives a request initiated from the user device for connecting an agent associated with a client that provides the content and/or the mobile application of the user device. At block 2303, processing logic compiles user profile information based on static user information and dynamic user information collected and determined in real time. At block 2304, processing logic determines a user type or user class associated with the user based on user profile information, using a user classification rule associated with the client. At block 2305, processing logic determines a treatment type, also referred to as a treatment identifier, based on the user type using a treatment classification rule associated with the client. Based on the treatment type, a treatment profile is identified, where a treatment profile includes one or more agent attributes and their respective conditions to be satisfied. At block 2306, processing logic identifies a list of one or more agents by matching agent attributes specified in the treatment profile with corresponding ones of agent profiles of a pool of agents. These user and treatment classification rules/algorithms may be configured by an administrator of the client and stored in a client database associated with the client.

According to another embodiment of the invention, in response to a request received from a mobile application running within a mobile device of a user to contact an agent, a list of agents that are available to communicate with the user is identified by matching a user profile of the user and agent profiles of the agents. A personalized workflow (e.g., support workflow or personalized journey) is dynamically generated based on the identified agents using a predetermined workflow template. The workflow includes multiple workflow stages, each being associated with one of the identified agents. The workflow template has been specifically configured for a client that provides services to the user via the mobile application. A first communication session is established between the mobile device of the user and a first agent device of a first agent associated with a first workflow stage of the workflow. At the conclusion of the first communication session, it is determined whether a first criteria (e.g., specific request from the user or agent, poor survey result, certain technical conditions fail, etc.) specified in the first workflow stage has been satisfied. In response to determining that the first criteria has been satisfied, a second communication session is established between the mobile device of the user and a second agent device of a second agent specified in a second workflow stage of the workflow. The workflow stages may be processed until the user has been satisfied by the services provided by the agent or agents.

Figure 24:
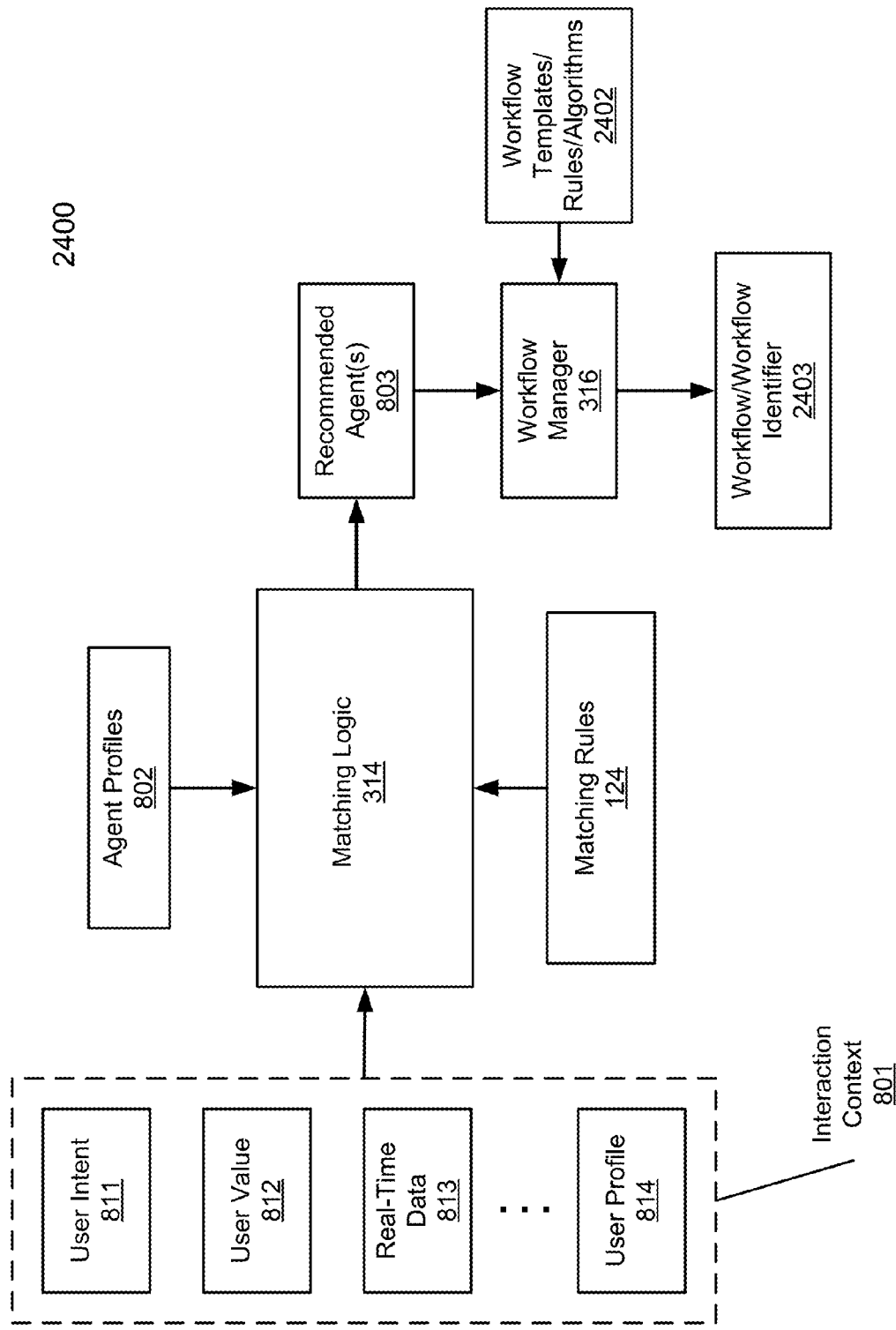
FIG. 24 is a block diagram illustrating a mechanism for providing support services to the user based on a support workflow according to one embodiment of the invention.

FIG. 24 is a block diagram illustrating a mechanism for providing support services to the user based on a support workflow according to one embodiment of the invention. System 2400 may be implemented as part of agent matching system 120 described above. Referring to FIG. 24, as described above, matching a user with agents is performed based on a totality of information maintained in an interaction context object, where the interaction context object operates as a container or vehicle carrying the information that has been "picked up" along the process. In this example, in addition to the user interactions such as user actions with the content and URL(s) of the content, interaction context 801 further includes user intent 811 that has been determined at run time based on the user interaction, user value 812 that is dynamically determined, real-time data obtained from external data sources, and user profile 814. In one embodiment, the entire interaction context object 801 is fed into matching logic 314 of matching engine 122 or some other rule engines. Based on the data contained in interaction context object 801, matching logic 314 matches at least some of the data in interaction context object 801 with at least some of the data contained in agent profiles 802 of agents using a set of matching rules/algorithms 124 associated with a client that provides the content or a mobile application of a user device of the user. If certain data or attributes match between the user information contained in interaction context 801 and agent profiles 802, the corresponding agents are identified as recommended agents 803. Note that matching rules/algorithms 124 are specifically configured for the client.

Matching rules/algorithms may specify the conditions that certain attributes of an agent profile and user data contained in interaction context object must match or satisfy in order for the corresponding agent to be selected as a recommended agent. In one embodiment, an agent's expertise specified in its agent profile must match user intent 811 in order for the corresponding agent to be selected. In addition to matching the user intent with the expertise of agents, user value 812 must be a range of values specified in an agent profile in order for the corresponding agent to be selected. Some other demographic or psychographic attributes may also be selectively matched to identify an agent candidate, dependent upon the configurations of matching rules/algorithms 124 of the client. Matching rules/algorithms 124 may be configured by an administrator of the client.

According to one embodiment, based on recommended agents 803, workflow manager 316 generates workflow 2403 using workflow template or rule 2402. Workflow templates or rules/algorithms 2402 may be configured by an administrator associated with the client. Workflow 2403 represents an overall interactive process between a user with one or more of recommended agents 803 in an attempt to solve the user's issues. In one embodiment, workflow 2304 includes a series of workflow stages. Each of the workflow stages is associated with one of recommended agents 804 that have been selected in a personalized manner by matching the personality of the user with the personality of the agents. In one embodiment, each workflow stage of workflow 2403 further includes a corresponding criteria, which when met (e.g., failure to satisfy the user), the process will advance from a current workflow stage to another workflow stage of workflow 2403. The purpose of providing support services to a user using a workflow is to satisfy user's needs when one agent may not be enough.

As described above, when a request is initiated from a user device and received by an agent connect system or server, the agent connect system sends a request to connect to the agent matching system. In response to the request, user information (e.g., static and dynamic user information) is compiled and collected in real time. The user information is quantified, for example, based on a variety of scores (e.g., revenue, cost, influence, loyalty, and adoption). Based on the user information and its history data, a user intent, a user value, and/or a user type, are determined based on a set of appropriate rules/algorithms associated with the client. A workflow is generated based on a workflow template. A workflow template may be associated with a client that provide content or services to the user or alternatively, the workflow template may be associated with a particular content or particular service provided by the client, as the client may provide multiple content or services. Throughout this application, the term of "client" is referred to as any product providers, service providers, or content providers (e.g., manufacturers, retailers, distributors).

The workflow is then delivered from the agent matching system to the agent connect system. The agent connect system then connect the user with an agent selected from an appropriate workflow stage of the workflow. Alternatively, the agent matching system transmits the information of a first workflow stage to the agent connect system to allow the agent connect system to connect the user with a first agent of the first workflow stage. If the interaction between the user and the first agent fails (e.g., initiated from an agent, a user, or via survey), the agent connect system may request for another agent. For example, the first agent may decide that he or she is not capable of answering a user's further question. The first agent may ask for a user's permission to transfer the session to another agent. After receiving user's confirmation, the first agent may sends, for example, via its mobile application, a request to escalate the session and the request is received at the agent connect system and/or the agent matching system. Alternatively, a survey is sent to the user and a feedback is received back from the user indicating that the feedback from the user is below a predetermined threshold (e.g., a rating of less than 3 stars). In response, the agent matching system transmits information of a second workflow stage to the agent connect system. The agent connect system can then connect the user with a second agent associated with the second workflow stage, and so on, until the user is satisfied.

Figure 25:
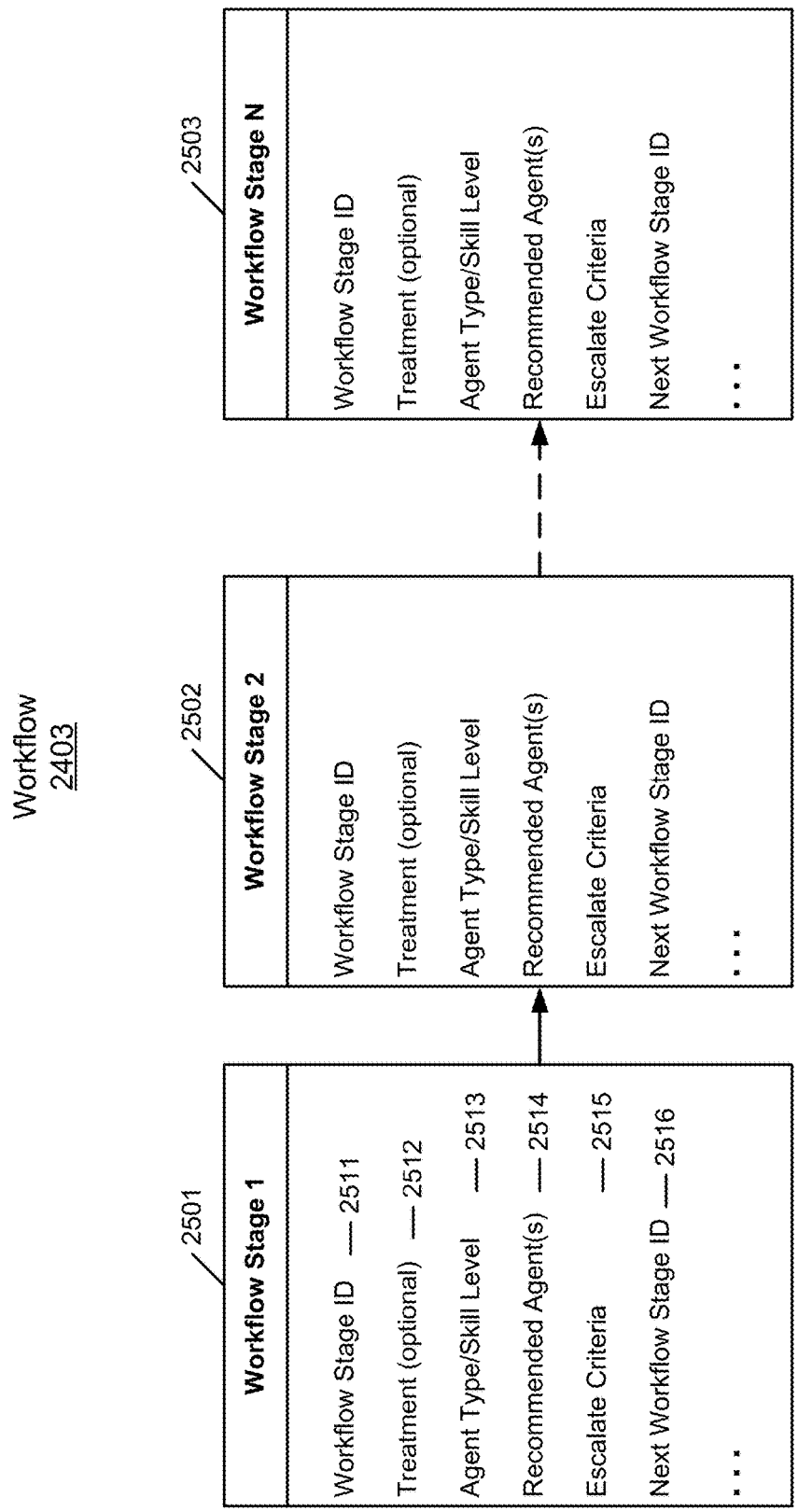
FIG. 25 is a block diagram illustrating an example of a workflow configuration according to one embodiment of the invention.

FIG. 25 is a block diagram illustrating an example of a workflow configuration according to one embodiment of the invention. Referring to FIG. 25, workflow 2403 includes workflow stages 2501-2503. Each of the workflow stages 2501-2503 may be maintained in a variety of data structures or objects. The data structures and data elements of workflow stages 2501-2503 may be the same or similar. For the purpose of illustration, workflow stage 2501 includes workflow stage ID 2511, optional treatment ID 2512, optional agent type or skill level 2513, recommended agent(s) 2514, escalate criteria 2515, and next workflow stage ID 2516. Again, other workflow stages 2502-2503 may include these elements 2511-2516.

Workflow stage ID 2511 identifies a current workflow stage, in this example, workflow stage 2501. Treatment ID 2512 identifies a treatment with which the current workflow stage is associated. All of workflow stages 2501-2503 may be associated with the same or different treatments. A treatment may require a particular workflow template to be utilized to generate a workflow, which may be configured by an administrator. Agent type or skill level 2513 may indicate the agent type of an associated agent that is identified by agent ID 2514. Escalate criteria 2515 specifies a condition, which when mat, the workflow will advanced from a current workflow stage (e.g., workflow stage 2501) to another workflow stage that is identified by next workflow stage ID 2516. Next workflow stage ID 2516 identifies one of workflow stages 2502-2503.

Figure 26:
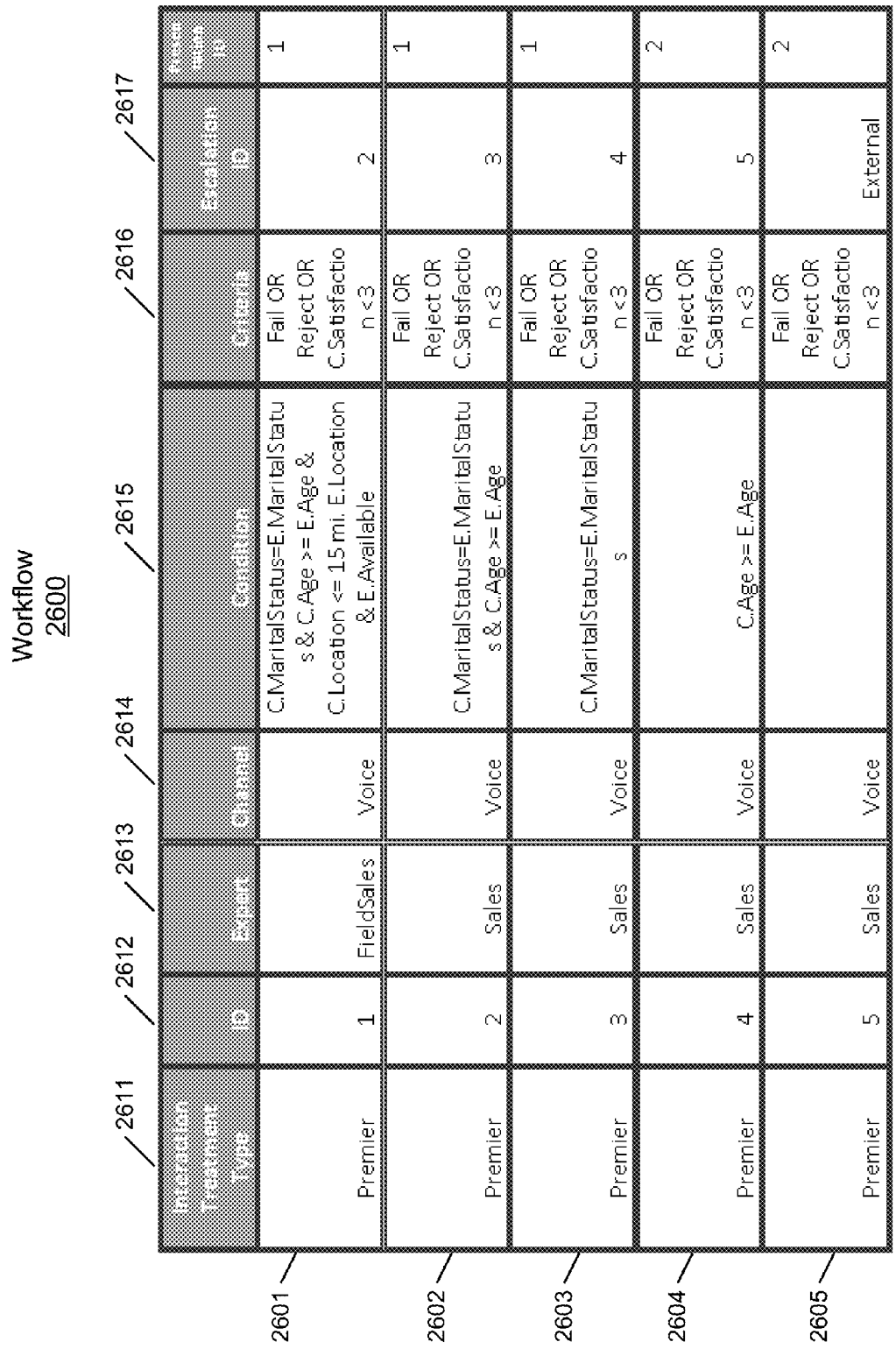
FIG. 26 is a block diagram illustrating an example of a workflow according to another embodiment of the invention.

FIG. 26 is a block diagram illustrating an example of a workflow according to another embodiment of the invention. Referring to FIG. 26, workflow 2600 is configured in a format of a workflow table including multiple entries 2601-2605, each corresponding to one of the workflow stages. Each workflow stage includes treatment ID 2611, workflow stage ID 2612, agent or expert ID 2613, channel ID 2614, conditions 2615, criteria 2616, and escalation ID 2617. Treatment ID 2611 identifies a treatment (or treatment plan or treatment profile) associated with the current workflow stage. Workflow stage ID 2612 identifies the current workflow stage. Agent ID 2613 identifies an agent associated with the current workflow stage. Alternatively, agent ID 2613 identifies a type of agent. Channel ID 2614 identifies one or more communication channels that are available for the user and the associated agent to communicate with.

Conditions 2615 identify the conditions or attributes that the agent of the current workflow stage can be identified and selected. For example, if agent ID 2613 identifies a type of agents, conditions 2615 may be used to identify the actual agents whose agent profiles match the agent type 2613 and conditions 2615. Criteria 2616 identifies a criteria, also referred to as an escalation criteria, which when met, the current workflow stage will advance or escalated to another or next workflow stage that is identified by escalation ID 2617 (also referred to as a next workflow stage ID). For example, escalation ID 2617 of workflow stage 2601 includes a value of 2, which identifies workflow stage 2602. In this example, when the interaction between a user and an agent of a current workflow stage fails, is rejected by one of the parties, or user survey drops below a predetermined threshold (e.g., below rating of 3), the current workflow stage will be escalated to a next workflow stage and another agent of the next workflow stage will contact the user. The workflow stage will be processed until the user is satisfied.

Figure 27:
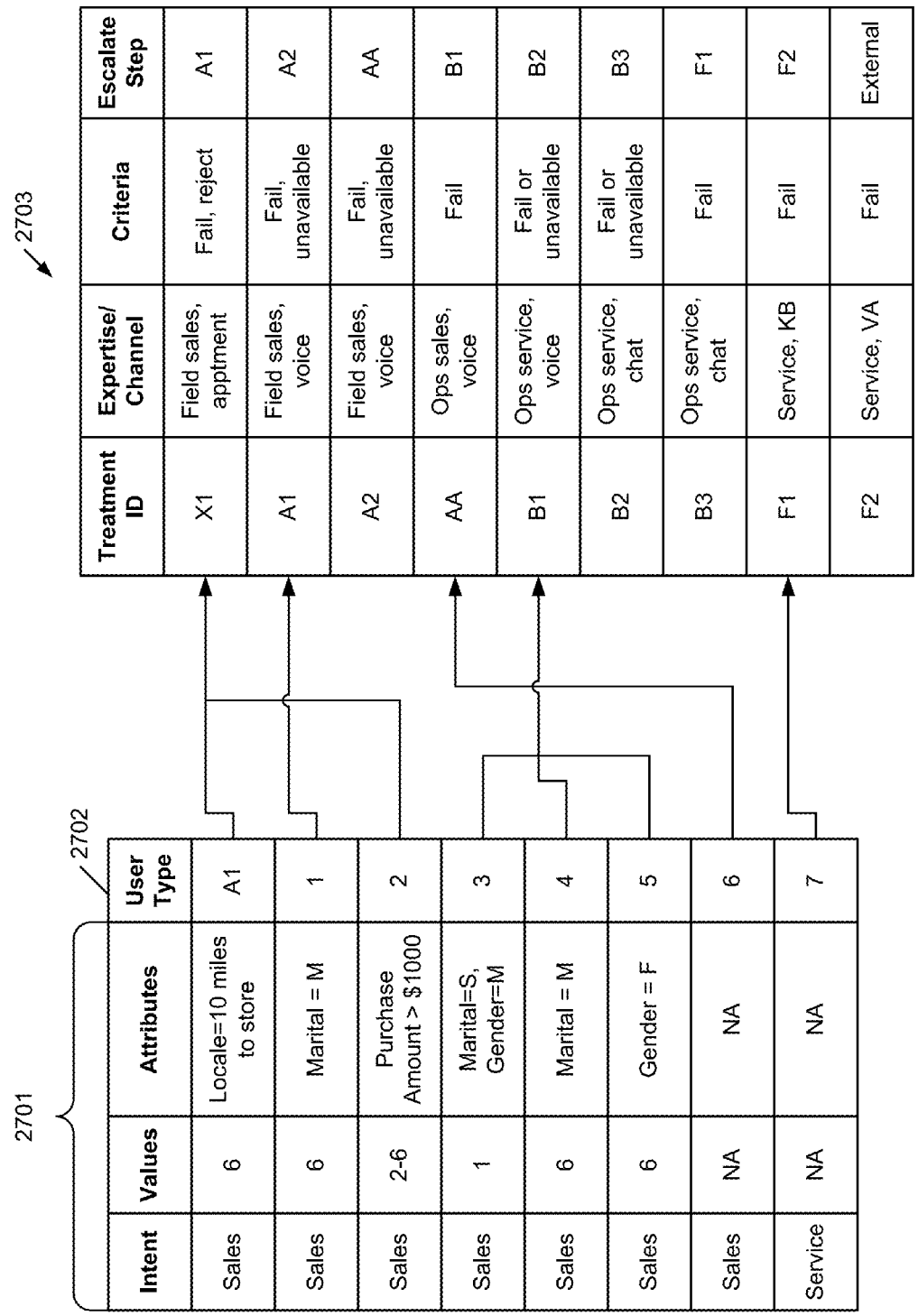
FIG. 27 is a block diagram illustrating a mapping mechanism to determine a workflow based on user type according to one embodiment of the invention.

FIG. 27 is a block diagram illustrating a mapping mechanism to determine a workflow based on user type according to one embodiment of the invention. Referring to FIG. 27, as described above, user type 2702 can be determined based on user attributes 2701 using a user classification rule. Based on user type 2702, a treatment can be identified and workflow 2703 can be created as described above. In one embodiment, a workflow may be associated with a treatment. As shown in FIG. 27, treatment or workflow A includes multiple agents corresponding to multiple workflow stages A1, A2, and AA. A workflow stage of one workflow can be escalated to another workflow stage of the same workflow or alternatively, it can be escalated to another workflow stage of another workflow. For example, workflow stage A1 of workflow A can be escalated to workflow stage A2 of workflow A. Workflow stage AA of workflow A may be escalated to workflow stage B1 of workflow B.

Mapping is an administrative process of taking the interaction properties and defining specific conditions to create a user Type, then creating interaction business processes as a part of the journey (e.g., workflow) associated to a particular interaction treatment type. These two steps are then followed by connecting the user to a treatment. The intent, values, and attributes are specifically identified and attached to a user type. The user type is then connected to a treatment type and subsequent interaction business process for that specific user type. In the treatment the administrator designates the expertise and the channel that will be offered to the user. The conditions that the agent should match against the user are definable and the criteria depict the condition to use the escalation step.

Criterion is determined at the point an interaction task has failed. There are two types of failures, internal or customer. If the conditions or channel cannot be satisfied within a task then the task step fails. But additionally, if a customer has come to the end of the interaction task and their feedback indicates that the interaction was not successful, then that also means the interaction task has failed. Further an agent may also indicate or request the current support case to be transferred to another agent. Criteria is typically measured as a "Fail" or "Succeed." Failure means that the interaction will be escalated, succeed means the interaction is complete.

Escalations occur when a user or customer has not been satisfied or the criteria is met or when a task condition is not met for a particular task or workflow stage. The escalation can simply move the interaction to the next task or workflow stage within an interaction treatment type or move to a new treatment type completely. There are two types of external escalations, inactive channel and active channel. Inactive channel is when the customer is not connected to an agent or expert via a channel. In this event it is likely that the interaction has just entered the system and will be moved immediately off platform to the interaction platforms. This type of external move could simply invoke a message to the customer via the interface. Data for this interaction would still be recorded.

Active external escalations will require that the system be integrated with the interaction platforms. This integration will be required in order to pass customer data along with the interaction, but in some cases to actually move to a new channel provider. External escalations are channel dependent and may require additional data and configuration from the administrator in order to complete. Example external escalations include: SIP refer/voice transfer—SIP header integration, TDM transfer—no data will be passed, Web URL redirection—use of URL parameters. This could be used for chat since prior to connecting to a chat server the customer is prompted with a web page. This web page would create a new chat interaction with a new chat server.

Agents may be required to escalate interactions, including chats and voice. In this case an administrator through a configuration interface can control the capability. As an example, a specific user type could be defined to deal with the interaction attribute "AgentIntiatedEscalation." The customer would then be presented with an interaction option(s) to the customer as defined in the corresponding workflow stage. Since an agent initiated escalation goes through the agent matching system, similar to users, agents would potentially be presented with options of who could take the escalated interaction, depending on the defined rules/algorithms of the current workflow stage.

Figure 28:
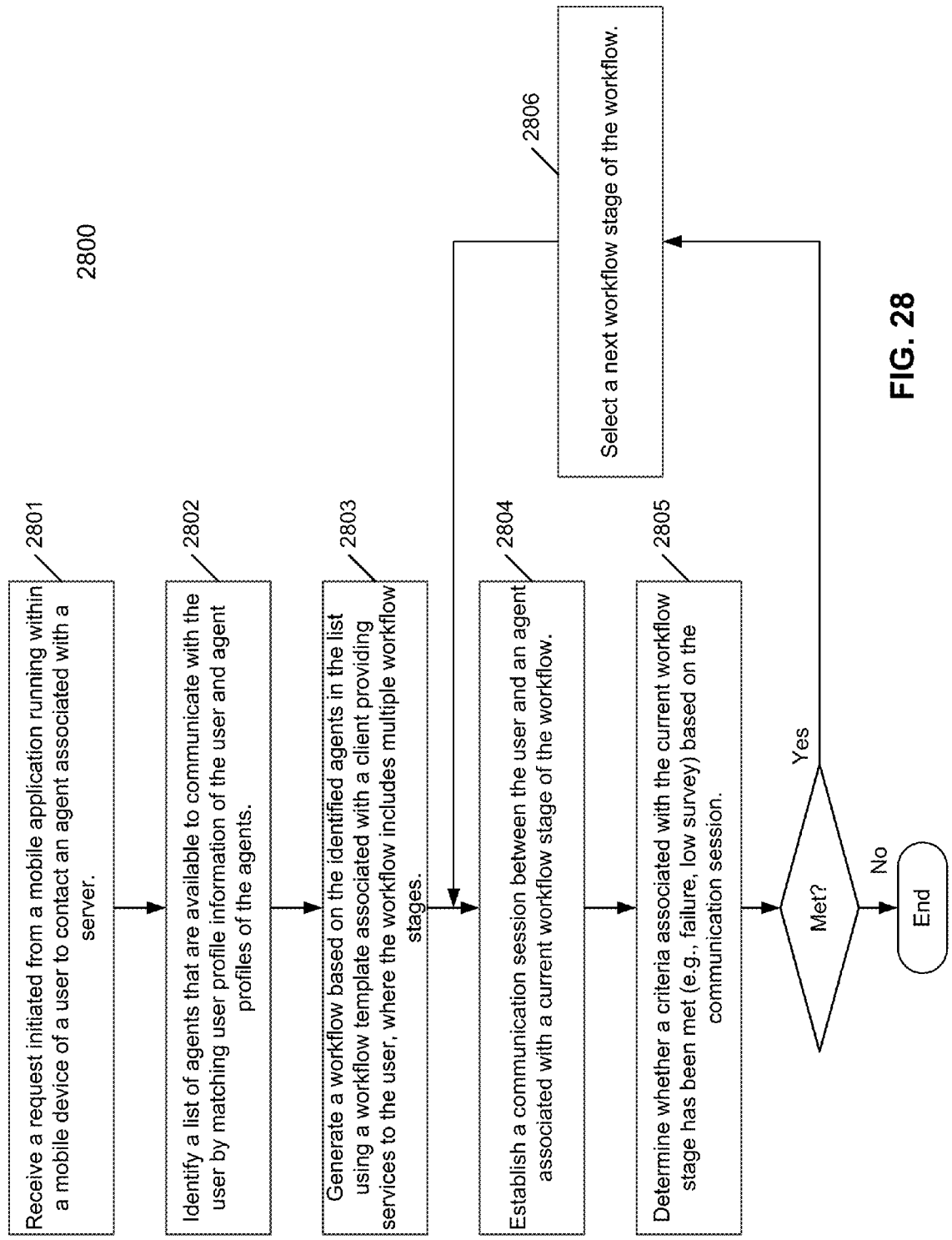
FIG. 28 is a flow diagram illustrating a process of providing support to a user using a support workflow according to one embodiment of the invention.

FIG. 28 is a flow diagram illustrating a process of providing support to a user using a support workflow according to one embodiment of the invention. Process 2800 may be performed by processing logic which may include software, hardware, or a combination thereof. For example, process 2800 may be performed by agent connect system 115 and/or agent matching system 120. Referring to FIG. 28, at block 2801, processing logic receives a request, which is initiated from a mobile application running within a mobile device of a user, to connect an agent associated with a server. The server may represent an agent connect system of a support center. At block 2802, in response to the request, processing logic identifies a list of agents that are available to communicate with the user by matching user profile information and agent profiles of the agents, including their respective personality.

At block 2803, a support workflow is generated based on the identified agents in the list using a workflow template associated with a client that provides products or services to the user. The workflow includes multiple workflow stages, each workflow stage being associated with one of the identified agents. At block 2804, a communication session is established between a user and an agent selected from a current workflow stage of the workflow. At block 2805, it is determined whether a predetermined criteria (e.g., failure, low feedback) of the current workflow stage has been met. If the predetermined criteria has been met (e.g., unsatisfied user), at block 2806, a next workflow stage is identified or escalated from the current workflow stage, and the above operations are iteratively performed.

Figure 29:
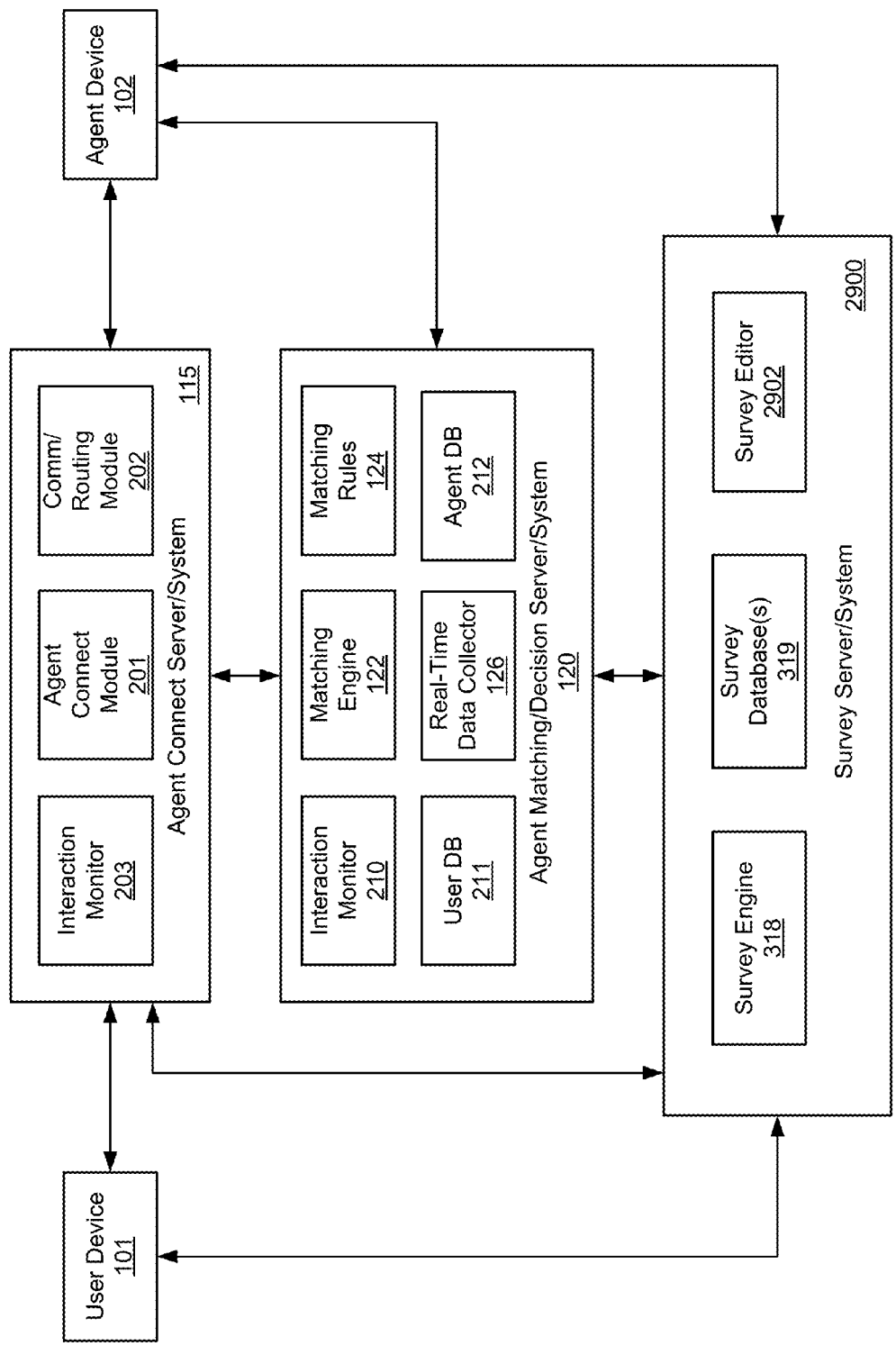
FIG. 29 is a block diagram illustrating a survey system according one embodiment of the invention.

As described above, the matching between a user and agents is performed based on a variety of user information and agent information. The quality of the matching significantly depends on the user data and agent data collected via a variety of channels. An effective survey system may be utilized to collect user data and agent data. FIG. 29 is a block diagram illustrating a survey system according one embodiment of the invention. Referring to FIG. 29, survey system 2900 is communicatively coupled to agent connect system 115 and agent matching system 120. These systems may be integrated within a server and communicate with each other via a set of APIs. Alternatively, these systems may operate in a separate server and communicate with each other over a network using a variety of communication protocols. Survey system or server 2900 provides a set of survey services to agent connect system 115 and agent matching system 120 in a client-server manner.

According to one embodiment the invention, survey system 2900 is an interactive event driven survey system utilized to survey or collect user satisfaction or feedback data concerning the support services provided by the agent or agents. In one embodiment, survey system 2900 receives an interactive event during a communication session between user device 101 and agent device 102 discussing content presented to the user by a client (e.g., enterprise or corporate client). The interactive event may be captured by and received from interaction monitor 203 and/or interaction monitor 210. Alternatively, the interactive event may be received directly from user device 101.

In response to the interactive event, survey engine 318 identifies a survey from survey database 319 based on the interactive event, where survey database 319 may maintain many surveys that have been configured to be associated with a variety of different interactive events. Survey engine 318 transmits the identified survey to user device 101 and/or agent device 102, dependent upon the interactive event and its associated survey rules/algorithms, which may be configured by an administrator using survey editor 2902 via a configuration interface. Alternatively, the survey may be sent to agent matching system 120 or agent connect system 115, which may then forward the survey to user device 101 and/or agent device 102. User and/or agent responses may be received from user device 101 and/or agent device 102. Alternatively, the responses may be received via agent connect system 115 and/or agent matching system 120.

In one embodiment, each survey is represented by a survey workflow having a series of survey workflow stages. Each survey workflow stage is associated with a specific survey question and a set of one or more rules/algorithms that governs how the corresponding question should be presented to the user. In one embodiment, for each of the questions in the survey workflow stages, the corresponding set of rules/algorithms is examined to determine whether and how the question should be sent to the user. Based on the rules/algorithms, the question is transmitted to the user device and a user response is received in return. Subsequently, a user profile and/or an agent profile may be updated based on the survey responses. A survey workflow and the corresponding survey rules/algorithms may be configured by an administrator of the corresponding client via a configuration interface and stored in a client database associated with the client.

Figure 30:
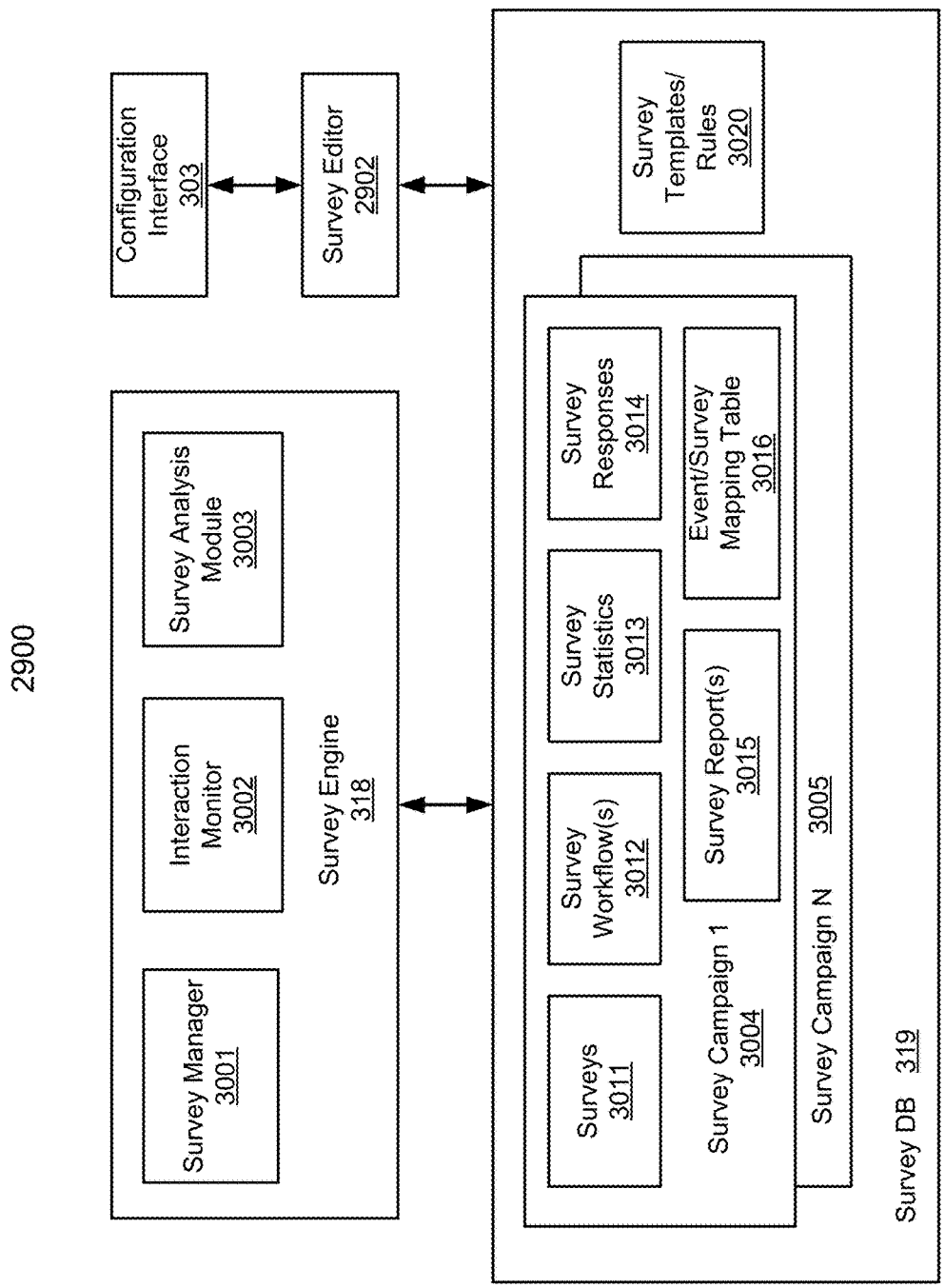
FIG. 30 is a block diagram illustrating a survey system according to one embodiment of the invention.

FIG. 30 is a block diagram illustrating a survey system according to one embodiment of the invention. Referring to FIG. 30, survey system 2900 includes survey engine 318 communicatively coupled to survey database 319. Survey engine 318 may be loaded into a memory and executed by one or more processors. Survey database 319 may be stored in a persistent storage device and data stored in survey database 319 can be loaded into the memory and accessed by survey engine 318. Survey system 2900 further includes configuration interface 303 to allow an administrator to create and edit the survey data stored in survey database 319 using survey editor 2902.

In one embodiment, survey database 319 includes survey information of multiple survey campaigns 3004-3005, which may be set up and configured by an administrator of a particular client that provides products or services to users. Each survey campaign includes one or more surveys 3011, one or more survey workflows 3012, survey statistics or status 3013, survey responses 3014, survey reports 3015, and event-survey mapping table 3016. Surveys 3011 include the individual survey questions. Survey workflows may be configured to have multiple survey workflow stages representing a series of survey questions, each survey workflow stage corresponding to one of surveys 3011. Surveys 3011 and survey workflows 3012 may be created and configured using survey templates or rules/algorithms 3020 associated with the client. Survey statistics 3013 stores status of the outstanding surveys that have been sent to a target (e.g., user and/or agent), but a response has not been received. Survey responses 3014 store the survey responses received from targets, i.e., users and agents. The survey responses 3014 and survey statistics 3013 may be analyzed by survey analysis module 3003, which may in turn generates survey reports 3015 for the clients.

According to one embodiment, when a user interacts with content presented via a mobile application of a user device of the user (e.g., user device 101), an interactive event is received by interaction monitor 3002. The interactive event may be received from user device 101 of the user, agent connect system 115, and/or agent matching system 120. In response to the interactive event, interaction monitor 3002 performs a lookup operation based on an event ID of the interactive event in event-survey mapping table 3016 to determine a survey ID or survey workflow ID. In one embodiment, event-survey mapping table 3016 includes multiple entries, each entry mapping an interactive event to a survey ID identifying one of surveys 3011 or survey workflows 3012. An example of event-survey mapping table is shown in FIG. 31A. Referring now to FIG. 31A, each mapping entry further includes one or more targets that the corresponding survey or survey workflow should target, e.g., a user and/or an agent.

Referring back to FIG. 30, based on the survey ID and the target(s) obtained from event-survey mapping table 3016, survey manager retrieves the corresponding survey from surveys 3011 and/or via survey workflows 3012 and transmits the survey to the target(s). Once a survey has been sent, its survey statistics stored in survey statistics 3013 may be updated. An example of survey statistics 3013 is shown in FIG. 31B. Referring to FIG. 31B, the survey statistics is illustrated in a form of a table having multiple entries. Each entry corresponds to a target (e.g., a user or agent) identified by target ID 3101 that has received a survey from survey system 2900. The target may or may not has responded to the received survey, which may be indicated via survey status 3104. Survey ID uniquely identifies a survey or survey workflow. Each entry further stores a number of time the survey has been sent to the target in field 3103 and the most recent survey date 3105.

Referring now to FIGS. 30 and 31A-31B, when an interactive event of a target (e.g., user or agent) is received, according one embodiment, interaction monitor 3002 performs a lookup operation in survey statistics 3013 as shown in FIG. 31B based on a target ID of the target to determine whether there is any outstanding survey that has been sent to the target, but has not received a response based on status 3104. If so, survey manager 3001 may send the outstanding survey to a target device of the target and increment survey count 3103. In one embodiment, if the survey count 3103 exceeds a predetermined threshold (e.g., three), according to a survey rule, the outstanding survey will no longer be sent to the target, because it is unlikely the target will respond. According to another embodiment, if a survey has been performed a while ago (e.g., more than a predetermined period of time ago), which may be determined based on the most recent survey date 3105, the same survey may also be resent to the target for updated feedbacks.

As described above, the entire process of matching a user with agents and providing support via a support workflow is based on a particular interaction session, which may be initiated from a user interaction of a browsing session or user session. When the browsing session ends, the life cycle of the interaction session ends as the corresponding user journey ends. The activities or data during the life cycle of the interaction session are recorded in an interaction context object, which may be stored in a persistent storage device as part of interaction history. During the lifecycle of the interaction session, there may be multiple interactive events that are generated, for example, initiated from a user, an agent, or a predefined condition (e.g., iBeacon and Geofence). For each of the interactive events, there may be a survey associated with the event. In response, the survey system automatically identifies and sends the corresponding survey to the user and/or agent to collect user data and/or agent data, which may be used to update the user profile and/or agent profile.

Figure 32:
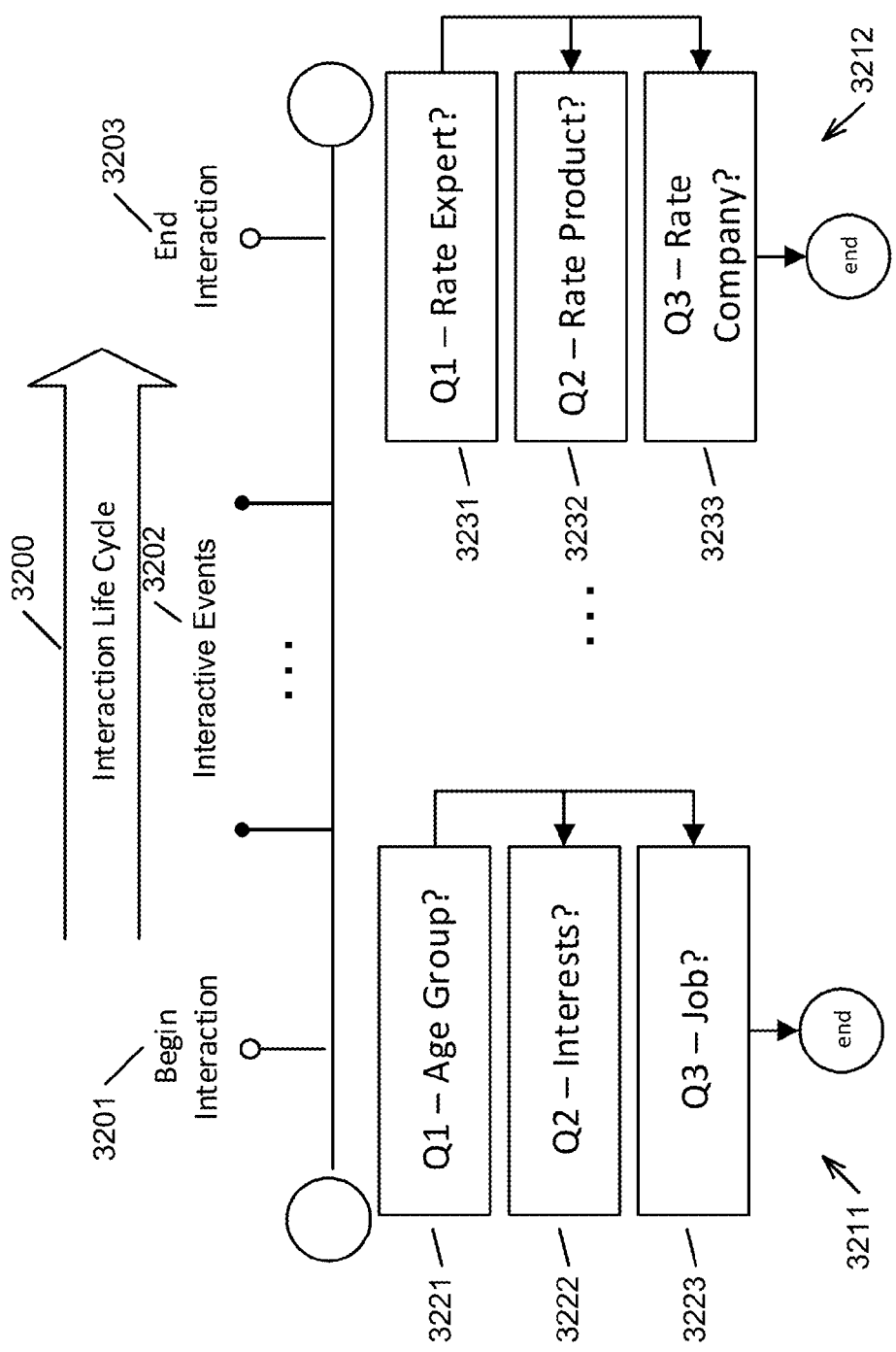
FIG. 32 is a block diagram illustrating an example of an interaction life cycle according to one embodiment of the invention.

FIG. 32 is a block diagram illustrating an example of an interaction life cycle according to one embodiment of the invention. Referring to FIG. 32, during interaction life cycle 3200 (i.e., a user journey), there may be multiple interactive events 3201-3203 that occur, which may be triggered by a user interaction, an agent interaction, or certain preconfigured conditions. Each of interactive events 3201-3203 may or may not be associated with a survey or survey workflow dependent upon the specific configuration of the corresponding client. In this example, interactive event 3201 (e.g., an event indicating the start of the interaction session) is associated with survey workflow 3211 having survey workflow stages 3221-3223. Similarly, interactive event 3203 (e.g., an event indicating the end of the interaction session) is associated with survey workflow 3212 having survey workflow stages 3231-3233.

According to one embodiment, in response to interactive event 3201, survey 3211 is identified based on an interactive event 3201, for example, using event/survey mapping table 3016. Survey 3211 is then transmitted to a target associated with survey 3211, which may be a user, an agent, or both. Note that survey 3211 may be single survey having questions 3221-3223 listed in a single page in which the target can respond. Alternatively, survey 3211 may be a survey workflow having survey workflow stages 3221-3223, where a question or questions of each workflow stage is transmitted and represented to the target in a serial manner. The question (s) of a workflow stage may be presented in a manner dependent upon the response(s) of a previous workflow stage of the workflow received from the target. How the survey is represented to a target may be configured based on a survey rule associated with that particular workflow stage.

Figure 33:
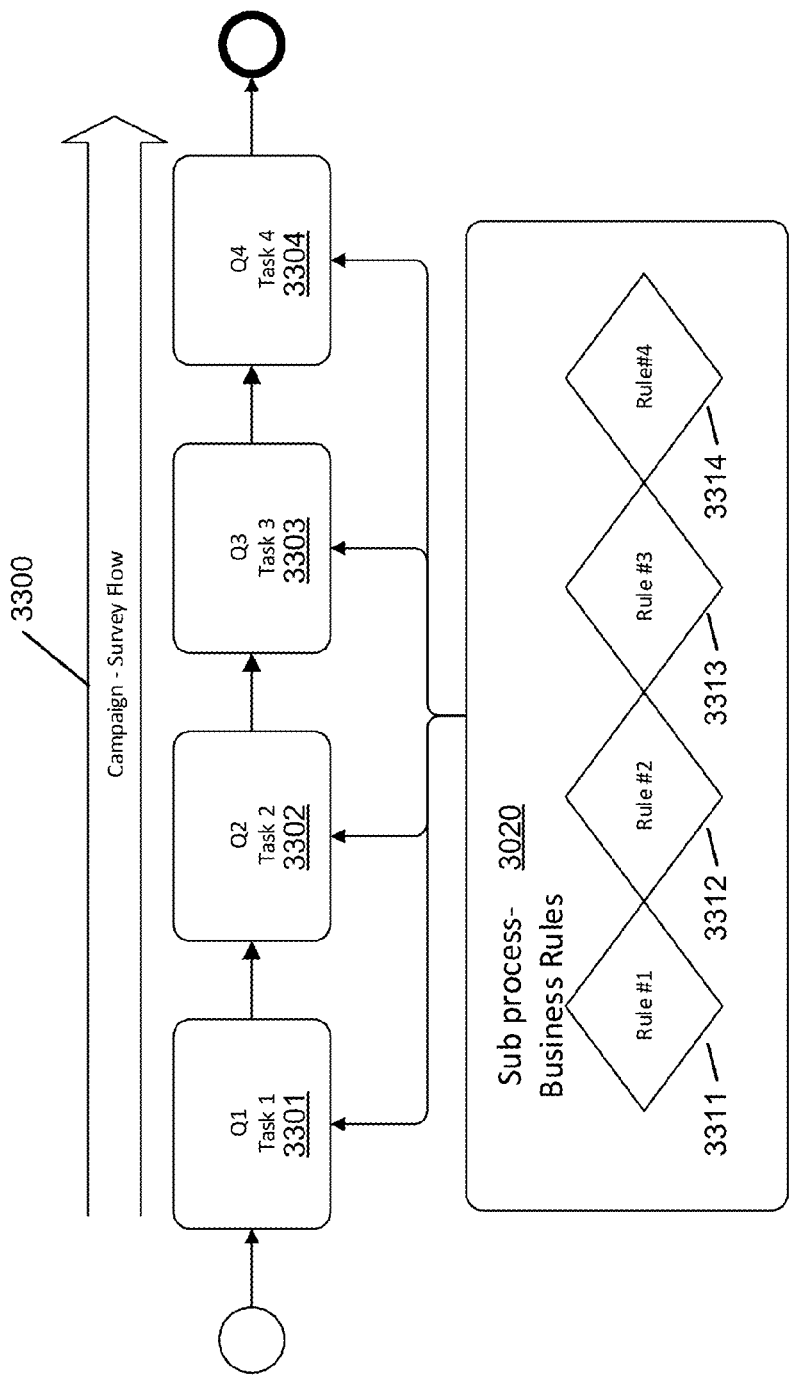
FIG. 33 is a block diagram illustrating an example of a survey workflow according to one embodiment of the invention.

FIG. 33 is a block diagram illustrating an example of a survey workflow according to one embodiment of the invention. Referring to FIG. 33, Survey workflow 3300 includes multiple workflow stages 3301-3304. Each of workflow stages 3301-3304 is associated with a survey having one or more questions or queries. Each of workflow stages 3301-3304 is governed by a respective one of survey rules/algorithms 3311-3314, which may be configured by an administrator of a corresponding client, for example, using a survey editor. A rule of a workflow stage may include information regarding how the corresponding question(s) should be represented to a target. In one embodiment, a survey rule may also specify whether the question is a mandatory question or an optional question. If a question is a mandatory question, the target is required to respond before advancing to a next question. If a question is an optional question, a decline option is presented to the target to allow the target to decline or skip responding to the question. Each of workflow stages 3301-3304 may be handled via a specific task, such as, for example, via a separate process or thread.

Figure 34A:
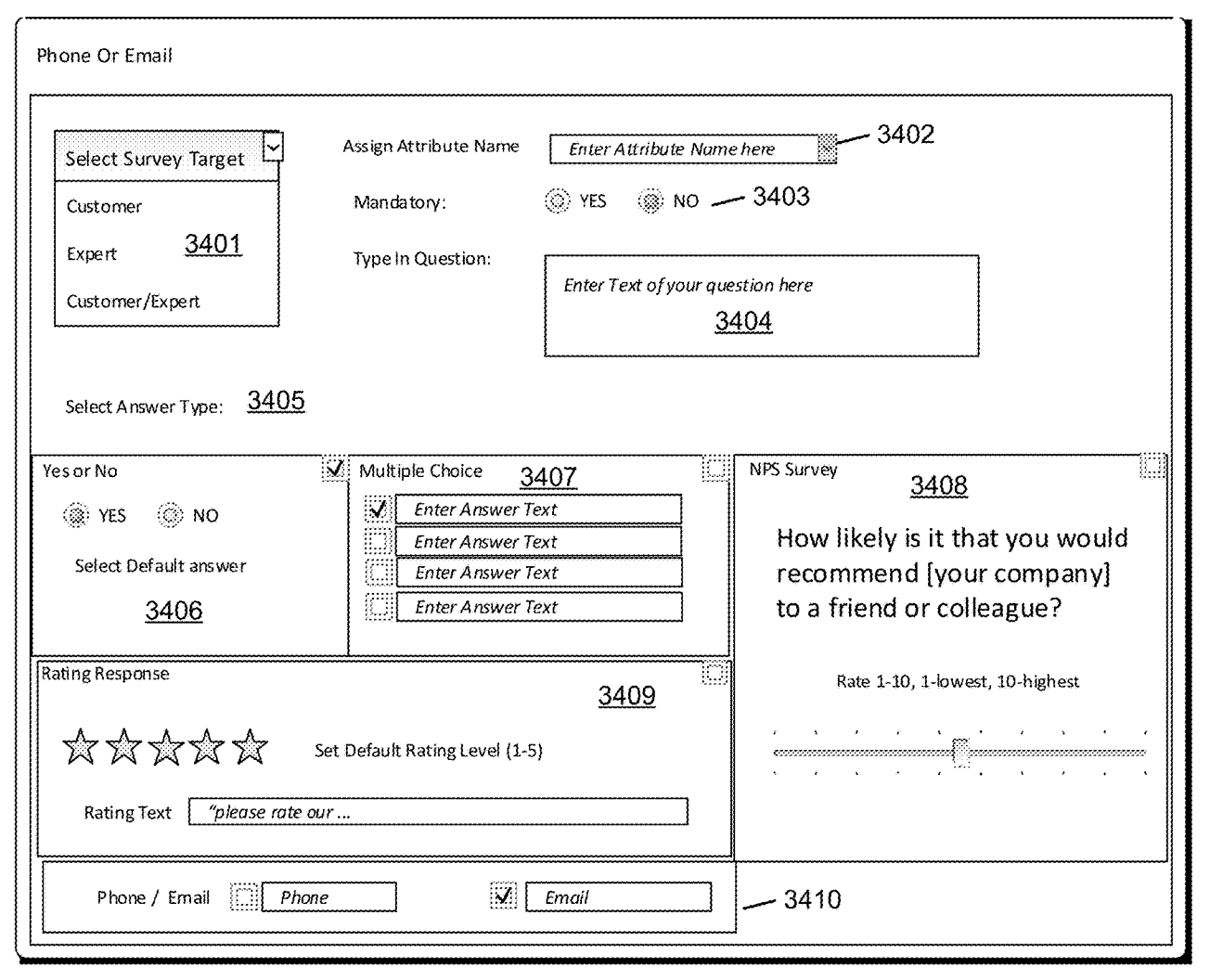

FIGS. 34A and 34B are screenshots illustrating examples of a graphical user interface for editing a survey according to certain embodiments of the invention. For example, the GUIs as shown in FIGS. 34A-34B may be implemented as part of survey editor 2902 of FIG. 29. Referring to FIG. 34A, using a survey template as shown with a survey editor, an administrator can specify a target 3401 the survey is targeting. It can be a user, an agent, or both. Selecting both a user and an agent allows an administrator to define an attribute which can be used in the user and agent matching processes. The administrator can specify or select an attribute 3402 from a user profile or an agent profile, or a free form field, which allows the administrator to assign a name to the survey question as well as an attribute to the target's profile. The attribute name 3402 may be utilized subsequently in improvement in the iteration matching process.

In one embodiment, an administrator can specify at field 3403 whether the question is a mandatory question. If a question is a mandatory question, a target is required to respond to the question before receiving a next question or page. Otherwise, a decline option is presented to the target. At field 3404, the administrator can specify type in the question in a free form. The administrator can also specify an answer type 3405 to the question. An answer type may be a "yes-or-no" type 3406, which a target is presented with a radio selection. An answer type can be a multiple choice, where a target can select one or more of the choices. An answer type can be a rating response 3409 or a scale slider 3408. A survey can also request a target to provide its phone number or email address at field 3410. FIG. 34B shows a GUI in which a survey can be associated with a campaign. Referring to FIG. 34B, an administrator can specify one or more questions in a particular sequence order 3454 to be associated with a survey campaign 3451. A survey campaign can be configure with a starting date 3452 and optional ending date 3453.

The information collected from the survey defined in the GUI as shown in FIGS. 34A and 34B can be compiled into a survey and a survey rule, for example, by a survey rule engine (not shown). The administrator must be capable of defining when a survey would or would not be presented to the survey target. The survey rules/algorithms would allow the administrator to define a conditional statement which would be met in order to present the target a survey question. Once the administrator has defined a survey question, the administrator will be capable of defining rules/algorithms to control when or if a survey is presented to a survey target.

Referring back to FIG. 30, according to one embodiment, survey analysis module 3003 can analyze survey responses 3014 and survey statistics 3013 to generate survey reports 3015. An example of a survey report is shown in FIG. 35. Referring to FIG. 35, the survey report includes information identifying each of the surveys, a number of times each survey represented, a number of completion of the surveys (e.g., responses received from targets), etc. The survey report may be sent to the associated clients (e.g., CRM systems of the clients).

Figure 36:
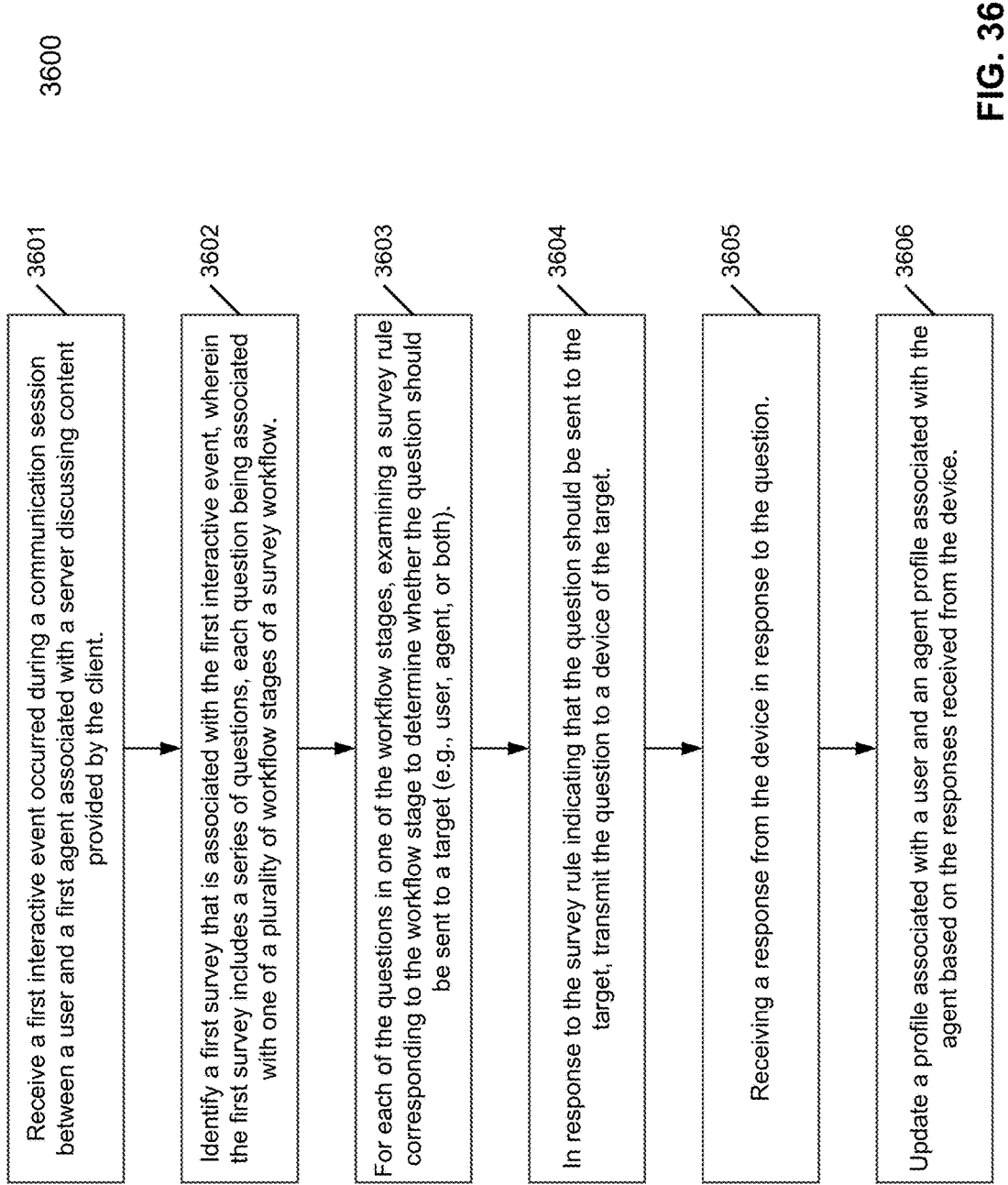
FIG. 36 is a flow diagram illustrating a process of providing surveys according to one embodiment of the invention.

FIG. 36 is a flow diagram illustrating a process of providing surveys according to one embodiment of the invention. Process 3600 may be performed by processing logic which may include software, hardware, or a combination thereof. For example, process 3600 may be performed by survey system 2900 as shown in FIG. 30. Referring to FIG. 36, at block 3601, processing logic receives a first interactive event occurred during a communication session between a user and a first agent associated with a server discussing content provided by a client. In response to the first interactive event, at block 3602, processing logic identifies a first survey that is associated with the first interactive event. The survey includes a series of questions and each question is associated with one of the workflow stages of a survey workflow. At block 3603, for each of the questions in one of the workflow stages, processing logic examines a survey rule corresponding to the workflow stage to determine whether the question should be sent to a target (e.g., a user, agent, or both). In response to the survey rule indicating that the question should be sent to the target, at block 3604, processing logic transmits the question to the target. At block 3605, processing logic receives a response from the device of the target and a profile of the target is updated accordingly at block 3606.

A survey sometimes shows a summary of a concluded communication session between a user and an agent. Typically, a summary includes information briefly describing the concluded session, which is initiated by the agent. After the communication session ends, the agent may set via its agent device the agent status to a state indicating that the agent is wrapping up the session and is not available to receiving another service request. The agent then provisions a summary message, for example, using a message template (similar to a survey template) that is associated with a client (e.g., product/service provider) associated with the concluded session. The summary is then transmitted from the agent device to a communication and routing system or platform to be transmitted to a user device via a common communication interface or gateway, which may be part of agent connect system 115. Once the summary has been sent, the communication session officially ends.

In some scenarios, shortly after a communication session ends, a user may want to get in touch with the same agent again. For example, the user may forget to ask a question or discuss a particular topic during the communication session. In a conventional system, under the circumstances, the user has to request a support service again via a common communication interface and may put in a queue. The user may end up with another agent who may not be familiar with the discussion of the previous session. Such user experience sometimes is quite frustrated.

According to some embodiments, a summery sent to a user device at the conclusion of a communication session includes a link (a button or control), which can be activated by the user to possibly reach the same agent of the concluded session. If the user activates the link within a predetermined period of time after the session ended, such an activation may extend the previously concluded session by allowing the user to reconnect with the same agent based on the activation of the link. The reconnection between the user and the same agent treats the extension of the prior concluded session. If the user activates the link after the predetermined period of time, the user may be connected to any agent, which is considered as a new session. In one embodiment, a link embedded within the summary message encodes therein information identifying the user, the agent, and certain metadata about the previously concluded session.

When such a link is activated, such information is obtained from the link and the same agent is identified. If the activation of the link was activated within the predetermined period of time from the time the message was sent, the same agent is connected with the user. In such a scenario, the current session is considered as an extension of a prior session. For example, the interaction object associated with the prior session may be retrieved and utilized for the current session for the purpose of capturing interactions between the user and the agent. Otherwise, any available agents can be assigned to the user, which may be the same or different agent, and the current session will be considered as a new session instead of an extension of a prior session.

Figure 37:
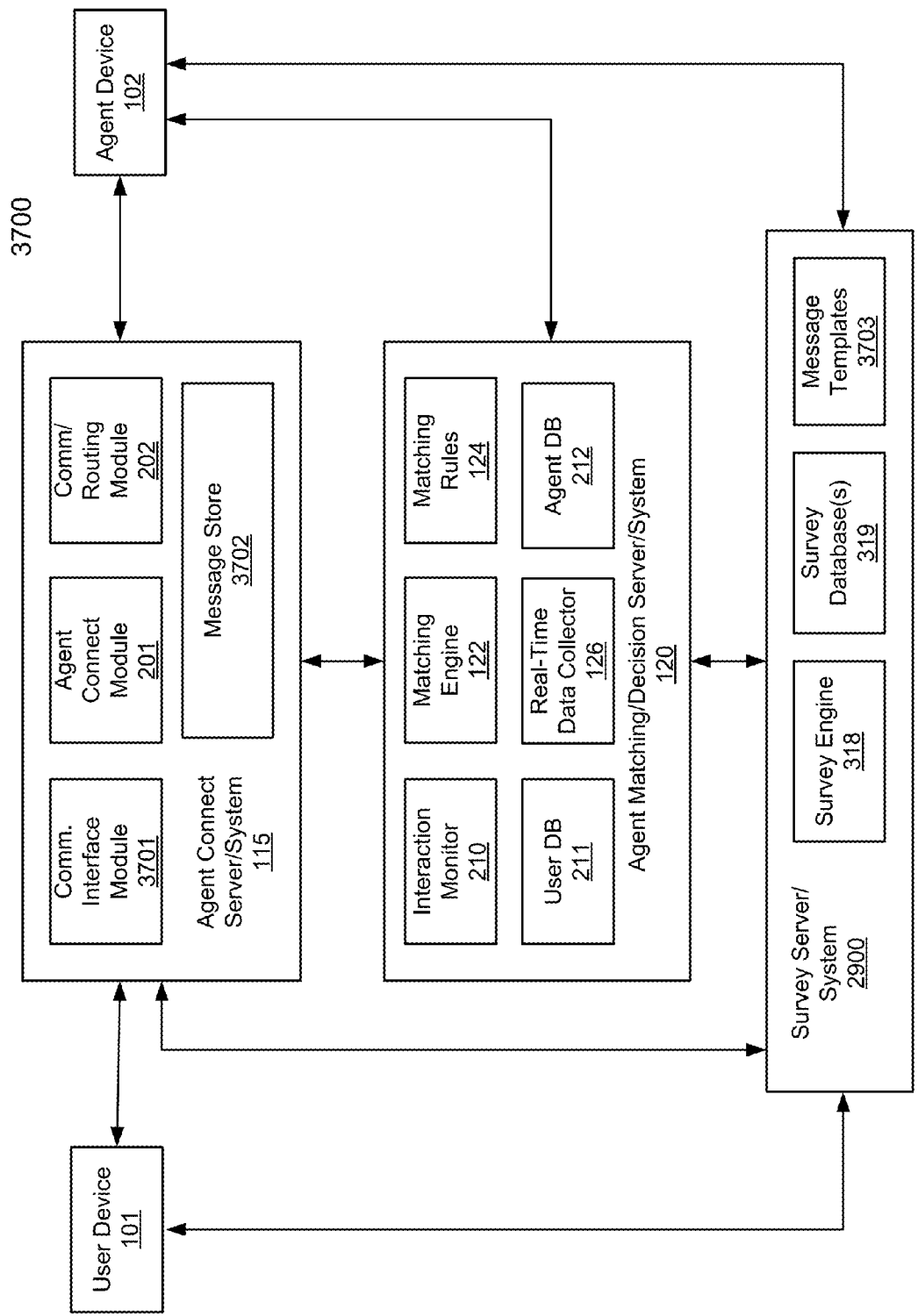
FIG. 37 is a block diagram illustrating an agent connect system according another embodiment of the invention.

FIG. 37 is a block diagram illustrating an agent connect system according another embodiment of the invention. Referring to FIG. 37, survey system 3700 is communicatively coupled to agent connect system 115 and agent matching system 120. These systems may be integrated within a server and communicate with each other via a set of APIs. Alternatively, these systems may operate in a separate server and communicate with each other over a network using a variety of communication protocols. System or server 2900 provides a set of survey or message provisioning services to agent devices 102, agent connect system 115, and agent matching system 120 in a client-server manner.

According to one embodiment the invention, as described above, system 3700 is an interactive event driven survey system utilized to survey or collect user satisfaction or feedback data concerning the support services provided by the agent or agents. In one embodiment, system 3700 receives an interactive event during a communication session between user device 101 and agent device 102 discussing content presented to the user by a client (e.g., enterprise or corporate client). The interactive event may be captured by and received from an interaction monitor of agent connect system 115 (not shown) and/or interaction monitor 210. Alternatively, the interactive event may be received directly from user device 101.

In response to the interactive event, survey engine 318 identifies a survey from survey database 319 based on the interactive event, where survey database 319 may maintain many surveys that have been configured to be associated with a variety of different interactive events. Survey engine 318 transmits the identified survey to user device 101 and/or agent device 102, dependent upon the interactive event and its associated survey rules/algorithms, which may be configured by an administrator using survey editor 2902 via a configuration interface. Alternatively, the survey may be sent to agent matching system 120 or agent connect system 115, which may then forward the survey to user device 101 and/or agent device 102. User and/or agent responses may be received from user device 101 and/or agent device 102. Alternatively, the responses may be received via agent connect system 115 and/or agent matching system 120.

In one embodiment, each survey is represented by a survey workflow having s series of survey workflow stages. Each survey workflow stage is associated with a specific survey question and a set of one or more rules/algorithms that governs how the corresponding question should be presented to the user. In one embodiment, for each of the questions in the survey workflow stages, the corresponding set of rules/algorithms is examined to determine whether and how the question should be sent to the user. Based on the rules/algorithms, the question is transmitted to the user device and a user response is received in return. Subsequently, a user profile and/or an agent profile may be updated based on the survey responses. A survey workflow and the corresponding survey rules/algorithms may be configured by an administrator of the corresponding client via a configuration interface and stored in a client database associated with the client.

Survey system 2900 further includes a set of message templates 3703, which may be configured by an administrator of the clients. Message templates 3703 may be used by an agent such as an agent of agent device 102 to generate a message to be transmitted to a user such as a user of user device 101. Note that a message generated based on message templates may be incorporated with a survey and stored in survey database 319. Similarly, message templates 3703 may be incorporated with survey templates 3020 of survey database 319. Message templates 3703 may be per client basis, per product/service basis, per subject matter basis, or per campaign basis, etc.

According to one embodiment, during or at the conclusion of a communication session between user device 101 and agent device 102, an agent can send a message from its agent device 102 to user device 101. The message may be transmitted via a variety of communication channels, such as, for example, text, chat, SMS, email, social media, or a combination thereof. For the purpose of illustration, a message is sent from agent device 102 through system 3701, which in turn transmits the message to user device 101 via SMS. For example, agent device 102 may send a message directly to agent connect system 115, which in turn forwards the message to user device 101 via a common communication interface or gateway, without having to exposing the device information of agent device 102. Alternatively, agent device 102 may send a message via survey system 2900 (e.g., as part of a survey message), where the survey system 2900 forwards the message to user device 101 or to agent connect system 115.

In one embodiment, when an agent of agent device 102 decides to send a message to a user of user device 101, the agent may create a message using one of the message templates 3703 via a message editing interface at agent device 102. The message includes a link, a button, or a control that can be activated when the message is presented at user device 101 in response to user interaction. The link may encode therein information that identifies the user, the agent, and/or a subject matter of the message. For example, the encoded information may include information identifying a prior communication session between the user and the agent, where the message may serve as a summary or survey of the prior communication session. In one embodiment, the encoded information may include a user device ID identifying user device 101 and an agent ID identifying the agent.

When the message with a link or control embedded therein is received at agent connect system 115, the message is cached in message store 3702. In one embodiment, message store 3702 includes message entries, where each message entry corresponds to one of outbound messages to be sent to remote user devices. Each message entry stores information identifying the corresponding message, such as, for example, metadata of the message and content of the message. In one embodiment, when a message is received from agent device 102, routing module 202 and/or communication interface module 3701 creates a new message entry in message store 3702 for the new outgoing/outbound message. The routing module 202 and/or communication interface module 3701 extracts metadata of the message and stores the metadata and the message in the newly created message entry. Thereafter, the message is scheduled to be transmitted to user device 101 by communication interface module 3701. Interface module 3701 transmits the message to a proper communication gateway of a message carrier or service provider (e.g., SMS carrier or service provider), which is then routed to user device 101.

Communication interface module 3701 may be implemented as part of an Omni-channel platform as a frontend platform. An Omni-channel platform enables or allows the same information to be available to customers in multiple formats—from cell phone apps to websites to wireless devices like tablets. The Omni-channel platform also offers the ability to market to a customer based on his or her preferred touch points, social networks, purchasing history, website visits, and so forth. In addition, the Omni-channel platform may develop intelligence about consumer preferences, for example based on his contact habits. For example, a customer contacting a company through their cell phone will receive voice alerts, as the platform identified it as the preferred medium.

Referring back to FIG. 37, when a user of user device 101 activates the link or control within the message received at user device 101, the user's browser is opened with the URL, is directed to the system and received by communication interface module 3701. In this example, the link in the SMS is a request to get back to the system to re-initiate the session with the agent previously servicing the interaction with the user. The request may further include some of the information encoded within the link or control, which may be obtained from the link or control in response to the activation of the link or control. In response to the signal or request, according to one embodiment, interface module 3701 determines a user device ID that identifies user device 101 based on the request, as well as some metadata about the message received by user device 101. The user device ID can be one of an automated number identification (ANI) number, media access control (MAC) address, an international mobile subscribed identity (IMSI) number, mobile equipment ID (MEID), international mobile equipment identity (IMEI), or an electronic serial number (ESN).

Based on the user device ID, according to one embodiment, agent connect module 201 or routing module 202 performs a lookup in message store to determine whether there is a message entry matching the user device ID. If there is a matching message entry found, an agent ID is determined from the message entry and the request is routed to an agent device of an agent identified by the agent ID. As a result, the user can reconnect with the same agent for the prior session. By reconnecting with the same agent of the prior session, the user and the agent can spend less time to explain the circumstances surrounding the topic. The flexibility of extending a prior session may in turn reduce the required processing power or resources of the server and allow more users and agents to access the resources of the server. If the same agent of a prior session is not available (e.g., based on agent state in an agent database), the system can search for a different agent with the same or similar traits and skills of the original agent, using some of the agent matching techniques described above. If the user is connected to a different agent, the user and the new agent may have to spend more time to understand the issues. By requiring a new session with a new agent, it may consume more processing resources of the computer servers and network bandwidth, and prevent other users and agents from accessing the computing resources.

In one embodiment, in response to a matching message entry, agent connect module 201 determines whether the response to the message is received within a predetermined period of time (e.g., 48 hours) from the time the message was sent (referred to here as sent time). If the response is received within the predetermined time period, the agent who initiated the message is selected to be connected with the user. Otherwise, a new agent is searched and matched via agent matching system 120 as described above, which will end up with the same or a different agent dependent upon the circumstances. As a result, if a user of a prior session wants to reconnect with the same agent shortly after the session ended (e.g., something the user forgot to discuss), the user can activate the link within a short period of time to extend the prior session to reconnect with the same agent.

Figure 38:
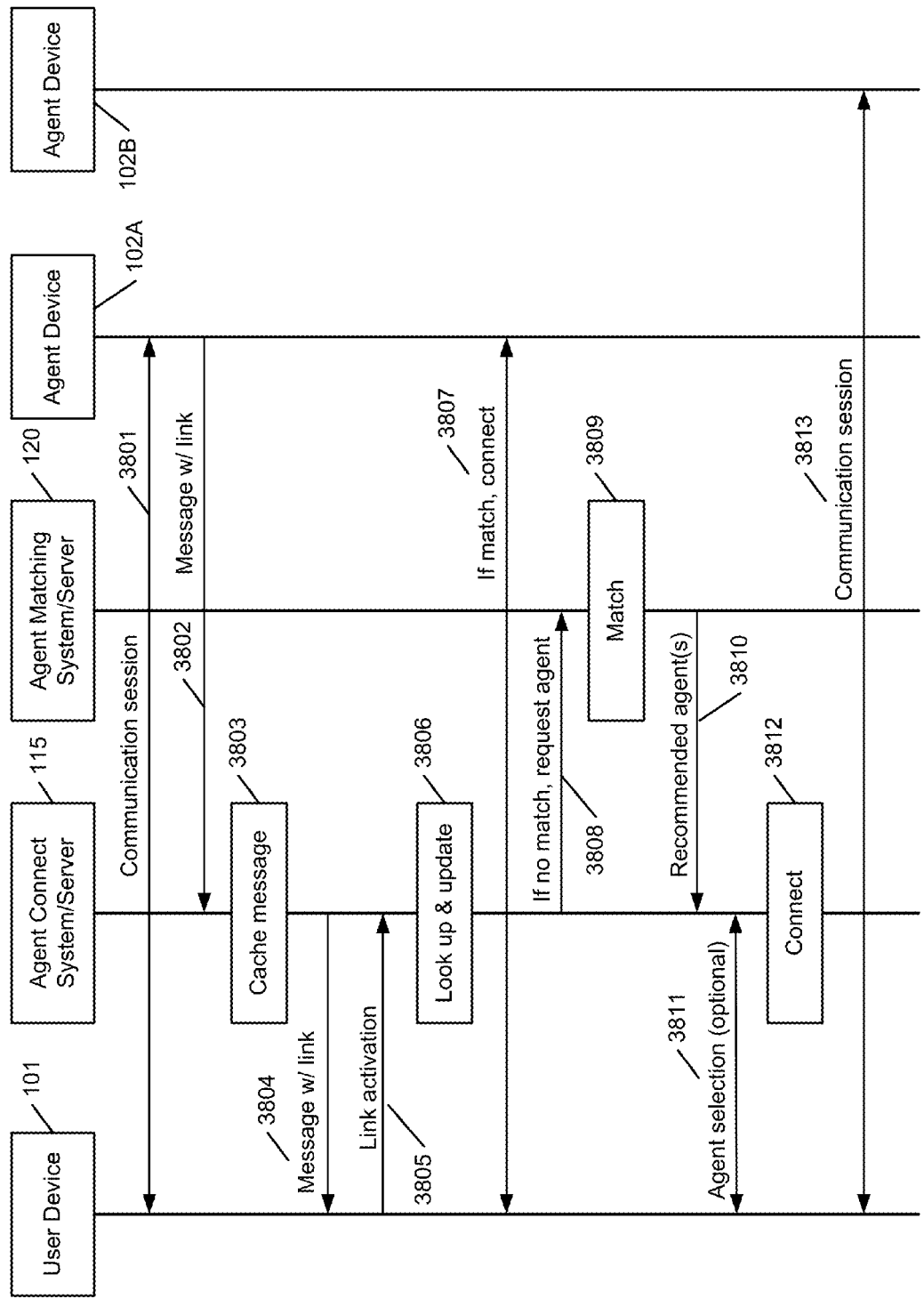
FIG. 38 is a transactional flow diagram illustrating transactions amongst different systems according to one embodiment of the invention.

FIG. 38 is a transactional flow diagram illustrating transactions amongst different systems according to one embodiment of the invention. Referring to FIG. 38, transactional flow 3800 may be processed by system 3700 of FIG. 37. At transaction 3801, a communication session (e.g., voice, chat) is established and conducted between a user of user device 101 and a first agent of agent device 102A. The agent of agent device 102A may be searched and matched using at least some of the techniques described above. At the conclusion of the session, at transaction 3802, the first agent sends a summary or survey describing or summarizing the session to agent connect system 115. The message includes a link or control which can be activated by a user when the message is presented.

At block 3803, the message is analyzed and stored in a message store, such as message store 3702. Certain metadata of the message is also extracted and stored in the message store. As described above, the message store stores message entries, each corresponding to one of the messages sent to remote devices of recipients. When the message is received via transaction 3802, a new message entry is created in the message store for storing the message and the metadata of the message. The metadata may include information identifying a user device that receives the message and an agent ID identifying an agent of agent device 102A. An example of the message store is shown in FIG. 39, which will be described in details further below.

At transaction 3804, the message with link or control is transmitted to user device 101. The link is a part of a click-to-chat or click-to-call functionality, which when activated, causes user device 101 to access a predetermined URL of a Web page. The user can then request to connect with an agent for chat or voice call. Assuming the user of user device 101 interacts with the link, a request to connect with an agent is received by agent connect system 115 via transaction 3805. At block 3806, a device ID of user device 101 is determined based on the request and a lookup operation is performed in the message store. As described above, the link or control may encode information that can be utilized to identify certain metadata associated with a prior communication session between the user and the agent, such as a device ID of user device 101 and/or an agent ID identifying the agent. If there is a message entry matching the information extracted from the request is found, at transaction 3807, the agent is identified as a preferred agent and a communication session is established between the user and the same agent as of the prior session.

If there is no matching message entry found in the message store, at transaction 3808, agent connect system 115 send a request to agent matching system 120 requesting an agent having a profile that matches the user's profile. At block 3809, agent matching system 120 performs any necessary matching operations as described above to identify one or more agent candidates as recommended agents. Note that the recommended agents may include the same agent who conducted the prior session. The recommended agents are then transmitted to agent connect system 115. The recommended agents may be transmitted to user device 101 for user selection. Alternatively, agent connect system 115 may select one of the recommended agents without user selection. At block 3812, agent connect system 115 establishes a communication session between user device 101 and agent device 102B of the selected agent. The communication session is conducted via transaction 3813. Note that at the conclusion of communication session 3813, a summary or survey having a link may be transmitted to user device 101 again and the above operations may be iteratively performed.

FIG. 39 is a block diagram illustrating an example of a message store according to one embodiment of the invention. Referring to FIG. 39, message store 3702 may be stored as a database in a persistent storage device (e.g., hard drives) associated with agent connect system 115. Message store 3702 includes message entries, where each message entry corresponds to a message that has been initiated by an agent and sent to a user device of a user. A message may be sent via a variety of messaging channels, such as text, SMS, email, or social media. A message may be part of a survey or summary provisioned by an agent at the conclusion of a communication session. As described above a message may further include a link that can be activated by a user. Such a link, which when activated, may cause a request to be sent back to agent connect system 115 for the purpose of reaching the same agent who initiated the message. For example, a link may include functionality of click-to-chat, click-to-call, or click-to-video, etc.

When agent connect system 115 receives an outgoing message from an agent, a new message entry is created in message store 3702. The message and certain metadata of the message extracted and stored in the newly created message entry. Each message entry includes various fields to store various information of the message. Field 3901 is to store a message ID uniquely identifying the message. Field 3902 is to store a destination ID or user device ID that identifies a user device that will receive the message. The message itself may be cached in field 3903, where a message can be as simple as "thank you." State field 3904 is to store the state of the message, including amongst others, a "pending" state, a "sent" state, and a "response received" state. A "pending" state indicates that a corresponding message has been queued in message store 3702, but has not been sent. A "sent" state indicates that a corresponding message has been sent to a user device, but it has not received any response. A "response received" state indicates that a response of a message sent to a user device has been received.

Field 3905 is to store a timestamp representing the time when the corresponding message is sent to a user device. Field 3906 is store an agent ID identifying an agent who initiated the message. Field 3907 is to store a user ID or user profile information of a user associated who had a prior communication session with the agent. Optional field 3908 is to store a timestamp representing the time a response to the message is received. Note that message store 3702 is described for the purpose of illustration only. More or fewer fields may be included.

When a message is received to be sent to a user device, according to one embodiment, the metadata of the message and the link embedded therein may be analyzed and certain information may be extracted and stored in a new message entry of message store 3702. For example, a link may include information encoded therein at least some of message ID 3901, user device ID 3902, message content 3903, agent ID 3906, or user ID 3907. Message state 3904 is set to a "pending" state. In one embodiment, a message processing thread or communication interface module 3701 is to periodically parse message entries of message store 3702 to identify any pending messages having a "pending" state. The message processing thread then sends the pending messages to proper destinations accordingly. The message processing thread further updates sent timestamp 3905 to store the time the message is sent and update message state from a "pending" state to a "sent" state.

When a response to message is received from a user device in response to an activation of a link embedded therein, the response may include the information that has been encoded in the link. In one embodiment, communication interface module 3701 analyzes and extracts the information from the response. Based on the extracted information, agent connect module 201 performs a lookup operation in message store 3702 to identify or locate a message entry corresponding to the message. For example, agent connect module 201 may search in message store 3702 based on one or more of user device ID 3902, message content 3903, agent ID 3906, or user ID 3907.

Once a message entry corresponding to the response has been identified, an agent who conducted a prior communication session with the user and initiated the message is identified based on agent ID 3906. Agent connect module 201 then instructs routing module 201 to establish a new communication session between the user device and an agent device of the agent, such that the user can reach the same agent of a prior session. In addition, an interaction context object associated with the prior session may also be routed to an agent device of the agent to extend the prior session. Meanwhile, message state 3904 of the message entry is updated from a "sent" state to a "response received" state and optionally, received timestamp 3908 is also updated to reflect the time the response was received.

According to one embodiment, prior to establishing a new communication session between the user and the same agent of a prior session, agent connect module 201 examines received timestamp 3908 to determine whether the response was received within a predetermined time period from sent timestamp 3905 (e.g., 48 hours). A communication session between the user and the same agent is established if the response was received within the predetermined period of time from the time the message was sent. Otherwise, agent connect module 201 communicates with agent matching system 120 to identify a matching agent as described above.

In one embodiment, when the response was received within the predetermined period of time, the availability of the same agent of the prior session is examined. If the agent is unavailable at the point in time, a further message may be sent to the user device indicating that the agent is unavailable at the time. The message further requests whether the user wants to wait for the same agent or wants to connect with another agent. The message may further indicate the waiting time for the agent. If the user would like to wait, a request for connecting the user with the agent is placed into a queue associated with the agent. Otherwise, the request may be placed in a general queue.

The predetermined time period may be specifically associated with the message or message entry. In one embodiment, some types of messages (e.g., messages of different clients) may be associated with different time periods, which may be specified in an additional field in message store 3702 (and/or specified by a corresponding agent). Alternatively, the period of time may be configured in a client database of a corresponding client. For example, some of the enterprise clients may prefer a longer or shorter period of time to allow their customers to reach the same agents.

Figure 40:
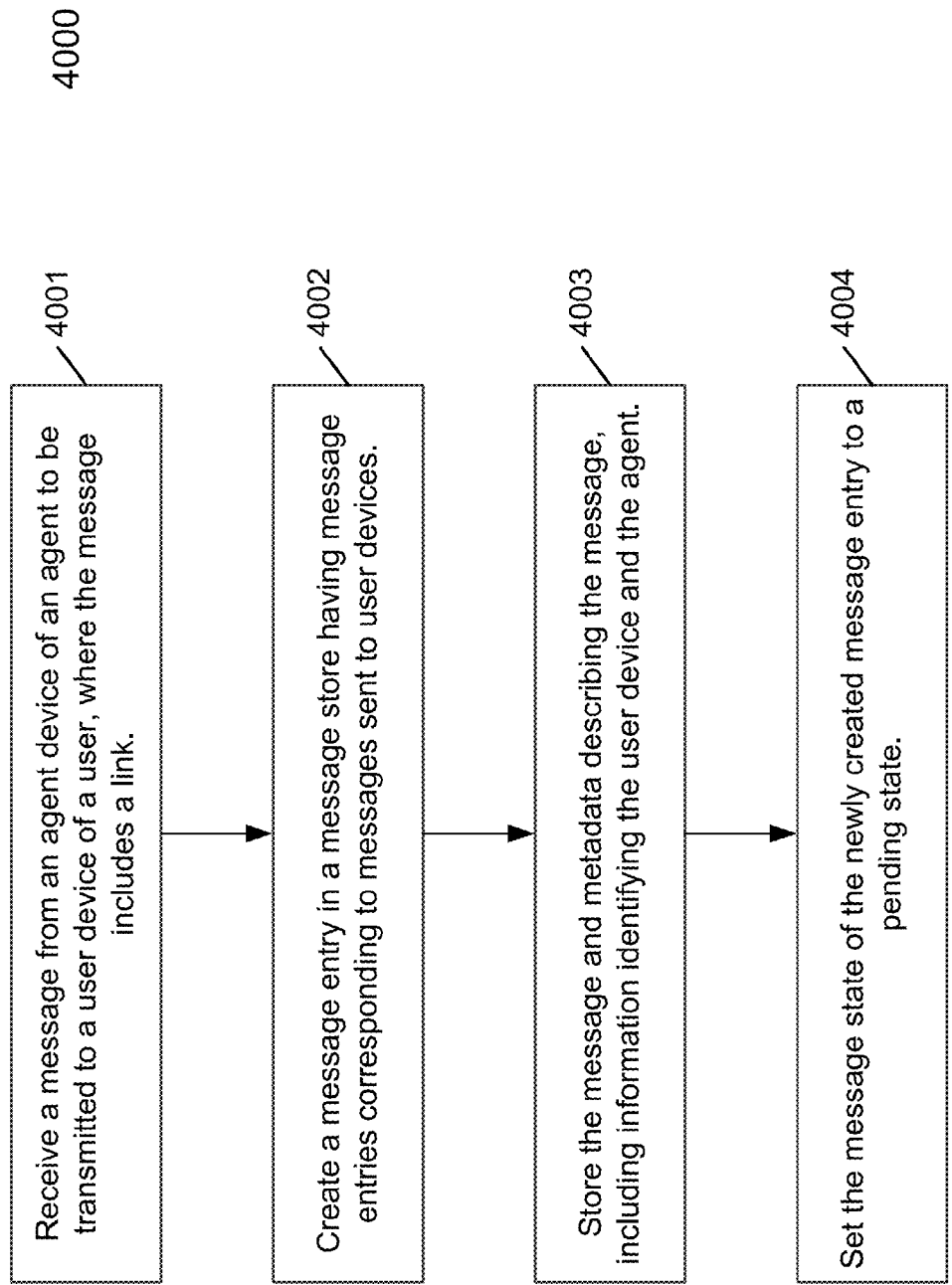
FIG. 40 is a flow diagram illustrating a process performed in an agent connect system according to one embodiment of the invention.

FIG. 40 is a flow diagram illustrating a process performed in an agent connect system according to one embodiment of the invention. Process 4000 may be performed by processing logic which may include hardware, software, or a combination thereof. For example, process 4000 may be performed by system 3700 of FIG. 37. Referring to FIG. 40, at block 4001, processing logic receives a message from an agent device of an agent to be transmitted to a user device of a user. The message includes a link having information encoded therein certain metadata about a prior communication session between the agent and the user concerning a product or service provided by a product/service provider as a corporate client. At block 4002, processing logic creates a message entry in a message store for the received message. The message store includes message entries, each message entry corresponding to an outgoing message sent to a user device of a user. At block 4003, processing logic stores the message and its metadata in the newly created message entry. The metadata of the message may include information identifying a user device of a recipient and an agent who initiated the message. At block 4004, processing logic sets the state of the message in the new message entry in a "pending" state, indicating that the message is pending to be sent to a user.

Figure 41:
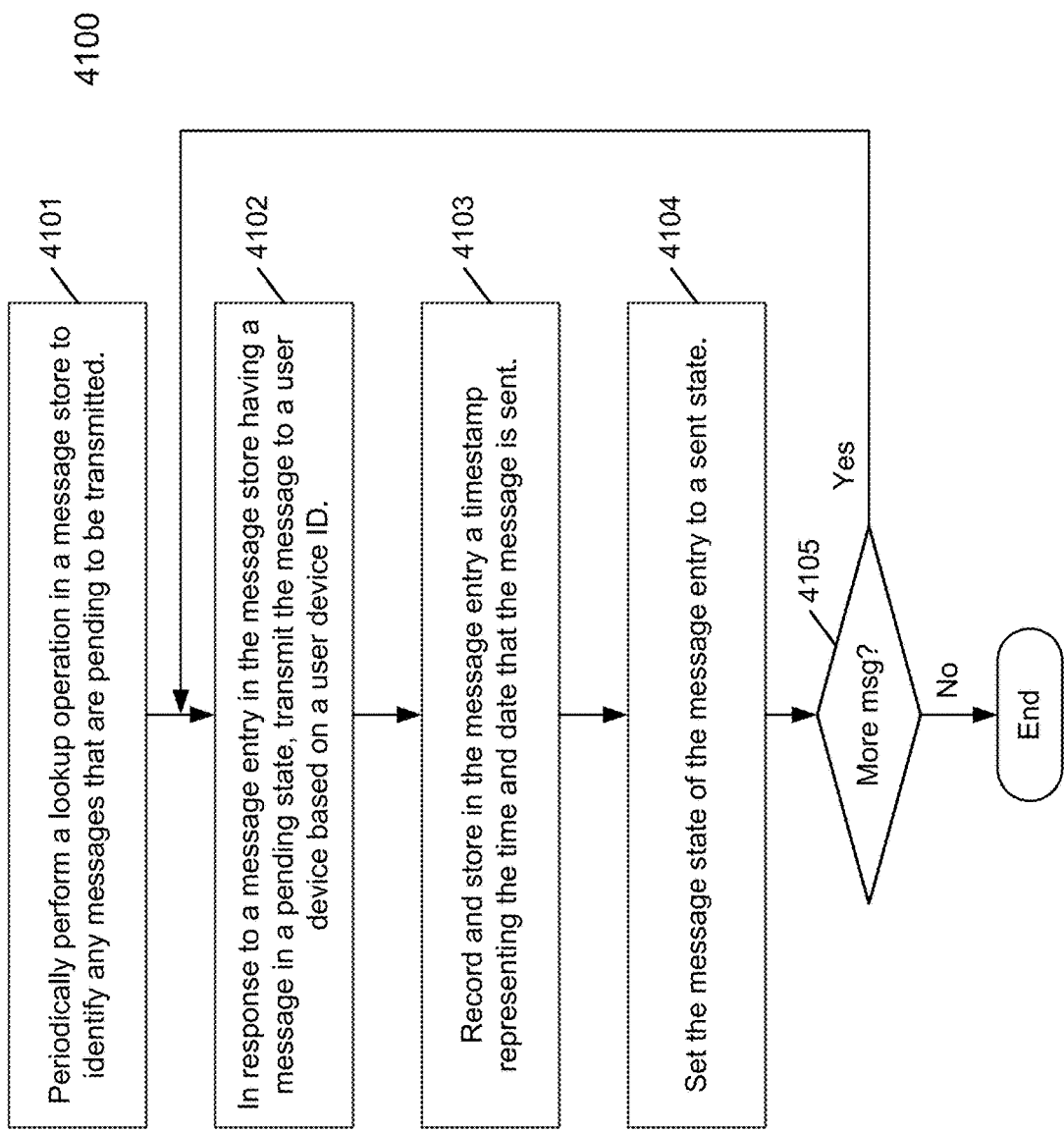
FIG. 41 is a flow diagram illustrating a process performed in an agent connect system according to another embodiment of the invention.

FIG. 41 is a flow diagram illustrating a process performed in an agent connect system according to another embodiment of the invention. Process 4100 may be performed by processing logic which may include hardware, software, or a combination thereof. For example, process 4100 may be performed by system 3700 of FIG. 37. Referring to FIG. 41, at block 4101, processing logic periodically looks up in a message store to parse and identify any message entries that have a "pending" state. It is assumed that the pending message has been recorded in the message store by processing logic associated with process 4000 of FIG. 40. For each of the pending message, at block 4102, processing logic transmits a corresponding message to a user device specified in the message entry or in the message. At block 4103, processing logic captures the time of sending the message and records the time as a sent timestamp in the message entry. At block 4104, processing logic sets the message state of the sent message from a "pending" state to a "sent" state to indicate that the message has been sent. Note that processes 4000 and 4100 may be performed by the same processing logic within the same thread or alternatively, they may be performed by different processing logic of different threads.

Figure 42:
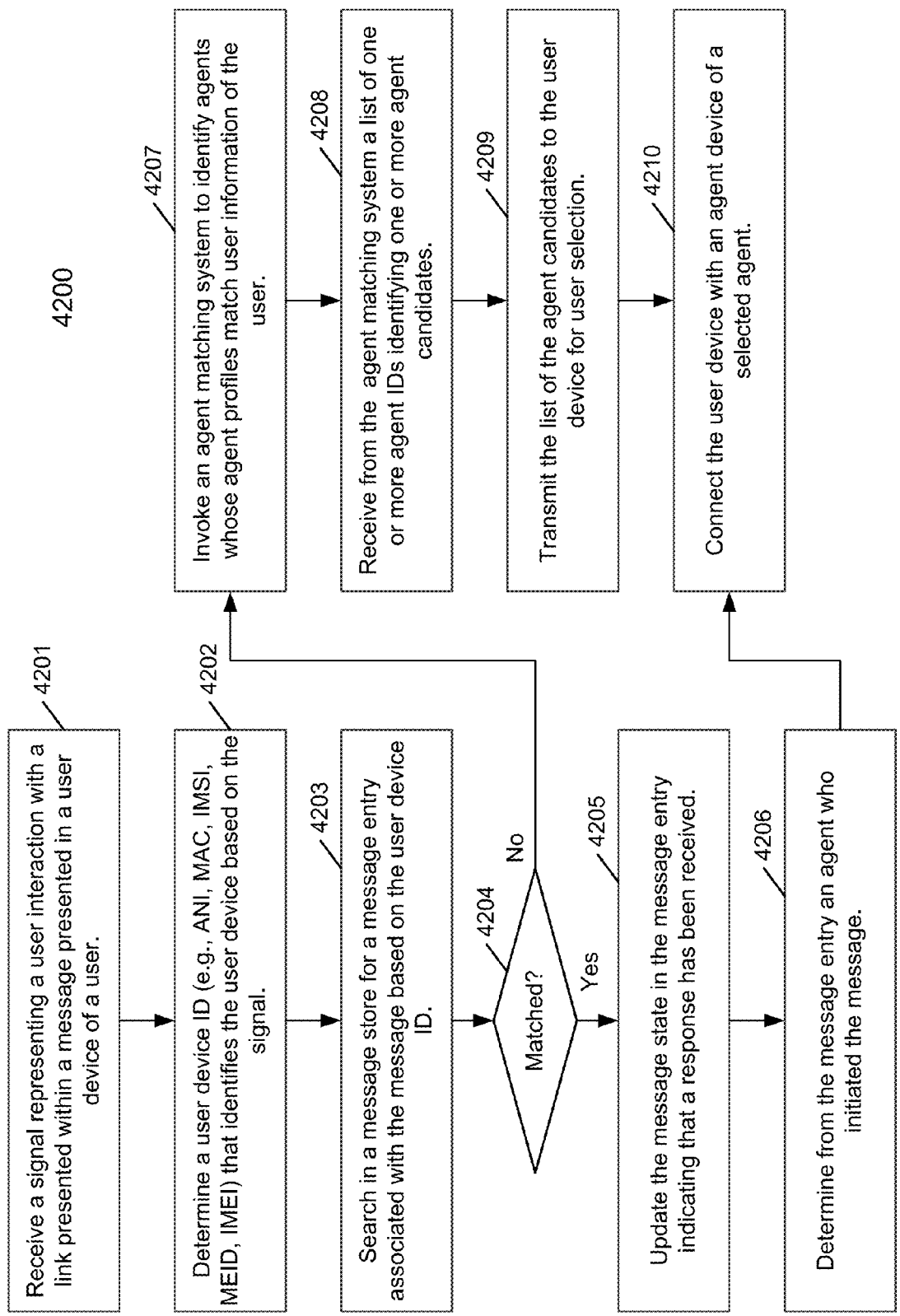
FIG. 42 is a flow diagram illustrating a process performed in an agent connect system according to another embodiment of the invention.

FIG. 42 is a flow diagram illustrating a process performed in an agent connect system according to another embodiment of the invention. Process 4200 may be performed by processing logic which may include hardware, software, or a combination thereof. For example, process 4200 may be performed by system 3700 of FIG. 37. Referring to FIG. 42, at block 4201, processing logic receives a signal or a request representing a user interaction with a link presented within a message presented in a user device of a user. The message was initiated from an agent device of an agent who conducted a communication session with the user concerning a product/service provided by a product/service provider as an enterprise client. In response to the signal or request, at block 4202, processing logic determines based on the signal or request a user device from which the signal is received. A user device ID can be any one or more of ANI, IMAC, IMSI, MEID, IMEI, ESN, or any other information that can identify the user device.

At block 4203, processing logic searches in a message store based on the user device ID to identify a message entry corresponding to a message previously received by the user device. If there is a message entry having information matching the user device ID at block 4204, the message state of the message entry is updated from a "sent" state to a "response received" state at block 4205. At block 4206, processing logic determines from the matching message entry an agent ID identifying an agent who initiated the message sent to the user device. At block 4210, processing logic connects the user device with an agent device of the agent for a communication session. In one embodiment, in response to the signal processing logic determine whether the signal is received within a predetermined period of time from the time the corresponding message was sent. The user and the same agent is connected only if the signal was received within the predetermined period of time.

If there is no matching message entry found at block 4204, processing logic communicates with an agent matching system or server to identify one or more agents whose agent profiles match user information of the user at block 4207, as described above. At block 4208, processing logic receives a list of one or more agent candidates recommended by the agent matching system. At block 4209, processing logic optionally sends the list of recommended agents to the user device for user selection. At block 4210, processing logic connects the user device with a selected agent for a communication session.

Note that the techniques described throughout this application can be applied to a variety of situations of a support center that provides support services to customers/users of a variety of products or services provided by a variety of product/service providers, which are enterprise clients to the support center. For example, agent connect system 115 may be a live connect system. According to some embodiments, a live connect system is to coordinate with content providers and content distribution systems to provide and distribute live content (also simply referred to as live connect content) to end users as visitors. With the live connect system, an end user (e.g., visitor) who accesses live content can establish a live communication session with another user (e.g., support agent, specialist) that is associated with the live content at the point in time, for example, for the purpose of discussing further detailed information concerning the content presented. The live content presented to the visitor includes information indicating that there is a support agent who is available at the point in time to have a live conversation with the visitor. The live content also includes information indicating a geographic location of that support agent with respect to the geographic location of the visitor (e.g., within a predetermined geographic proximity). As a result, the end user does not have to go through tedious manual operations in order to reach out someone who is nearby and familiar with the content in question or someone who he or she can talk to immediately concerning the content at the point in time.

According to one embodiment, when a user accesses content presented by a content server (e.g., Web server such as a Yahoo® or Google® Web server, also referred to as a content presentation server), the content server may communicate with a live content (also referred to as live sponsored content) server (e.g., Ad network) to request a list of live content (e.g., live connect Ads) that is associated with the information or content currently accessed by the user (e.g., search term, keyword, or search result). In response, the live content server identifies, for example, from its content database, a list of live content associated with the information the user is currently interested in (e.g., search information, user information). For each of the live content, the live content server communicates with a live connect server to determine whether there is another user or at least one specialist (also referred to as subject matter expert or SME, support agent or simply agent) currently available, who is familiar with the subject matter in question and who can communicate with the user at the point in time. For each of the inquired live content, the live connect server identifies zero or more specialists that are currently available, for example, based on the geographic locations, presence information, and status of the specialists, which may be stored and periodically updated in a user or specialist database associated with the live connect server.

The live connect server returns information indicating which of the live content that has at least one live support person or agent (e.g., specialist) available. In one embodiment, the live connect server returns identifying information of the live support persons that are associated with the live content being inquired (e.g., live Ads). For each of the associated support persons, for example, prior to presenting the live content, the live connect server further determines whether the respective support agent is currently available, and if the support agent is currently available, the respective geographic location (e.g., longitude and latitude data) with respect to the geographic location of the visitor. For each of the live content that has at least one support agent available, according to one embodiment, the live content may be presented to the user by the live content server and/or the content presentation server. In addition, each live content may be presented with a live connect button or control to enable the user to contact another user that is associated with the live content. In one embodiment, an available specialist may also be someone located within a predetermined geographic proximity with respect to a geographic location associated with the visitor. For example, an available agent can contact the visitor discussing the live content in real time or within a very short period of time, and potentially go to and arrive at a premises or property (e.g., house or building) of the visitor within a reasonable period of time, for example, to provide services related to the live content, which may also be desired or expected by the visitor.

Alternatively, according to another embodiment, each live content may be presented with identifying information of one or more support agents or specialists who can communicate with the visitor immediately or within a short period of time for discussing the corresponding live content. In one embodiment, the identifying information includes a name and/or a picture of the specialist and a geographical location of the specialist with respect to the user. One or more of the available specialists are presented to the user with a live connect button or control. The displayed live content may also indicate that the user can contact a specialist or agent associated with the live content in real time and guaranteed to reach a live person within a short period of time. The user can activate or click a live connect button or control to contact the corresponding specialist at the point in time, for example, based on the geographic location of the specialist or based on reputation of the company the specialist is associated with. If particular live content does not have at least one specialist that is currently available, that particular live content may not be presented to the user or the content is presented as static content without indicating that the user can contact an agent in real time. This ensures availability of both parties—the user who would initiate a connection and the specialist who must be available to accept/respond to communication—and is dependent upon the specific configuration or rules/algorithms of the content server. Alternatively, that live content may be presented as regular static content, for example, without presenting the live connect button or control, when there is no specialist currently available. In such a situation if subsequently there is a specialist who becomes available, the live connect button or control is then presented to the user, again dependent upon the specific implementation or configuration of the content presentation server and/or content distribution server.

When the visitor activates or clicks on a live connect button of a particular live content, a connection request is transmitted to the live connect server. The request may include contact identifying information of the visitor (e.g., name, address, phone number, email, etc.) and other user information (e.g., search information, activities performed by the visitor, and/or a geographic location of the visitor). In response, the live connect server routes the visitor's information to a specialist who is associated with the live content and is also available. In one embodiment, a specialist may be selected, for example, based on its availability status and/or its geographic location, by the live connect server when the live content server requests for availability information. As a result, the identifying information of the selected specialist may have been embedded as part of executable code associated with the live connect button. Thus, when the visitor activates the live connect button, the underlying code is executed and a data message is transmitted to the live connect server, which in turn routes the information to the selected specialist. That is, a specialist has to be selected before the live content is displayed. That matters in two ways: (1) in order to display a map of specialists the specific and unique geographic information for each specialist must be ascertained; (2) chat or call information must be determined and embedded in part of the live content code.

In this situation, the live connect server can automatically routes the request to the selected specialist without user intervention. The selected specialist can then respond to the connection request at the point in time. Alternatively, according to another embodiment, the visitor can initiate a contact request by activating the live connect button, as a general live connect button to connect with the live content owner, to communicate with a dispatcher or manager associated with that particular live content, which in turn selects and routes the contact request to a specialist who is available. In this situation, a dedicated person, such as an administrator, a manager, or a dispatch person has to be available to receive the request and determine to which of the available specialists the request should be routed. If a specialist becomes unavailable or is unwilling to accept the request, the request may be rerouted to the dedicated person, such as a dispatcher, manager, or a dedicated overflow specialist. Further details concerning the live connect system can be found in a co-pending U.S. patent application Ser. No. 14/686,514, filed Apr. 14, 2015, which is incorporated by reference herein in its entirety.

Figure 43:
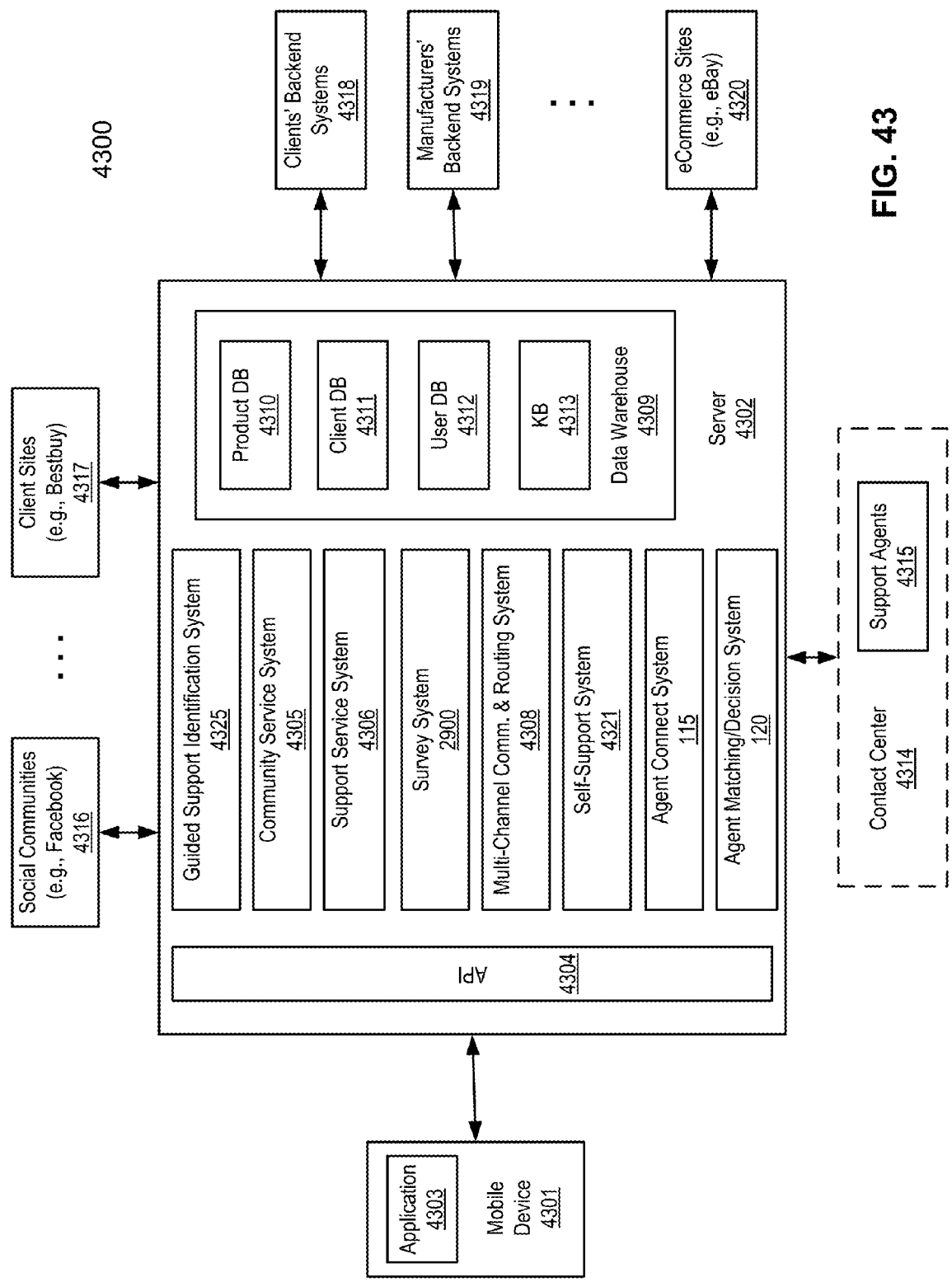
FIG. 43 is a block diagram illustrating a system for providing support services to products according to one embodiment of the invention.

FIG. 43 is a block diagram illustrating a system for providing support services to products according to one embodiment of the invention. System 4300 can be implemented with an agent connect system/server and/or agent matching system/server as described above. Referring to FIG. 43, system 4300 includes a mobile device 4301 of a user, customer, or individual communicatively coupled to server 4302 representing a support center over a network. The network may be any kind of networks, such as a wide area network (WAN) (e.g., the Internet), a local area network (LAN), or a combination of both. Mobile device 4301 may be any kind of mobile devices including, but is not limited to, a laptop, mobile phone, tablet, media player, personal digital assistant or PDA, etc. Communication connections between devices can be established either by routing through the network or by direct initiation of calls from one end device to another by a mobile application communicating with a server who selects the target. For routed calls the network provides the state of the connection and hence the call state component of agent availability. For direct initiation, some device environments provide for notification of call state and others do not.

Support center 4302 may be implemented in a centralized facility or server with data processing hardware. Alternatively, support center 4302 may be implemented in multiple facilities or servers in a distributed manner (e.g., cloud-based service platforms). Support center 4302 provides services to a variety of products or services from a variety of clients or vendors. For example, support center 4302 may be a caller center handling a variety of support call services on products or services for a variety of goods and service providers. A client may be a manufacturer, a distributor, a retailer, a service provider or broker, a purchasing facility (e.g., Amazon™, Expedia™, or ISIS™), or a combination thereof.

In one embodiment, support center 4302 includes one or more service application programming interfaces (APIs) 4304 to communicate, over a network, with other systems such as mobile device 4301, client's site 4317, social communities 4316, contact center 4314 including agents or experts 4315, client backend systems 4318, manufacturer backend systems 4319, eCommerce sites 4320 and other auxiliary systems (e.g., billing system). Support center 4302 can handle service requests from customers of multiple clients. For example, support center 4302 may handle customer service requests for a number of retail sales companies, sales/post sales calls for catalog sales companies, and patient follow-up contacts for health care providers. In such a structure, the support center may receive service requests directly from the customers or through client support management systems.

In one embodiment, support center 4302 further includes a community service system (not shown), support services system 4306, and data warehouse 4309. Support services system 4306 is responsible for handling support services requests from the users, including identifying and registering a product, creating an transaction case context, selecting and assigning a customer representative (also referred to herein as an agent, specialist, or expert) to provide support services to the users, and managing work flows, etc. An agent may be selected based on a skill set or expertise of the agent in a skill, as well as other factors such as geographic location, of the agent. The term "agent," "specialist," or "expert" refers to a support center personnel or a computerized application, in some cases, that respond to customer requests. An agent may be locally situated at the support center or remotely situated over a network. Throughout this application, the terms of "agent," "specialist," and "expert" are interchangeable terms dependent upon the circumstances. In most cases, the term of "agent" collectively refers to a customer representative, a support agent, a support specialist, a support expert, or a combination thereof, which may be a support center personnel and/or a computerized application.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for routing messages to connect users based on user scores dynamically determined, the method comprising:

recording, by an interaction monitor running within a first server, a collection of real-time data representing user navigation of content using a mobile application running within a mobile device of user;

receiving a request for connecting a user with an agent, the request including information identifying a user interaction with the content;

in response to the request, accessing, by a first score determination module hosted by the first server, a second server to determine a first score of the user, the first score representing a benefit the user has generated for a client that provides the content;

accessing, by a second score determination module hosted by the first server, a third server to determine a second score of the user, the second score representing overall burden to provide services to the user by the client based on an interaction history of the user with the client;

dynamically determining, by a user value determination module hosted by the first server, a user value based on the first score and the second score using a user value determination algorithm that is specifically configured for the client;

identifying, by a matching engine hosted by the first server, a list of agent candidates from a pool of agents based on the user value and the collection of real-time data; and establishing a first communication session to be established between the user and one of the agent candidates.

2. The method of claim 1, wherein identifying a list of agent candidates comprises:

for each of the agents in the pool, retrieving from an agent database an agent profile associated with the agent;

examining one or more properties of the agent profile associated with the agent to determine a range of values; and selecting the agent as an agent candidate if the user value is within the range of values specified in the one or more properties of the agent profile.

3. The method of claim 1, further comprising:

determining via the second server a third score of the user, the third score representing a level of satisfaction of the user with respect to services provided by the client;

determining via the second server a fourth score of the user, the fourth score rating a user adoption level of products or services of the client; and calculating the user value further based on the third score and the fourth score.

4. The method of claim 1, further comprising:

transmitting a second request to a fourth server requesting a fifth score of the user, the fifth score representing an overall social influence, wherein the fourth server is associated with a social community or a social aggregator;

in response to receiving a social influence level of the user from the fourth server, converting the social influence level into the fifth score using a predetermined influence conversion algorithm; and calculating the user value further based on the fifth score of the user.

5. The method of claim 1, wherein the user value determination algorithm is a weighted formula, wherein the first score is associated with a first weight factor and the second score is associated with a second weight factor, and wherein the first weight factor and the second weight factor are specifically configured for the client.

6. The method of claim 1, further comprising:

retrieving an intent mapping table from a client database that is associated with the client, wherein the intent mapping table contains a plurality of intent entries, each corresponding to a type of user interactions;

determining a user intent based on the user interaction using the intent mapping table, by mapping the user interaction to one of the intent entries; and determining the list of agent candidates based on the user intent.

7. The method of claim 6, wherein determining the list of agent candidates based on the user intent comprises:

for each of the agents in the pool, retrieving from an agent database an agent profile associated with the agent;

examining a predetermined agent attribute of the agent profile associated with the agent to determine an expertise associated with the agent, and selecting the agent as an agent candidate if the user intent matches the expertise of the agent profile matches specified in the predetermined agent attribute of the agent profile.

8. The method of claim 7, further comprising:

retrieving a channel mapping table associated with the client, the channel mapping table maps an expertise to one or more communication channels; and for each of the agent candidates, determining one or more communication channel available to the user based on a corresponding expertise using the channel mapping table.

9. The method of claim 8, wherein the availability of the communication channels is further determined based on a range of values of each agent candidate, and wherein the communication channels comprise at least one of a voice or video call, an in-person appointment, chat, email, sms, and an online-discussion forum.

10. The method of claim 1, further comprising:

determining, by a user classification module, a user type of the user by matching one or more predetermined user attributes of a user profile of the user against a corresponding one defined in a user classification rule associated with the client; and determining, by an agent classification module, an agent type based on the user type by matching the user type with agent types defined in an agent classification rule associated with the client, wherein the list agent candidates is further determined by matching the agent type with an agent type specified in each of the agent profiles.

11. The method of claim 10, wherein the user classification rule defines a plurality of user types based on conditions of a set of predetermined user attributes, and wherein the agent classification rule maps a plurality of user types to a plurality of agent types, respectively.

12. The method of claim 1, further comprising:

determining, by a user classification module, a user type of the user by matching one or more predetermined user attributes of a user profile of the user against a corresponding one defined in a user classification rule associated with the client; and determining, by a treatment classification module, a treatment type based on the user type by matching the user type with a plurality of treatment types defined in a treatment classification rule associated with the client, wherein each treatment type corresponds to one of a plurality of treatment profiles having information describing how a user is to be serviced.

13. The method of claim 12, wherein a treatment profile includes a predetermined set of agent attributes and conditions to be satisfied in order for an agent to be selected for a treatment represented by the treatment profile, and wherein the agents of the list are selected based on their respective agent profiles having the predetermined set of agent attributes matching the conditions specified in the treatment profile.

14. The method of claim 1, further comprising:
generating a workflow based on the agent candidates using a workflow template, the workflow including a plurality of workflow stages, wherein the workflow template is specifically configured for the client;
determining whether a first criteria associated with the first workflow stage has been satisfied based on the first communication session; and
in response to determining that the first criteria has been satisfied, establishing a second communication session between the user device and a second agent device of a second of the agents associated with a second of the workflow stages.

15. The method of claim 14, wherein each of the workflow stages includes a specific criteria that needs to be satisfied in order to advance to a next workflow stage, and wherein each of the workflow stages includes a next workflow stage identifier that identifies the next workflow stage when the specific criteria of the corresponding workflow stage is satisfied.

16. A non-transitory machine-readable medium having instructions stored therein, which when executed by a processor, cause the processor to perform operations of routing messages to connect users based on user scores dynamically determined, the operations comprising:
recording, by an interaction monitor running within a first server, a collection of real-time data representing user navigation of content using a mobile application running within a mobile device of user;
receiving a request for connecting a user with an agent, the request including information identifying a user interaction with the content;
in response to the request, accessing, by a first score determination module hosted by the first server, a second server to determine a first score of the user, the first score representing a benefit the user has generated for a client that provides the content;
accessing, by a second score determination module hosted by the first server, a third server to determine a second score of the user, the second score representing overall burden to provide services to the user by the client based on an interaction history of the user with the client;
dynamically determining, by a user value determination module hosted by the first server, a user value based on the first score and the second score using a user value determination algorithm that is specifically configured for the client;
identifying, by a matching engine hosted by the first server, a list of agent candidates from a pool of agents based on the user value and the collection of real-time data; and
establishing a first communication session to be established between the user and one of the agent candidates.

17. The non-transitory machine-readable medium of claim 16, wherein identifying a list of agent candidates comprises:
for each of the agents in the pool, retrieving from an agent database an agent profile associated with the agent;
examining one or more properties of the agent profile associated with the agent to determine a range of values; and
selecting the agent as an agent candidate if the user value is within the range of values specified in the one or more properties of the agent profile.

18. The non-transitory machine-readable medium of claim 16, wherein the operations further comprise:
determining via the second server a third score of the user, the third score representing a level of satisfaction of the user with respect to services provided by the client;
determining via the second server a fourth score of the user, the fourth score rating a user adoption level of products or services of the client; and
calculating the user value further based on the third score and the fourth score.

19. The non-transitory machine-readable medium of claim 16, wherein the operations further comprise:
transmitting a second request to a fourth server requesting a fifth score of the user, the fifth score representing an overall social influence, wherein the fourth server is associated with a social community or a social aggregator;
in response to receiving a social influence level of the user from the fourth server, converting the social influence level into the fifth score using a predetermined influence conversion algorithm; and
calculating the user value further based on the fifth score of the user.

20. The non-transitory machine-readable medium of claim 16, wherein the user value determination algorithm is a weighted formula, wherein the first score is associated with a first weight factor and the second score is associated with a second weight factor, and wherein the first weight factor and the second weight factor are specifically configured for the client.

21. The non-transitory machine-readable medium of claim 16, wherein the operations further comprise:
retrieving an intent mapping table from a client database that is associated with the client, wherein the intent mapping table contains a plurality of intent entries, each corresponding to a type of user interactions;
determining a user intent based on the user interaction using the intent mapping table, by mapping the user interaction to one of the intent entries; and
determining the list of agent candidates based on the user intent.

22. A data processing system, comprising:
a processor;
a memory coupled to the processor;
an interaction monitor running to record a collection of real-time data representing user navigation of content using a mobile application running within a mobile device of user;
an agent connect module to receive a request for connecting a user with an agent, the request including information identifying a user interaction with the content;
a first score determination module, in response to the request, to access a second server to determine a first score of the user, the first score representing a benefit the user has generated for a client that provides the content;

a second score determination module to access a third server to determine a second score of the user, the second score representing overall burden to provide services to the user by the client based on an interaction history of the user with the client;

a user value determination module to dynamically determine a user value based on the first score and the second score using a user value determination algorithm that is specifically configured for the client;

a matching engine to identify a list of agent candidates from a pool of agents based on the user value and the collection of real-time data; and a routing module to establish a first communication session to be established between the user and one of the agent candidates.

23. The system of claim 22, wherein in identifying a list of agent candidates, the matching engine is to
- for each of the agents in the pool, retrieve from an agent database an agent profile associated with the agent,
- examine one or more properties of the agent profile associated with the agent to determine a range of values, and
- select the agent as an agent candidate if the user value is within the range of values specified in the one or more properties of the agent profile.

24. The system of claim 22, wherein a third score of the user is determined via the second server, the third score representing a level of satisfaction of the user with respect to services provided by the client, wherein a fourth score of the user is determined via the second server, the fourth score rating a user adoption level of products or services of the client, and wherein the user value is determined further based on the third score and the fourth score.

* * * * *